(12) United States Patent
Jaffe

(10) Patent No.: US 10,621,589 B2
(45) Date of Patent: Apr. 14, 2020

(54) SYSTEM FOR MERCHANT AND NON-MERCHANT BASED TRACTIONS UTILIZING SECURE COMMUNICATIONS WHILE ALLOWING FOR SECURE ADDITIONAL FUNCTIONALITY

(71) Applicant: Jonathan E. Jaffe, Gallatin, TN (US)

(72) Inventor: Jonathan E. Jaffe, Gallatin, TN (US)

( * ) Notice: Subject to any disclaimer, the term of this patent is extended or adjusted under 35 U.S.C. 154(b) by 1124 days.

(21) Appl. No.: 14/441,590

(22) PCT Filed: Nov. 11, 2013

(86) PCT No.: PCT/US2013/069492
§ 371 (c)(1),
(2) Date: May 8, 2015

(87) PCT Pub. No.: WO2014/078241
PCT Pub. Date: May 22, 2014

(65) Prior Publication Data
US 2015/0278814 A1    Oct. 1, 2015

Related U.S. Application Data

(60) Provisional application No. 61/726,313, filed on Nov. 14, 2012.

(51) Int. Cl.
| | | |
|---|---|---|
| *G06Q 20/40* | (2012.01) |
| *G06Q 20/32* | (2012.01) |
| *G06Q 20/38* | (2012.01) |
| *G06Q 20/24* | (2012.01) |

(52) U.S. Cl.
CPC .......... *G06Q 20/409* (2013.01); *G06Q 20/24* (2013.01); *G06Q 20/3274* (2013.01); *G06Q 20/3276* (2013.01); *G06Q 20/3823* (2013.01)

(58) Field of Classification Search
CPC .......... G06Q 20/3276; G06Q 20/3823; G06Q 20/24; G06Q 20/409; G06Q 20/3274; G06Q 20/40; G06Q 20/32; G06Q 20/32
USPC ...................................................... 705/35–44
See application file for complete search history.

(56) References Cited

U.S. PATENT DOCUMENTS

| | | |
|---|---|---|
| 4,628,195 A | 12/1986 | Baus |
| 4,630,201 A | 12/1986 | White |
| 4,961,142 A | 10/1990 | Elliott |
| 5,163,098 A | 11/1992 | Dahbura |
| 5,478,993 A | 12/1995 | Derksen |
| 5,883,810 A | 3/1999 | Franklin et al. |
| 5,991,738 A | 11/1999 | Ogram |
| 6,005,939 A | 12/1999 | Fortenberry |

(Continued)

OTHER PUBLICATIONS

European Search Report for PCT/US2013/069492 dated Jun. 29, 2016.

(Continued)

*Primary Examiner* — Hani M Kazimi
(74) *Attorney, Agent, or Firm* — Cook Alex Ltd.

(57) ABSTRACT

Methods, apparatuses, non-transitory computer program products, systems, and mobile terminal devices are disclosed for performing wireless financial transactions which separate an account identification and transaction authorization from a single charge card into two separate elements, which include at least an encrypted account identifier and a transaction-adaptive, context sensitive, dynamically content-rich, transaction authorization.

9 Claims, 38 Drawing Sheets

(56) References Cited

U.S. PATENT DOCUMENTS

| | | |
|---|---|---|
| 6,012,144 A | 1/2000 | Pickett |
| 6,594,376 B2 | 7/2003 | Hoffman |
| 6,641,050 B2 | 11/2003 | Kelley |
| 6,662,166 B2 | 12/2003 | Pare |
| 6,678,664 B1 | 1/2004 | Ganesan |
| 6,842,743 B2 | 1/2005 | Yu et al. |
| 6,985,608 B2 | 1/2006 | Hoffman |
| 7,003,501 B2 | 4/2006 | Ostroff |
| 7,089,208 B1 | 8/2006 | Levchin et al. |
| 7,152,045 B2 | 12/2006 | Hoffman |
| 7,249,094 B2 | 7/2007 | Levchin |
| 7,278,581 B2 | 10/2007 | Ong |
| 7,360,688 B1 | 4/2008 | Harris |
| 7,379,921 B1 | 5/2008 | Kiliccote |
| 7,430,537 B2 | 9/2008 | Templeton |
| 7,475,043 B2 | 1/2009 | Light |
| 7,536,336 B1 | 4/2009 | Guinan |
| 7,567,934 B2 | 7/2009 | Flitcroft |
| 7,568,631 B2 | 8/2009 | Gibbs |
| 7,571,142 B1 | 8/2009 | Flitcroft |
| 7,593,896 B1 | 9/2009 | Flitcroft |
| 7,617,125 B1 | 11/2009 | Light et al. |
| 7,664,699 B1 | 2/2010 | Powell |
| 7,693,796 B2 | 4/2010 | Light |
| 7,734,729 B2 | 6/2010 | Du et al. |
| 7,752,134 B2 | 7/2010 | Spear |
| 7,753,266 B2 | 7/2010 | Harris |
| 7,784,684 B2 | 8/2010 | Labrou |
| 7,828,207 B2 | 11/2010 | Cooper |
| 7,840,486 B2 | 11/2010 | D'Agostino |
| 8,005,426 B2 | 8/2011 | Huomo et al. |
| 8,024,260 B1 | 9/2011 | Hogl et al. |
| 8,066,182 B2 | 11/2011 | Harris |
| 8,078,538 B1 | 12/2011 | Buch |
| 8,086,531 B2 | 12/2011 | Litster |
| 8,103,249 B2 | 1/2012 | Markison |
| 8,141,780 B2 | 3/2012 | Lawson |
| 8,176,064 B2 | 5/2012 | Huomo |
| 8,244,641 B2 | 8/2012 | Light et al. |
| 2001/0009542 A1 | 7/2001 | Benedetti |
| 2001/0034717 A1 | 10/2001 | Whitworth |
| 2001/0047336 A1 | 11/2001 | Maycock et al. |
| 2001/0049655 A1 | 12/2001 | Bellosguardo |
| 2001/0053239 A1 | 12/2001 | Takhar |
| 2001/0056409 A1 | 12/2001 | Bellovin et al. |
| 2002/0013766 A1 | 1/2002 | Kumaki |
| 2002/0014527 A1 | 2/2002 | Sawada |
| 2002/0017568 A1 | 2/2002 | Grant et al. |
| 2002/0026418 A1 | 2/2002 | Koppel et al. |
| 2002/0027980 A1 | 3/2002 | Kowalski |
| 2002/0029196 A1 | 3/2002 | Metcalf et al. |
| 2002/0032648 A1 | 3/2002 | Pine et al. |
| 2002/0032657 A1 | 3/2002 | Singh |
| 2002/0046341 A1 | 4/2002 | Kazaks et al. |
| 2002/0062291 A1 | 5/2002 | Zoka |
| 2002/0069177 A1* | 6/2002 | Carrott ............... G06Q 20/10 705/64 |
| 2002/0073045 A1 | 6/2002 | Rubin et al. |
| 2002/0079363 A1 | 6/2002 | Sasabe |
| 2002/0087869 A1 | 7/2002 | Kim |
| 2002/0087968 A1 | 7/2002 | Krishnan et al. |
| 2002/0091646 A1 | 7/2002 | Lake et al. |
| 2002/0095303 A1 | 7/2002 | Asayama et al. |
| 2002/0099648 A1 | 7/2002 | DeVoe et al. |
| 2002/0103736 A1 | 8/2002 | Webb |
| 2002/0103767 A1 | 8/2002 | Bournat |
| 2002/0123935 A1* | 9/2002 | Asghari-Kamrani ........ G06Q 20/02 705/26.41 |
| 2002/0003169 A1 | 10/2002 | Cooper |
| 2002/0143708 A1 | 10/2002 | Hollander et al. |
| 2002/0170964 A1 | 11/2002 | Sabella |
| 2003/0028481 A1* | 2/2003 | Flitcroft ............... G06Q 20/105 705/39 |
| 2003/0158781 A1 | 8/2003 | Philip |
| 2004/0201765 A1* | 10/2004 | Gammenthaler ........... G08B 13/19647 348/333.01 |
| 2005/0075985 A1 | 4/2005 | Cartmell |
| 2005/0216728 A1 | 9/2005 | Relan et al. |
| 2005/0240478 A1 | 10/2005 | Lubow et al. |
| 2006/0213972 A1 | 9/2006 | Kelley et al. |
| 2006/0266822 A1 | 11/2006 | Kelley et al. |
| 2007/0288394 A1* | 12/2007 | Carrott ............... G06F 21/10 705/78 |
| 2008/0319914 A1* | 12/2008 | Carrott ............... G06Q 20/02 705/75 |
| 2009/0156180 A1 | 6/2009 | Slavin |
| 2009/0222353 A1 | 9/2009 | Guest |
| 2009/0222459 A1 | 9/2009 | Steinberg |
| 2009/0259560 A1* | 10/2009 | Bachenheimer ........ G06Q 20/02 705/26.1 |
| 2009/0272796 A1 | 11/2009 | Ong |
| 2009/0299834 A1 | 12/2009 | Wilson |
| 2009/0302123 A1 | 12/2009 | Lugt et al. |
| 2010/0063872 A1 | 3/2010 | Patel et al. |
| 2010/0070364 A1 | 3/2010 | Dugan |
| 2010/0241571 A1 | 9/2010 | McDonald |
| 2010/0288834 A1* | 11/2010 | Tichelaer ............... G06Q 20/04 235/380 |
| 2011/0106534 A1 | 5/2011 | LeBeau et al. |
| 2011/0251910 A1 | 10/2011 | Dimmick |
| 2012/0130851 A1 | 5/2012 | Minnick et al. |
| 2012/0132706 A1 | 5/2012 | McKenzie |
| 2012/0136733 A1 | 5/2012 | Mason |
| 2012/0143754 A1 | 6/2012 | Patel |
| 2012/0143760 A1 | 6/2012 | Abulafia et al. |
| 2012/0143762 A1 | 6/2012 | Hur |
| 2012/0150601 A1 | 6/2012 | Fisher |
| 2012/0158584 A1 | 6/2012 | Behren et al. |
| 2012/0166333 A1 | 6/2012 | Behren et al. |
| 2012/0173431 A1 | 7/2012 | Ritchie et al. |
| 2012/0191557 A1 | 7/2012 | Fisher et al. |
| 2012/0197800 A1 | 8/2012 | Ross et al. |
| 2012/0203605 A1 | 8/2012 | Morgan et al. |
| 2012/0253913 A1 | 10/2012 | Richard |
| 2013/0346310 A1* | 12/2013 | Burger ............... G06F 21/00 705/44 |
| 2014/0222675 A1* | 8/2014 | Mao ............... G06Q 20/383 705/44 |
| 2014/0304157 A1* | 10/2014 | Bachenheimer ... G06Q 20/4016 705/44 |

OTHER PUBLICATIONS

International Search Report and Written Opinion for PCT/US13/69492 dated May 6, 2014.
International Preliminary Report on Patentability for PCT/US13/69492 dated Nov. 13, 2014.
Second European Office Action for European Patent Application No. 13854752.6 dated Jan. 19, 2018.
Summons to attend oral proceedings pursuant to Rule 115(1) EPC for European Patent Application No. 13854752.6 dated Dec. 5, 2019.
Joker's Stash Advertises More Stolen Payment Card Data, Data Breach Today Nov. 27, 2019 https://www.databreachtoday.com/jokers-stash-advertises-more-stolen-payment-card-data-a-13451.

* cited by examiner

Existing Communications
for Card-Present Transactions

Existing Communications for Electronic Transactions
Merchant Provides Fulfillment Existing Initialization

| Standard Card and Processing v. NC3 |||
| --- | --- | --- |
| Element | Existing Charge Card | NC3 System |
| Identifier | Account identifier and associated name are printed in plain text on the card. The full number has only recently been omitted from receipts. | The underlying charge card number is not used at all. The NC3 identifier is a unique consumer identifier, different from the account identifier. The NC3 identifier and the associated consumer name exist in an encrypted form, concealed from all but the appropriate provider. |
| Identifier Availability | The account identifier is always available on the card. | The account identifier is never used. |
| Authorization | The name, card number, expiration date, and credit verification value (CVV) can be used to authorize a transaction. All of these are never-changing values. | The NC3 identifier is constant while in use, but can be replaced by the consumer without provider human assistance. The authorization is restricted to a single merchant, for a specific amount, or a not-to-exceed amount, for a specific date and time limit. |
| Ability to Use a Copy for Other Purchases? | Yes. Using the authorization above, multiple purchases can be made. | No. Copies of that authorization restrict it to that specific merchant etc. Duplicates of that authorization are rejected. |

| Base 10 | Base 64 | Base 10 | Base 64 | Base 10 | Base 64 | Base 10 | Base 64 |
|---|---|---|---|---|---|---|---|
| 0 | 0 | 16 | g | 32 | w | 48 | M |
| 1 | 1 | 17 | h | 33 | x | 49 | N |
| 2 | 2 | 18 | i | 34 | y | 50 | O |
| 3 | 3 | 19 | j | 35 | z | 51 | P |
| 4 | 4 | 20 | k | 36 | A | 52 | Q |
| 5 | 5 | 21 | l | 37 | B | 53 | R |
| 6 | 6 | 22 | m | 38 | C | 54 | S |
| 7 | 7 | 23 | n | 39 | D | 55 | T |
| 8 | 8 | 24 | o | 40 | E | 56 | U |
| 9 | 9 | 25 | p | 41 | F | 57 | V |
| 10 | a | 26 | q | 42 | G | 58 | W |
| 11 | b | 27 | r | 43 | H | 59 | X |
| 12 | c | 28 | s | 44 | I | 60 | Y |
| 13 | d | 29 | t | 45 | J | 61 | Z |
| 14 | e | 30 | u | 46 | K | 62 | ^ |
| 15 | f | 31 | v | 47 | L | 63 | Under Score |

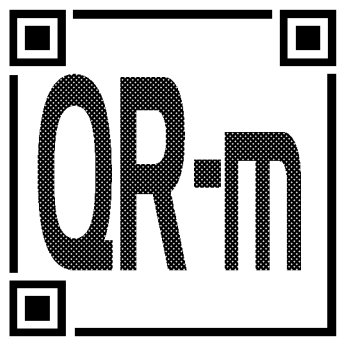 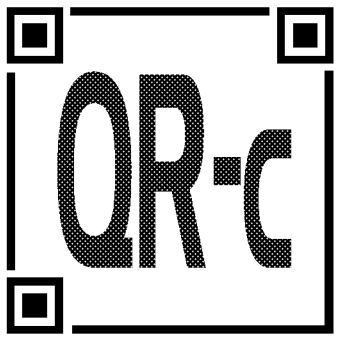 
Fig. 11  Fig. 12  Fig. 13
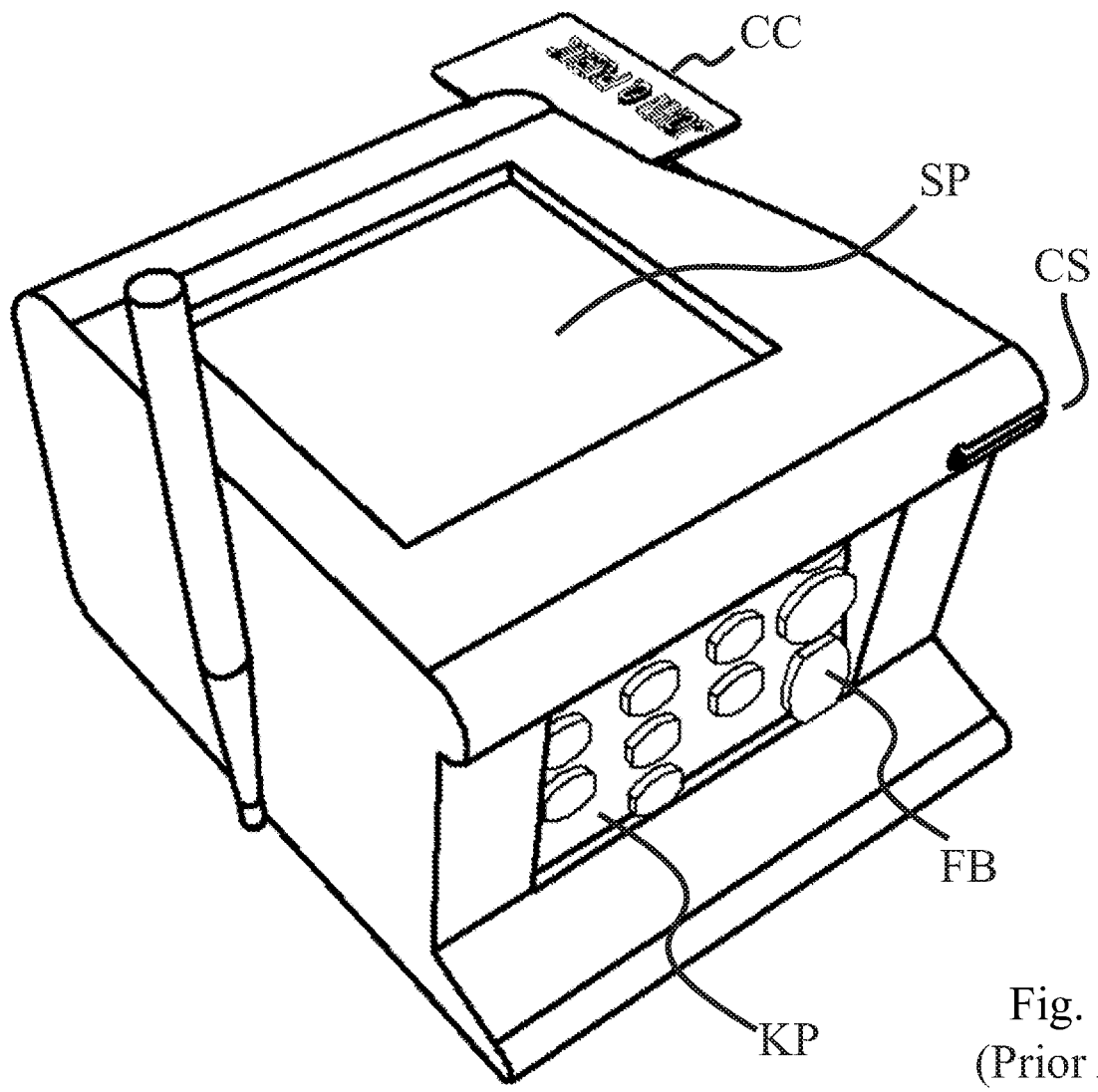
Fig. 14
(Prior Art)

Thank you for dining at
Mary's Munchies
Dining In, May 1, 2012 1:59pm

Croissant, plain      2@0.99/ea $1.98
Choc cvrd Bismark 1@0.59/ea $0.59
Apple Fritter          1@0.79/ea $0.79
Coffee                  2@1.35/ea $2.70
SubTotal                              $6.06
Tax @ 7.25%                        $0.44
Total                                   $6.50

Tip: _____

Total: _____

Signature: _____

The resulting QR-c is

Which resolves to:

Mary's Munchies
M:123987 T:5588226789
$7.84 05/01/2012 1:59PM
C:Cathleen Jones
NC3: KU84NQPD
TL: 201205011459

| | |
|---|---|
| EK-c | Common Encryption Key |
| DK-c | Common Decryption Key |
| EK-u | Unique Encryption Key |
| DK-u | Unique Decryption Key |

| Y=Found | QR-c | QR-m |
|---|---|---|
| Case A | Y | Y |
| Case B | Y | N |
| Case C | N | Y |
| Case D | N | N |
Fig. 32
Merch ID
| 1st 2 digits | Pool |
|---|---|
| < 20 | Alpha |
| < 30 | Bravo |
| < 60 | Cart |
| < 70 | Smurf |
| < 99 | Zulu |
Fig. 33
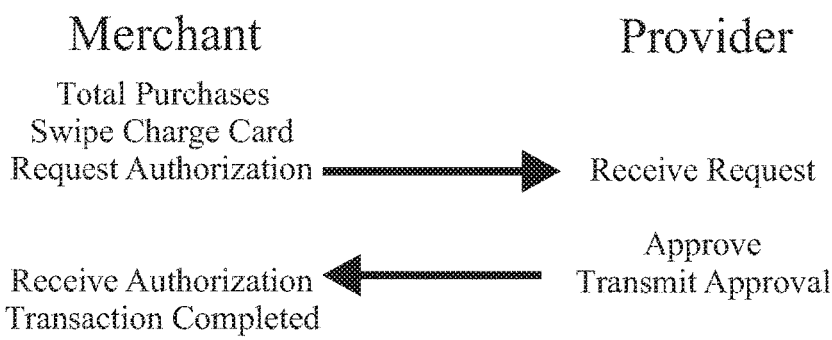
Fig. 34
(Prior Art)
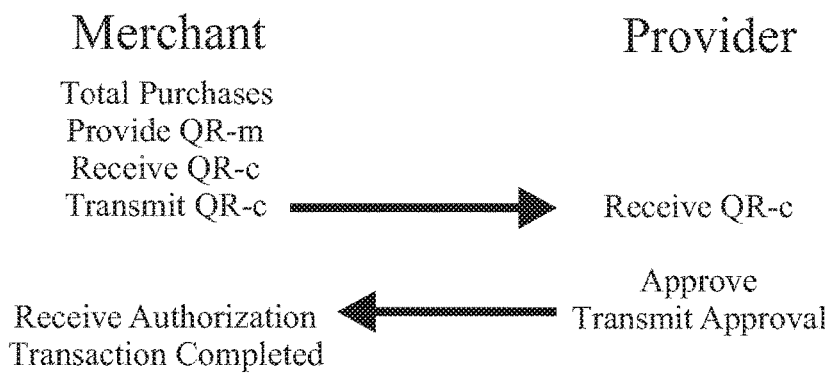
Fig. 35

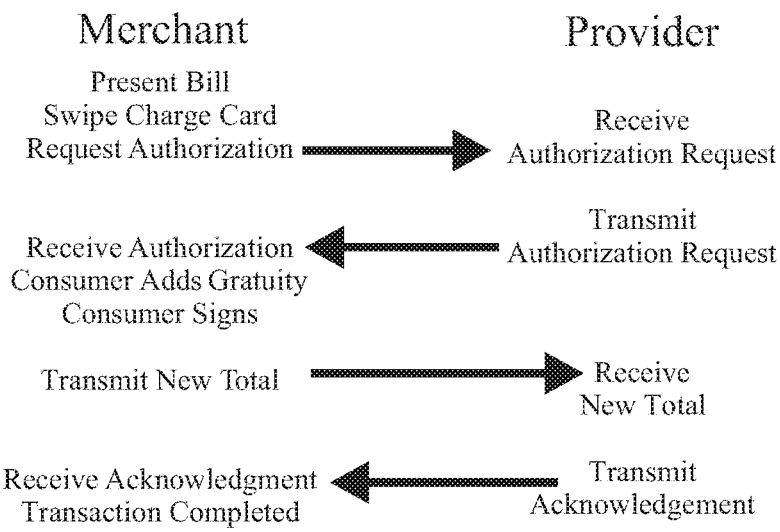
Fig. 36 (Prior Art)
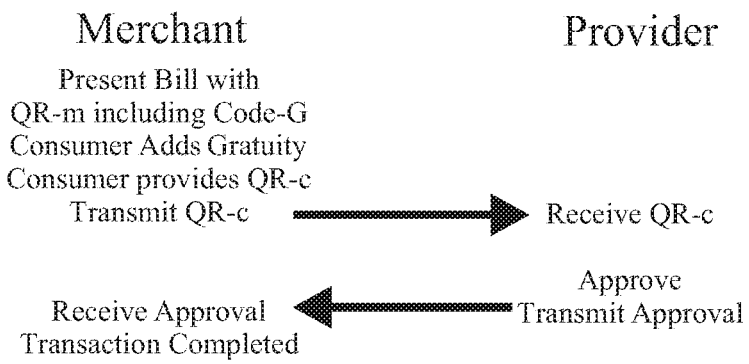
Fig. 37
Sessions of Communications
| Transactions Per Batch | Saved | VS | NC3 Saves% | Average Sessions Per Transaction Under Existing System |
|---|---|---|---|---|
| 1 | 2 | 4 | 50.0% | 4.0 |
| 2 | 4 | 6 | 33.3% | 3.0 |
| 3 | 6 | 8 | 25.0% | 2.7 |
| 4 | 8 | 10 | 20.0% | 2.5 |
| 6 | 12 | 14 | 14.3% | 2.3 |
| 8 | 16 | 18 | 11.1% | 2.3 |
| 10 | 20 | 22 | 9.1% | 2.2 |
| 30 | 60 | 62 | 3.2% | 2.1 |
| 50 | 100 | 102 | 2.0% | 2.0 |
Fig. 38

| Abbreviation | Means |
|---|---|
| QR-c | Consumer's Quick Recognition Code authorizing a charge |
| QR-m | Merchant's Quick Recognition Code for a transaction |
| QR-p | Provider's Quick Recognition Code in providing a new NC3 code |
| QR-mId | Merchant Identification QR Code, used in providing the merchant ID to the consumer<br>In advance of a transaction so the consumer may prepare an order in advance. |
| QR-c-P2PP | From Sender to Recipient |
| QR-c-P2PP-RFA | From Recipient to Recipient-Provider, a Request for Account information |
| QR-c-P2PP-RAI | From Recipient-Provider to Sender-Provider with Requested Account Information<br>or created by a recipient who is not part of the NC3 system. |
| QR-m-P2M | This is what is sent from the Merchant (recipient) to the Consumer (sender) |
| QR-c-P2M | This is sent by the Consumer (sender) to the Sender-Provider |
| QR-c-P2M-RAI | This is also sent by the Consumer (sender) to the Sender-Provider |

Fig. 39

| Code | Means | Code Appears in | |
|---|---|---|---|
| | | QR-m | QR-c |
| A | Amount not-to-exceed, also called NTE. | Y | Y |
| AA | Actual Amount (not included in all examples) | - | Y |
| C | Consumer Name | - | Y |
| D | Duration Code for Recurring Transactions Only | Y | Y |
| E | Email address request, requires consumer consent | Y | Y |
| F | Frequency (used for recurring transactions) | Y | Y |
| G | Gratuity, also called Optional Additional | Y | - |
| L | Locker, Affiliation Code Entry | QR-mId | - |
| M | Merchant Identification | Y | Y |
| NC3 | Consumer's NC3 Code | - | Y |
| O | (Oh, not zero) Order | - | Y |
| P | Phone Code. Requires sub-code. | Y | May |
| R | Rebate (also appears in QR-mId) | Y | Y |
| S | Specie type (if not native currency) | May | Y |
| S2 | Signa2 Code | - | Y |
| T | Merchant Transaction Identification | Y | Y |
| TL | Time Limit until, or when, authorization expires | - | Y |
| Z | Zipcode Confirmation Request | Y | Y |

Fig. 40

Sample VMT Entry

| Voice Code * | "MAXTEN" |
|---|---|
| Merchant ID | <ANY> |
| Order Number | <NULL> |
| Not-To-Exceed | 10 |

Sample VMT Entry

| Voice Code * | "DUNKINMAXTEN" |
|---|---|
| Merchant ID | DD124 |
| Order Number | <NULL> |
| Not-To-Exceed | 10 |

Sample VMT Entry

| Voice Code * | "DUNKINFOUR" |
|---|---|
| Merchant ID | DD124 |
| Order Number | 4 |
| Not-To-Exceed | 15 |

Sample Merchant Table Entry

| Merchant ID * | Merchant Name |
|---|---|
| DD124 | Dunkin Donuts, Inc. |
| etc. | |

Sample Order Table Entry

| Merchant ID * | Order#* | Order |
|---|---|---|
| DD124 | 4 | "Lg Regular Coffee, 2x cream, zero sugar, apple fritter & choc covered creme bismark" |
| etc. | | |

| A VMT Entry | |
|---|---|
| Voice Code * | "KA-PLAH" |
| Merchant ID | ST9Z4 |
| Order Number | 1 |
| Not-To-Exceed | 20 |

A Merchant Table Entry

| Merchant ID * | Merchant Name |
|---|---|
| ST9Z4 | Kang's Klingon Kafe |

An Order Table Entry

| Merchant ID * | Order#* | Order |
|---|---|---|
| ST9Z4 | 1 | "Blood wine, traditional container, warm, no froth, dash of bitters, stirred, not shaken." |

Fig. 50

The Electric Company
975 Generating Avenue
Someplace, SomeState, SomeZip
123-456-7890 General Telephone
www.ElectricCompany.com

Sam Stubble
11235 Fibonacci Drive
City, State Zip

Dear Sam,

We appreciate you allowing us to provide your electricity in our 77th year of service.

Please pay $110.42 before October 16, 2016 for the 1123 kilowatt hours (kwh) consumed for the 30 days ending September 30, 2016.

Bill details may be found on line under your account.

Thanks again!

Tommy Zapper
General Manager
TZapper@ElectricCompany.com
10/1/2016

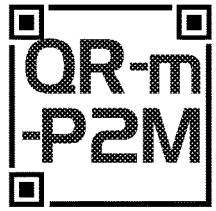

Fig. 59

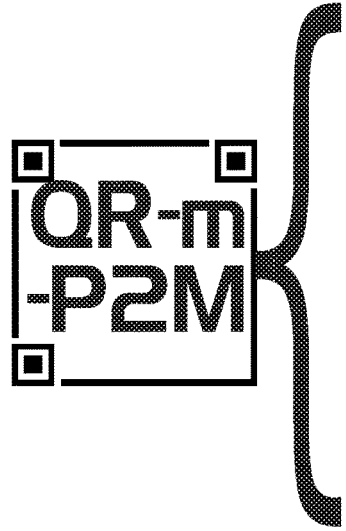

Plain text:

QR-m-P2M
The Electric Company
M:TEC8886
T:Stubble9034-20160930
P:<PT><YOURS>
$110.42 201610010300

P2M_Recipient:The Electric Company
P2M_Recip_Tel: 123-456-7890
P2M_Dep_To: TEC-Cust-NC3-Pymts
    /ABA:88664422 /acct:33557799
P2M_FBO: Stubble9034

Fig. 60

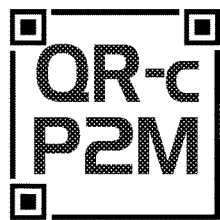
Plain text:
QR-c-P2M
M:TEC8886
T:Stubble9034-20160930
Single Encryption:
NC3: K4Nkjh6as
Double Encryption:
The Electric Company
M:TEC8886 T:Stubble9034-20160930
$110.42 201610010300
P:<PT>123-888-8888
C:Samuel Stubble
NC3:K4Nkjh6as
TL: 201610030300
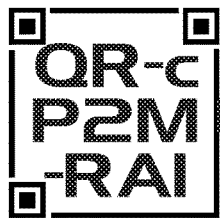
Plain text:
QR-P2M-RAI
M:TEC8886
T:Stubble9034-20160930
Single Encryption:
NC3: K4Nkjh6as
Double Encryption:
P2M_Recipient:The Electric Company
P2M_Recip_Tel: 123-456-7890
P2M_Dep_To: TEC-Cust-NC3-Pymts
　　　/ABA:88664422
　　　/acct:33557799
P2M_FBO: Stubble9034
Fig. 61
Fig. 62

SYSTEM FOR MERCHANT AND NON-MERCHANT BASED TRACTIONS UTILIZING SECURE COMMUNICATIONS WHILE ALLOWING FOR SECURE ADDITIONAL FUNCTIONALITY

CROSS-REFERENCE TO RELATED APPLICATION

This application claims priority from U.S. Provisional Patent Application Ser. No. 61/726,313, filed Nov. 14, 2012, the disclosure of which is hereby incorporated by reference in its entirety.

BACKGROUND OF INVENTION

The present disclosure is directed to systems, methods and devices for conducting physical presence or card present, e-commerce, and person-to-person transactions relating to a charge card account, and more particularly to systems, methods and devices used in conducting transactions utilizing optically based, secure, communications primarily within existing infrastructures while allowing for secure additional functionality.

DISCUSSION OF PRIOR ART

In general, charge cards provide an extraordinarily beneficial utility. Cash, credit and debit cards have an extraordinary utility in that they are usable almost everywhere. The development of a common currency was a giant step past barter and negotiation. While a shilling was a shilling, a dime a dime, a yuan a yuan, charge cards are even more usable.

However, charge cards also inherently carry with them an extraordinary potential for economic damage. The same beneficial utility makes them highly attractive to criminals. Given the increasing sophistication of cyber-miscreants it is only a matter of time before another large-scale breach reveals huge volumes of charge card information. Such breaches can be incredibly expensive to card issuers and consumers, and result in a loss of consumer confidence.

Definitions

An understanding of the subject matter herein may be enhanced via use of some basic definitions that are within general terminology relating to charge card transactions.

For instance, "Charge Card" includes credit cards, but also may include any system with similar functionality. This includes general debit cards, cards issued by and specifically for use at a particular merchant, etc. With respect to a charge card, "Card-Absent", also called "card-not-present, electronic presence or remote" transactions, refers to charge card transactions where neither the consumer nor their charge card are physically present at the merchant's point of sale (POS). Whereas "Card-Present", also called "physical presence" transactions, refers to charge card transactions where the consumer and the charge card are both physically present at the merchant's point of sale (POS).

The term "Consumer" or "Account Holder" refers to an individual, business or other group that ultimately is responsible for the payment of a charge and is associated with a charge card account. Generally the consumer is the one receiving some good and/or service in exchange for a promise to eventually pay the charge.

The term "Merchant" generally refers to the business or individual that provides a good or service in exchange for a promise to be paid. Sometimes a merchant may advance cash to a consumer during a charge card transaction. Conceptually, this is a "good," but generally such advances require additional fees to be paid by the consumer. There are at least three types of entities discussed herein that one may associate with the position of a merchant or a non-merchant that may interact with an account holder in a transaction. While one organization may exist in more than one type (for example Wal-Mart® in person or Wal-Mart® on-line), for any one transaction the merchant is one or another. Merchants may be either active or passive with further explanation below regarding the respective entities.

An "active merchant" is one where the consumer or account holder is actively connected to the merchant. This includes both card-present transactions, such as using a charge card in a grocery store when the consumer is in the physical presence of the merchant, and electronic commerce transactions such as making a purchase over the internet, by which the consumer is in the electronic presence of the merchant.

A "passive merchant" is one where the consumer or account holder is not actively engaged with the merchant either in person or electronically. A common example of this would be paying a utility bill, invoice or similar notification of payment required that the consumer received via physical mail, electronic mail, text message or courier, from the merchant.

A "non-merchant" is an entity, usually an individual person, or an organization, to whom the consumer or account holder wishes to transmit funds. A transaction between an account holder and a non-merchant also may be referred to as a person-to-person payment.

A "Provider" is a financial intermediary between the consumer and the merchant. The provider issues the card to the consumer, accepts the charge via the merchant, pays the merchant (sooner) and bills the consumer to receive payment (later). The provider charges the merchant a fee for this service. The provider also may charge the consumer a fee for possessing the charge card, for interest on unpaid balances or for other features.

Providers generally function via networks that may be connected via multiple methods including, but not limited to, wired telephones, wireless networks, cellular communications and dedicated high volume channels such as T-1, OC-1, OC-3 and higher capacities.

A "Bank" generally refers to an organization that provides services to providers who are not banks Such functionality generally is not discussed here. A provider may, or may not be, a properly chartered bank. If not, then a provider generally will be affiliated with a chartered bank to fulfill banking functions.

For "In-person Transactions" (also called "Card-present Transactions"), the consumer generally proffers a physical charge card to be scanned by the merchant. The merchant generally receives charge card information using a card scanner (also called a swiper) that reads the charge card magnetic stripe. In more recent existing systems, the charge card may contain a radio frequency identification chip (RFID tag), so the charge card only needs to be in close proximity to the merchant's card scanner. A substitute device, such as a smart phone with near field communications (NFC) enabled may be used instead of a physical charge card. This requires the device to be placed in close proximity to the merchant's corresponding NFC scanner to receive information embedded in the charge card itself or contained within a device. Some other systems require the consumer to manually enter identification elements without a physical manifestation of any form.

For "Remote Transactions" (also called "E-commerce Transactions") transactions the consumer generally proffers the charge card number, and optionally other identifiers, either directly to the merchant or to a "fourth party". The merchant generally receives payment directly from the consumer via the world wide web ("the web") using the secure hyper text transfer protocol (https:) or may receive payment via a fourth party whose purpose is to receive information from the consumer and provide payment to the merchant. The "fourth parties" are entities in addition to the consumer, the merchant and the provider.

Existing Systems

A basic knowledge of existing systems used in charge card transactions will be helpful in understanding the inventive subject matter within this disclosure. A schematic diagram is provided in FIG. 1, with the outer band of the diagram representing the merchant and non-merchant types, but breaking down the active merchants into separate card-present (physical presence) and e-commerce (electronic presence). The middle band of the diagram includes all the ways that a single consumer or account holder may pay the respective merchant-types.

The narrative text, images, examples, flow charts, diagrams, etc., presented herein generally are related to the consumer's use of a single charge card to initiate, approve, and pay a single merchant during a single transaction. Without material or significant deviation, the same schema presented herein can be used for multiple cards from the same or different providers, multiple purchases from the same merchant or different merchants, and for single or multiple transactions.

Some payment methods (middle ring FIG. 1) are available for multiple merchant-types, but none are available for all. Below are several additional issues that are briefly noted to further enhance the understanding of the operation of existing systems.

Card Information

The physical card can't be processed by non-merchants, for e-commerce or passive merchants. For the latter two the card information is provided for payment.

Direct Payments

Cash generally may be used in card-present transactions and to non-merchants. Cash generally cannot be used in e-commerce transactions. One could put cash in the mail to pay a passive merchant, but that is ill-advised. Checks generally may be used with active merchant card-present transactions, passive merchants and non-merchants. Checks generally cannot be used in e-commerce transactions. Electronic checks and electronic funds transfers are payment methods generally accepted by all merchants. These transactions are generally processed through the consumer's bank.

Fourth Party

Consumers or account holders may be reluctant to provide card information for e-commerce transactions due to security concerns. As an alternative, the consumer may elect to provide the card information to a fourth party (ex: PayPal®) and use the fourth party services for payments.

Physical Card

This is the epitome of a card-present transaction, using the charge card at an active merchant. The physical charge card generally cannot be used for other merchant types. Charge cards include credit, debit, and functional equivalents such as gift cards, WIC (Special Supplemental Nutrition Program for Women, Infants, and Children formerly known as food stamps), and others.

Substitute Cards

Some card providers may provision account holders with one-time cards for more secure electronic commerce.

Additional Aspects of Existing Systems

Certain additional aspects of existing systems will be noted to ensure a basic level of understanding needed for review of this disclosure. In FIGS. 1 and 2A, under the existing predominant communications design in use for Card-Present Transactions, the consumer communicates with the merchant and the merchant communicates with the provider through a series of steps. Referring to FIG. 2A is the consumer's traditional charge card 1a is offered 2a to the merchant who scans 3a or swipes the card with a device. The charge card information is transmitted 4a to the provider 5a for approval or denial which is communicated 6a back to the merchant who returns the card to the consumer 7a.

With respect to the existing predominant communications design in use for Electronic Transactions, FIG. 2B shows that the consumer communicates with the merchant. During payment, the consumer may communicate directly with the merchant (large or small), or be redirected from the merchant to a third party (actually a fourth party), as shown in FIG. 2C or directly to the third party independent of the communications with the merchant. The third party provides electronic commerce solutions for the merchant and communicates with the merchant and the provider. As shown in FIG. 2B this is accomplished when the consumer 1b provides order information 2b via a network 7b to the merchant 9b. The consumer receives a payment request 3b via the same network. The consumer transmits 4b payment information to the merchant who requests a charge 5b via a network 8b which might be, or might not be, the same as the previous network 7b. The provider and bank 10b informs 6b the merchant that the payment was made.

As shown in FIG. 2C, some solutions bypass the merchant for payment and require the consumer to communicate with a fourth party. This can occur as shown wherein the consumer 1c provides order information 2c via a network 7c to a merchant 9c. The merchant transmits a payment request 3c to the consumer who transmits payment information 4-1c to a fourth party 4-2c who forwards 5c the payment information to a provider and banks 10c via a network 8c which may, or may not, be the same network 7c previously utilized. The charge is confirmed 5c to the fourth party who forwards 6c the confirmation to the merchant.

For the provider to communicate directly with the consumer there would be a large scale increase in communication sessions. Instead of communicating with tens of thousands of merchants or fourth parties, they are potentially communicating with tens of millions of consumers.

The current charge card systems in use include several discrete steps in activating and completing a transaction. These steps are shown in FIGS. 3A and 3B and the arrows in the Figures indicate the direction of the action.

Card Activation

As shown in FIG. 3A, the consumer C generally applies to the provider P for a charge card. The provider P accepts and sends 1d the charge card to the consumer C. Generally the consumer C must activate, or initiate card authorization 2d of, the charge card prior to use, typically by telephone. The provider P then authorizes the card for use 3d via an automated authorizing system 4d.

Initiate Transaction

To use a credit card, the consumer selects items (goods and/or services) and presents them to the merchant. As shown in FIG. 3B, the merchant totals the amounts, adds tax or other fees and presents the Charge Amount to the Consumer.

The consumer provides the charge card to the merchant for scanning, or scans the card (generally via a magnetic card swiper) at a terminal provided, so the charge card does not leave the consumer's possession.

The necessary connections noted in FIG. 3B are: "Conn1" between the consumer and the merchant (this could be a physical, in-person connection such as in a restaurant, or an electronic connection such as with an internet purchase); and "Conn2" between the merchant and the provider (which almost always is electronic). A further "Conn3" may take place between the provider and a bank (not shown).

In older systems, the card is not scanned, but the card number and other information are manually captured on a form with an imprint, or sometimes are handwritten. In some systems, the consumer may be asked to provide a signature prior to approval.

In more recent systems, the merchant transmits the charge card scan, perhaps additional information from the charge card, their particular merchant identification and the charge amount to the provider for approval.

Processing continues as shown, based on whether the transaction is disapproved (see FIG. 4A) or approved (see FIG. 4B). This step may be waived (providing implicit approval) for low value transactions or for other reasons, and then would proceed as though approved.

Under the existing system, which is relatively content-lean, the request for approval is initiated based on what the consumer provides to the merchant and information added by the merchant. The consumer provides the consumer identification (the underlying charge card number), the expiration date, and the credit verification value (CVV) code, all generally unencrypted. The merchant adds the amount, or estimated amount, of the charge, the merchant identification and, in some cases, date, time, and the merchant's transaction identification.

Disapproved Transaction

If the transaction is not approved, as shown in FIG. 4A, then the merchant will return the charge card to the consumer and the purchase of goods and/or services is not concluded.

Approved Transaction

If the merchant receives approval from the provider, as shown in FIG. 4B, then the merchant may request that the consumer sign to indicate the consumer's acceptance of the terms. If a signature is not required (such as for a purchase below a preset limit), then the merchant advances to Provide Receipt. The signature also may have been collected during the Initiate Transaction phase, as shown in FIG. 3B. To approve, the consumer signs either a physical or printed form or on an electronic device. The merchant returns the card to the consumer. This is not required if the card never left the consumer's custody, that is, if it was scanned by the consumer.

Transactions—Batch Transmission

In existing systems, as shown in FIG. 5, if the merchant did not transmit completed transactions as those transactions occurred, then the merchant may batch transmit them at a later time. This is common in restaurants where the amount initially approved is not the amount charged, the difference typically being an added gratuity.

Security Problems of Existing Systems

Having set forth a general description of existing systems, it is important to note that there may be security problems associated with existing systems. For physical connections (Conn1), a physical charge card is required. The actual charge card number also is provided to the merchant in either physical or electronic connections.

If the consumer name, card number, expiration date, etc., are retained by the merchant, then the consumer is exposed to unauthorized charges if the merchant's electronic records are improperly disclosed. Once compromised, the charge card information may be used repeatedly. While the consumer has some level of financial protection, it is still a painful experience and inconvenience for the consumer and may be expensive for the merchant and provider in time, money and loss of consumer confidence.

Further, criminals can affix devices to automated teller machines (ATM) or similar devices that scan charge cards. These devices copy the complete magnetic stripe information for potential unauthorized use.

The charge card number, expiration date, etc., by themselves have little limiting their usage context. That is, the information is not context sensitive and can be used in many places and for many different transactions. It is almost like currency but, unlike a physically manifested item, this information can be electronically transmitted around the world in seconds for global misuse.

Bypassing Merchant

Attempts have been made in much of the prior art to provide increased security for the charge card number by connecting the consumer directly to the provider, thereby bypassing the merchant. The downside of bypassing the merchant is that provider communication requirements increase considerably. Multiple access points are used by providers to communicate with tens or hundreds of thousands of merchants each day. Some merchants are communicating many times an hour, while others may be only once a week. Potentially, providers could need to increase communications capacity by two orders of magnitude to provide reasonable service levels for the hundreds of millions of card holders.

Complex Cards

Some prior art systems attempt to provide increased security by creating a charge card much more complex than the piece of business card-sized plastic with plain text charge card numbers (either raised or printed) and a magnetic stripe on the back. Whether they require biometric information for authorization or other input, they all still provide the charge card number. Alternatively, some systems require additional terminals that are not complex charge cards.

One-Time Charge Cards

Some prior art systems allow a consumer to acquire a batch of temporary card numbers for one-time on-line use. They also may include "grouped" cards and "limited use" cards. Others describe methods for a consumer to acquire a temporary charge card number for a one-time on-line transaction. This is not efficient, as it requires significant additional actions by the consumer above and beyond presenting a charge card. Somewhat similarly, some other prior art systems require pre-registration, where consumers must have an authorization created in advance, increasing the number of communications.

Transaction Security

Some prior art may include two or more non-secure networks to complete a transaction. This causes an increase of required communications, and potentially a bottleneck in transaction processing, while having no card-present application.

Other prior art may include use of a passport agent, in addition to the merchant. Creation of the passport agent assists the consumer in avoiding repetitive entry of the consumer's information. It also establishes another location for the consumer's underlying charge card number (UCCN). A breach of the passport agent's data stores could compromise many UCCN. If the concept were applied to a physical presence transaction (card-present), then each transaction would be delayed while waiting first for the UCCN from the passport agent and then for the provider's approval.

There also may be automated payment systems for purchases over a network, such as the Internet. Transaction information is protected, but it exposes the underlying charge card number to a party other than the consumer and the merchant. It also has no applicability to card-present transactions.

Near Field Communication Weaknesses

Some of the prior art includes non-contact (or contactless, wireless, Near Field Communication (NFC) and/or Radio Frequency (RF) identification) methods of communicating. Note that all of these methods include communication by a field being radiated in an omni-directional electromagnetic field, thus they are susceptible to interception.

However, NFC systems use both a passive and active mode between the initiator (sender) and the target (recipient). In sending a message, the initiator is in an active mode (generating an RF field) and the target is in a passive mode (receiving the RF field). Each device changes roles depending on whether it is sending or receiving. Unfortunately, when NFC devices communicate, they use omni-directional RF waves. An augmented snooper antenna also may receive the transmitted signals. Presumably, the offset to this is the low power of NFC communication that is generally accomplished over short distances, such as about four inches. A passive mode is preferred for security, but an active mode may be required, depending on the actual distance between the intended sender and receiver. The unfortunate counter to this is that a snooper may reduce, or overcome this, with specific antenna geometry, position from the transmitter, and equipment more powerful than standard.

NFC systems also may fall victim to a miscreant who employs a jammer, to alter transmitted data, so that the intended receiver is not able to understand the data sent by the other device. Presumably, the offset to this may be that jammers are generally of higher than expected power and if the NFC device is equipped to be able to check the power level and finds it to be too high, then the communication may be terminated.

Another issue that may arise with NFC devices is that a miscreant may attempt to inject some data into the stream. The data may be formatted properly and would belong there, but for the fact that the data is not from the sender, so it is counterfeit. Possible offsets may include power detection, such as noted with the jamming devices.

Also, in a normal situation, the consumer communicates with the merchant. Thus, a fake middleman may get in between, pretending to the consumer to be the merchant, receiving the consumer's information, perhaps modifying it, then passing it on to the merchant. Similarly, the fake middleman may receive information from the merchant, perhaps modifying it, then passing it on to the consumer. Offsets to this may include complexity, given that the initial negotiation between the consumer and the merchant includes frequency and other exchanges. Also, with appropriate sophistication of the devices, the presence of two senders should be detectable.

RFID Weaknesses

RFID enabling decreases time for a transaction, but there may be security weaknesses. RFID enabled elements are subject to sniffing (also called skimming), which is the practice of using non-authorized technology to query an RFID enabled element to inappropriately receive the information. Other issues include that RFID tags generally are application specific, and no one tag fits all. Further, RFID tags generally are programmed with information and that information remains in the tag until replaced by a device external to the tag, presenting a problem in the event of a lost or stolen tag. Finally, more than one tag can respond to a query at the same time.

The Need

With this understanding, unlike past and existing efforts to increase charge card security, important to the disclosure herein is recognition of the likelihood that a charge card eventually may be compromised. It would be advantageous to provide a system and methods that do not permit access to the full beneficial utility of a charge card at any time. By analogy, if crooks are eventually going to breach a vault, then why put the jewels there in the first place? Indeed, this leads to a step that is not in keeping with the teachings in the prior art, but rather seeks to address a need for a consumer to be able to create a precise currency equivalent, on an as-needed basis. It would be desirable for such a precise currency equivalent to context sensitive, thus only to be usable at one merchant, for one amount or for a preset limited amount, for one specific transaction, for a specific day, and valid for only a limited time. This would remove a criminal's incentive, because criminals would not want to steal a currency that is so limited in its value and its potential use.

There also is a need for charge card transactions to be completed without the consumer ever revealing his or her charge card number to the merchant. In person, or for electronic transactions, it would be beneficial if the charge card number is never exposed. Even a breach of the merchant's files then could not expose the charge card numbers, because they would not be there. Consumers and charge card companies would be protected from additional, and unauthorized, use. It further would be beneficial if a solution could be utilized to process transactions for active (physical and electronic) merchants, passive merchants and person-to-person payments with equal ease, thereby making transactions easier for consumers, merchants and providers alike, while at the same time increasing security, reducing operational costs, and providing for new capabilities.

SUMMARY

The systems and methods disclosed herein provide the aforementioned desired advantageous features and functionality to be utilized in conducting card present, e-commerce, passive merchant and person-to-person transactions relating to a credit card account. The systems and methods disclosed herein may be employed in conducting transactions utilizing optically based, secure, non-radiating communications primarily within existing infrastructures while allowing for secure additional functionality. The disclosure goes beyond the normal next generation of incremental security and utility improvements in providing a system called "NC3", the No Compromise Charge Card.

Fundamental Differences

The fundamental differences between a standard charge card and the existing methods of processing transactions and the system and methods disclosed herein are generally summarized in a schematic diagram in FIG. 6, and are set forth in a table, in FIG. 7. A key overarching distinction includes that, in the existing systems no single interaction serves all merchant and non-merchant types, whereas the NC3 system and methods disclosed herein do.

A single internal application, on a smart phone or functionally equivalent apparatus, represents program code that enables the processor to determine if the application is in an application mode for performing data transactions, with external entities comprising both types of active merchants, passive merchants and non-merchants. Those data transactions include obtaining and processing a request for funds, requesting and obtaining authorization from the account holder to pay that request, generating, formatting and communicating such an approval using the communications functions in the apparatus, to convey the authorization to the requester of the funds.

Although the behind-the-scenes operations are different, the consumer or account holder experience is significantly enhanced to include greater ease of use, and rapid transactions. Indeed, instead of multiple different interfaces between merchant and non-merchant types, there is just one and that makes for much simpler interactions.

One also must keep in mind that a charge card provides both a visible account identifier and an unchanging, potentially context-free, authorization. Literally the account number, expiration date and other information on the card can be used with little or no constraint by a criminal.

Under the NC3 system, the existing visible account identifier and unchanging, potentially context-free authorization on a single charge card are separated into two separate elements. The first being an encrypted consumer identifier that does not reveal the underlying charge card number. The second being an encrypted, dynamic, content-rich transaction authorization that is restricted to a single merchant, for a specified amount, for a specified transaction, on a specific day and valid only for a specific duration, thus being highly "context-sensitive". These concepts are further discussed herein.

The NC3 process is based around three steps: Receive, Approve, Pay. A consumer will receive (either physically or electronically) an invoice (charge slip or similar), will approve it, then pay it.

Non-Contact

The mobile terminal device, or apparatus, of the NC3 system uses an optical non-contact communication for proffering, displaying, or sending and obtaining, scanning or obtaining the graphic matrix codes designed for optical scanning to accomplish a transaction with an external entity, but the optical method does not generate omni-directional radiating fields capable of easy interception. Visible light operates in a different section of the electromagnetic (EM) spectrum. In order from longer to shorter, here are some elements of the EM spectrum: ultra-long wavelength radio waves used to communicate with submarines, long-wave, short-wave, VHF radio and television, UHF radio and television, microwaves, infra-red, visible light, ultra violet light, x-rays and gamma rays.

Process all Merchant/Non-merchant Types

The single NC3 system and methods can use the consumer's mobile terminal, generally a smart phone or functional equivalent, to process card-present, e-commerce, passive merchant and person-to-person payments with equal ease and security. This alternatively may be referred to as having the capability to conduct transactions with an active merchant entity, where the consumer or account holder is in the physical presence or electronic presence of the merchant, or a passive merchant entity where the consumer or account holder may have received an invoice, bill or other similar notification of payment required via physical mail, electronic mail, courier or other means, but the merchant is neither in the physical presence or electronic presence of the merchant, or a non-merchant entity which may be a person or an organization (generally used to refer to all other forms of entities) to whom the consumer or account holder wishes to convey funds.

Operating Efficiencies

Operating efficiencies provide improved card-present transaction processing by the merchant and an improved internet clearinghouse. The improved clearinghouse can capture a significant portion of the nearly four billion dollars in annual fees from e-commerce processing.

Other Attributes

Other attributes include NC3's resistance to compromise, and other increased security elements that reduce or prevent the possibility of individual consumer loss, as well as reduce or prevent extraordinary expenses from incidents of large-scale charge card information compromise. These advantages result in major, sustainable, competitive advantages for the provider.

Aspects of the Disclosure

In a first aspect, the disclosure presents a method for performing wireless financial transactions which separates an account identification and transaction authorization from a single charge card into two separate elements, which include at least an encrypted account identifier and a transaction-adaptive, context sensitive, dynamically content-rich, transaction authorization. The method includes the steps of: starting an application on an account holder's apparatus, and having the application determine whether the apparatus is in an application mode for performing data transmissions to accomplish a transaction with an active merchant entity, a passive merchant entity, or a non-merchant entity. The method further includes acquiring details of a request for funds from one of the respective entities, obtaining authorization from the account holder to permit payment of such a request for funds, performing internal operations to generate an authorization for payment to the respective entity, and initiating and completing communication of the authorization to the respective entity from which the request for funds was acquired.

In a second aspect, the disclosure presents a non-transitory computer program product for use in performing wireless financial transactions which separates an account identification and transaction authorization from an account holder's single charge card into two separate elements, which include at least an encrypted account identifier and a transaction-adaptive, context sensitive, dynamically content-rich, transaction authorization. The non-transitory computer program includes a computer usable medium having computer program logic recorded thereon for execution by a processor, program code in the medium for enabling the processor to start an application on an apparatus, wherein the program code enables the processor to determine whether the application is in an application mode for performing data transactions with external entities comprising an active merchant entity, a passive merchant entity, or a non-merchant entity. The application includes an internal application for acquiring details of a request for funds that is generated by one of the entities or the account holder, obtaining authorization from the account holder to permit payment of the request for funds, performing internal operations to provide an authorization to the requester of the funds, and initiating and completing communication functions in the apparatus to convey the authorization to the requester of the funds.

In a third aspect, the disclosure presents an apparatus for use in performing wireless financial transactions which separates an account identification and transaction authorization from an account holder's single charge card into two separate elements, which include at least an encrypted account identifier and a transaction-adaptive, context sensitive, dynamically content-rich, transaction authorization. The apparatus includes an optical scanning module, an optical display module, a communication module, and a central processing unit coupled to the communication module and configured to start an application on the apparatus. The apparatus also includes a program code in a computer usable medium enabling the processor to determine whether the application is in an application mode for performing data transactions with external entities comprising an active merchant entity, a passive merchant entity, or a non-merchant entity. The application includes an internal application for acquiring details of a request for funds that is generated by one of the entities or the account holder, obtaining authorization from the account holder to permit payment of the request for funds, performing internal operations to provide an authorization to the requester of the funds, and initiating and completing communication functions in the apparatus to convey the authorization to the requester of the funds.

In a fourth aspect, the disclosure presents a mobile terminal device for use in performing wireless financial transactions which separates an account identification and transaction authorization from an account holder's single charge card into two separate elements, which include at least an encrypted account identifier and a transaction-adaptive, context sensitive, dynamically content-rich, transaction authorization. The mobile terminal device includes a processor, an optical scanning module, an optical display module, a communication module, and a memory including executable instructions. The memory and the executable instructions are configured to, in cooperation with the processor, cause the mobile terminal device to execute at least: starting an application on the mobile terminal device, capturing via optical scanning a graphic matrix code comprising a request for funds, obtaining authorization from the account holder to permit payment of the request for funds by confirming the information in the request for funds and obtaining authorization for the payment of the funds, performing internal operations to provide a graphically-based or mixed encrypted text authorization for the requester of the funds, and displaying the graphically-based authorization for scanning by an active merchant entity in a physical presence, or transmitting the graphically-based or mixed encrypted text authorization to an active merchant entity in an electronic presence, a passive merchant entity or a non-merchant entity.

In a fifth aspect, the disclosure presents a wireless data transaction system for use in performing wireless transactions which separates an account identification and transaction authorization from an account holder's single charge card into two separate elements, which include at least an encrypted account identifier and a transaction-adaptive, context sensitive, dynamically content-rich, transaction authorization. The wireless data transaction system includes at least one mobile terminal device including a memory module and a processor wherein in response to starting of an application, the application determines whether the device is in an application mode for performing data transactions with external entities comprising an active merchant entity, a passive merchant entity, or a non-merchant entity, and conducts wireless optical transmission and/or text messaging transmission with at least one of the external entities, wherein the at least one mobile terminal device provides at least one non-omni-directional data transmission to accomplish a transaction with the at least one external entity.

In a sixth aspect, the disclosure presents a device for use by an active merchant in the physical presence of an account holder in performing wireless financial transactions which optically scans graphic matrix codes displayed by an apparatus that separates an account identification and transaction authorization from the account holder's single charge card into two separate elements, which include at least an encrypted account identifier and a transaction-adaptive, context sensitive, dynamically content-rich, transaction authorization.

In a seventh aspect, the disclosure presents a mobile terminal device for use in performing wireless transactions which separates an account identification and transaction authorization from an account holder's single charge card into two separate elements within text of mixed encryption, which include at least an account identifier and a transaction-adaptive, context sensitive, dynamically content-rich, transaction authorization. The mobile terminal device includes a processor, an optical scanning module, an optical display module, a communication module, a memory including executable instructions, the memory and the executable instructions being configured to cooperate with the processor. The text of mixed encryption includes an environment un-encrypted plain text, single encrypted text and/or single encrypted text that has been subsequently encrypted with a second encryption to generate double encrypted text.

In an eighth aspect, the disclosure presents a mobile terminal device for use in performing wireless transactions which separates an account identification and transaction authorization from an account holder's single charge card into two separate elements, which include at least an encrypted account identifier and a transaction-adaptive, context sensitive, dynamically content-rich, transaction authorization. The mobile terminal device includes a processor, an optical scanning module, an affiliated code display module, a communication module, a memory including executable instructions, the memory and the executable instructions being configured to cooperate with the processor, and the affiliated code display module is configured to display graphic matrix codes simultaneously with text and/or other codes.

It is to be understood that both the foregoing general description and the following detailed description are exemplary and provided for purposes of explanation only, and are not restrictive of the subject matter claimed. Further features and objects of the present disclosure will become more fully apparent in the following description of example embodiments and from the appended claims.

BRIEF DESCRIPTION OF THE DRAWINGS

In describing the preferred examples, reference are made to the accompanying drawing figures wherein like parts have like reference numerals and letters, and wherein:

FIG. 7 shows a table comparing elements in existing charge cards to the NC3 system.

FIG. 8 shows a table with the dots and dashes of known Morse Code.

FIG. 11 shows a generic representation of a QR-m code (m for merchant).

FIG. 12 shows a generic representation of a QR-c code (c for consumer).

FIG. 13 shows an actual Quick Recognition (QR) Code.

FIG. 14 shows an example of known charge card scanners/swipers.

FIG. 32 shows a table of possible results from two elements with two possible states. FIG. 33 shows multiple electronic pending pools stratification by merchant identification. FIG. 34 shows a schematic diagram of known communications efficiency in a retail operation.

FIG. 35 shows a schematic diagram of NC3 communications efficiency in a retail operation.

FIG. 36 shows a schematic diagram of known communications efficiency in a restaurant operation.

FIG. 37 shows a schematic diagram of NC3 communications efficiency in a restaurant operation.

FIG. 38 shows a table of NC3 communications efficiency under several levels of transactions per batch.

FIG. 39 shows a table of abbreviations used that begin with "QR".

FIG. 40 shows a table of codes used, a brief description, and where they are expected to appear.

FIG. 50 shows tables affected for a non-English language voice command.

FIG. 59 shows a receipt with a QR-m-P2M person-to-merchant code under the NC3 system.

FIG. 60 shows a QR-m-P2M code and its plain text equivalent under the NC3 system.

FIG. 61 shows a QR-c-P2M code and a QR-c-P2M-RAI code and their plain text equivalents under the NC3 system.

FIG. 62 shows the screen of a smart device displaying an affiliation reference and a QR-c code under the NC3 system.

Figure 1:
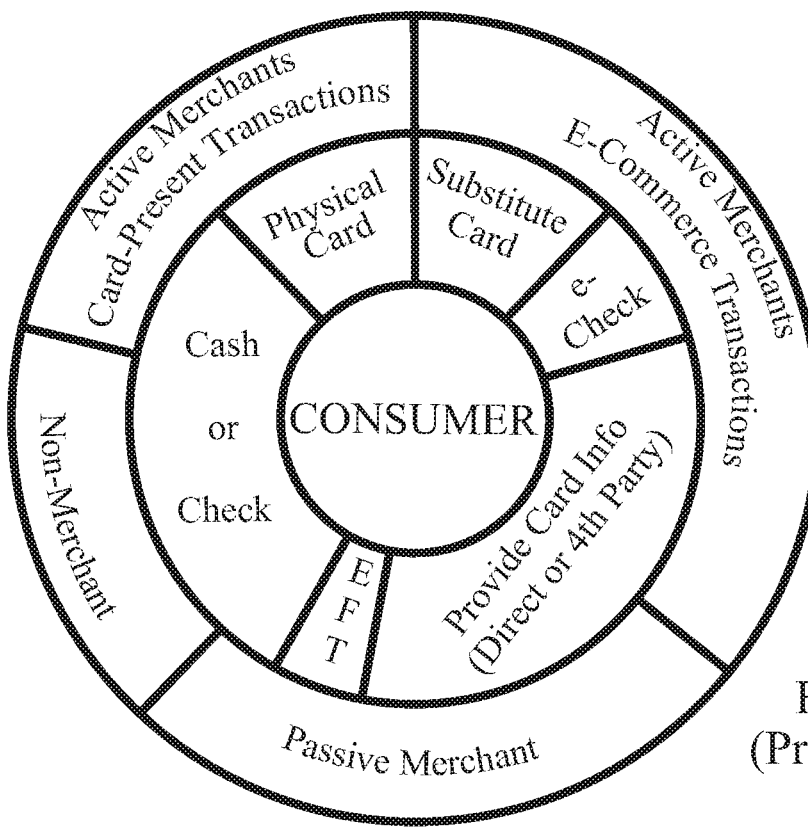
FIG. 1 shows a schematic diagram of known system types of transactions.
Figure 2A:
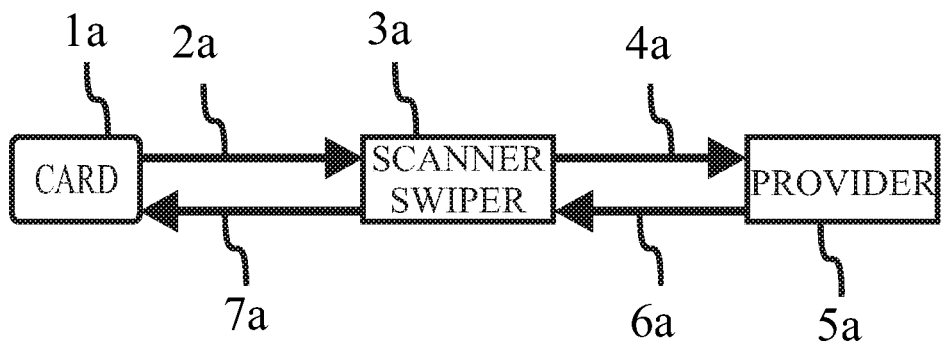
FIG. 2A shows known communications for Card-Present transactions.
Figure 2B:
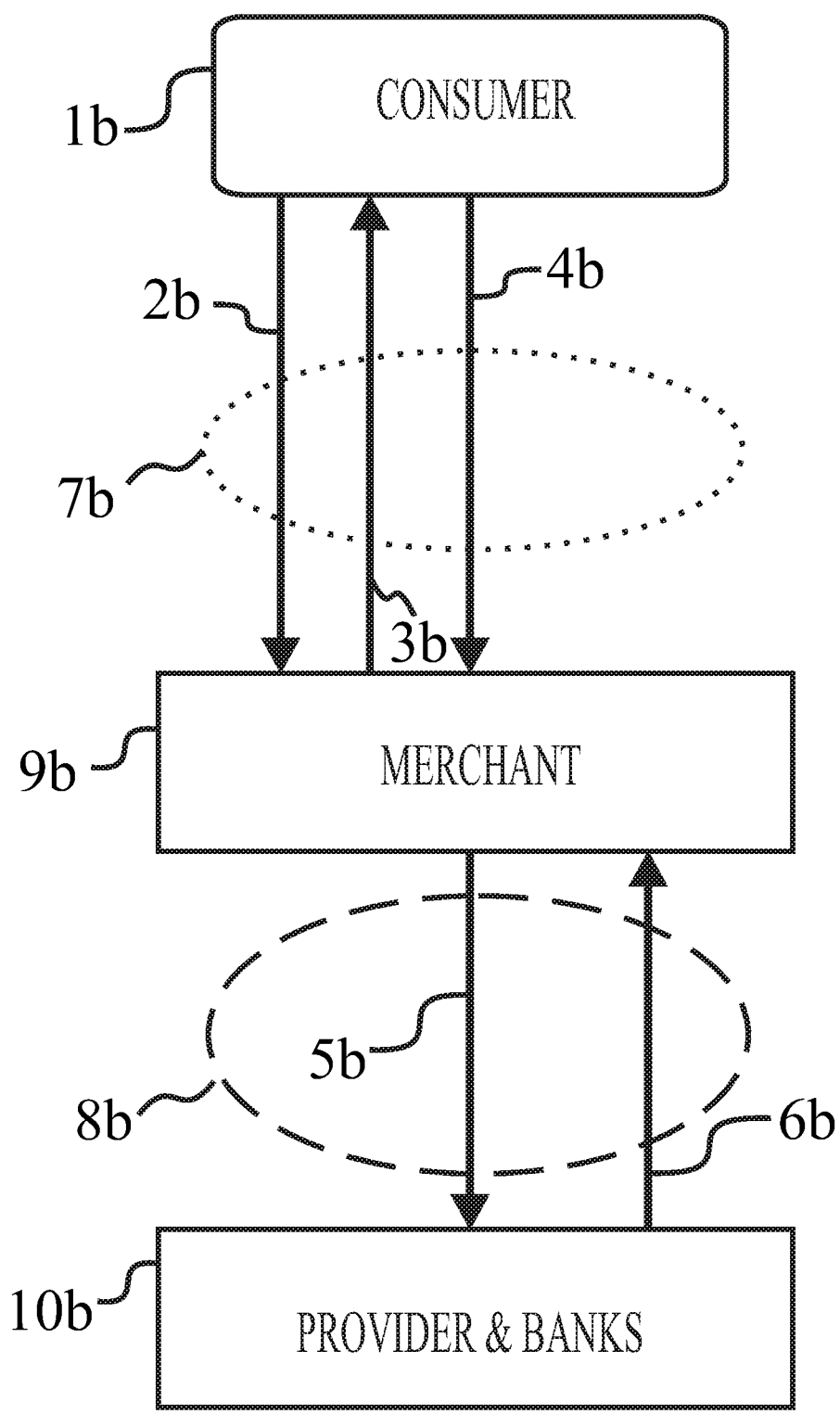
FIG. 2B shows known communications for Electronic transactions.
Figure 2C:
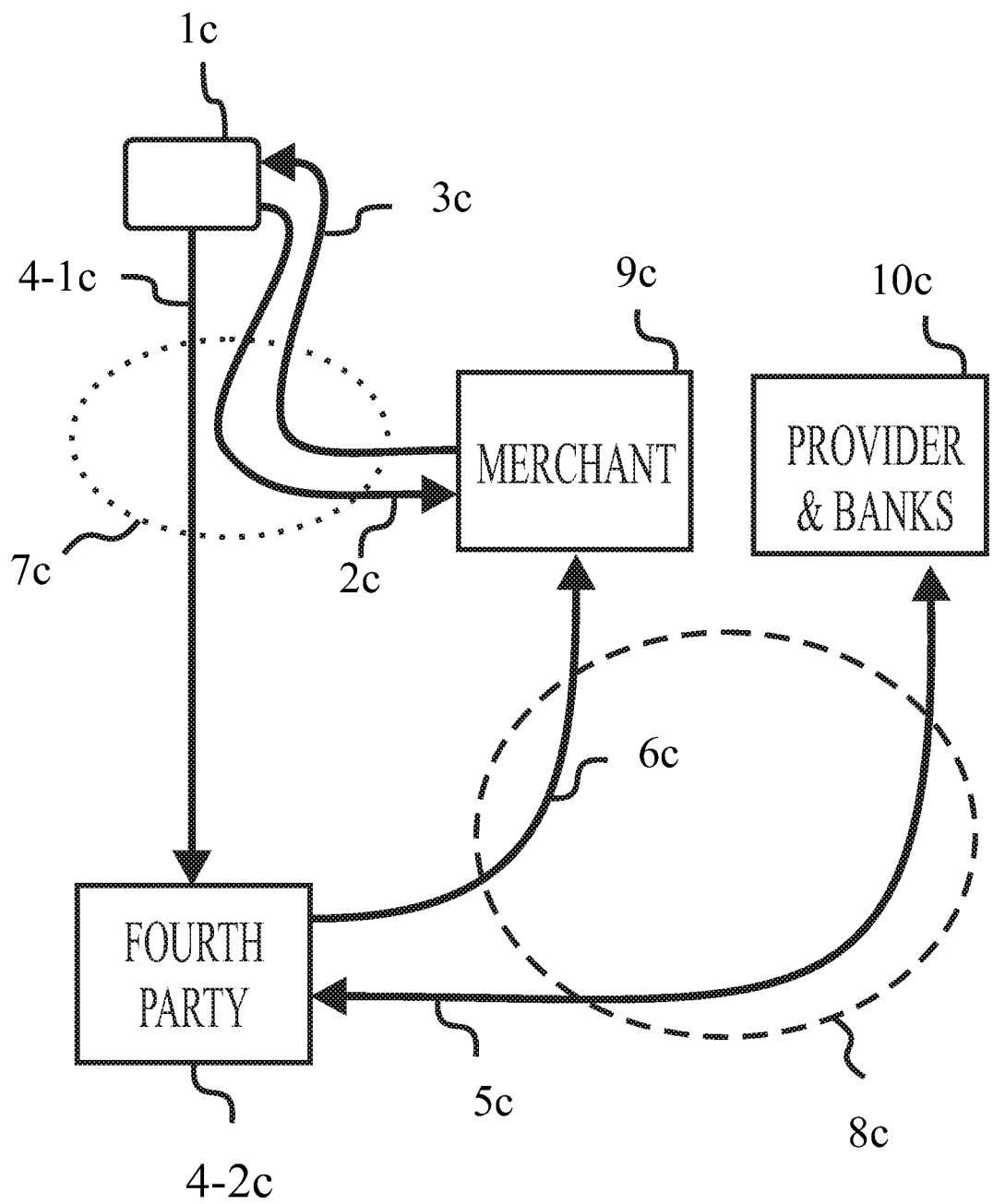
FIG. 2C shows communicating by bypassing the merchant in some known systems.
Figure 3A:
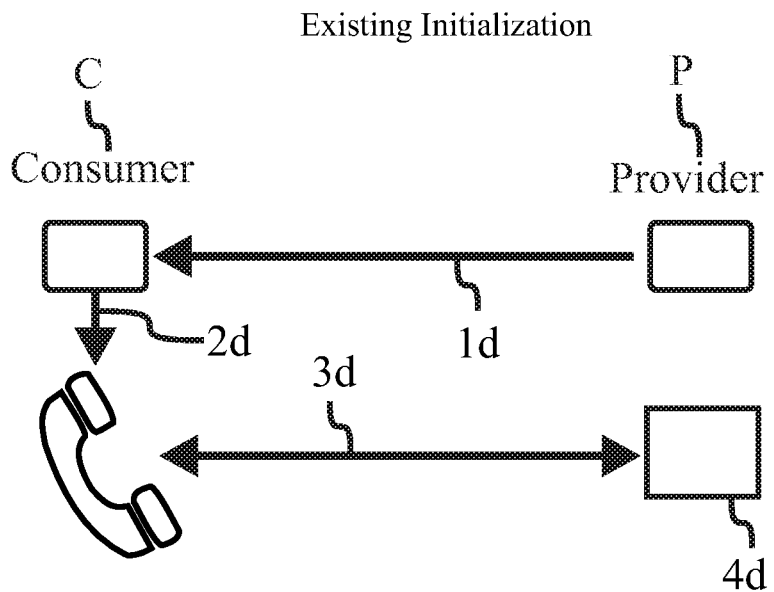
FIG. 3A shows receiving and activating a charge card in known systems.
Figure 3B:
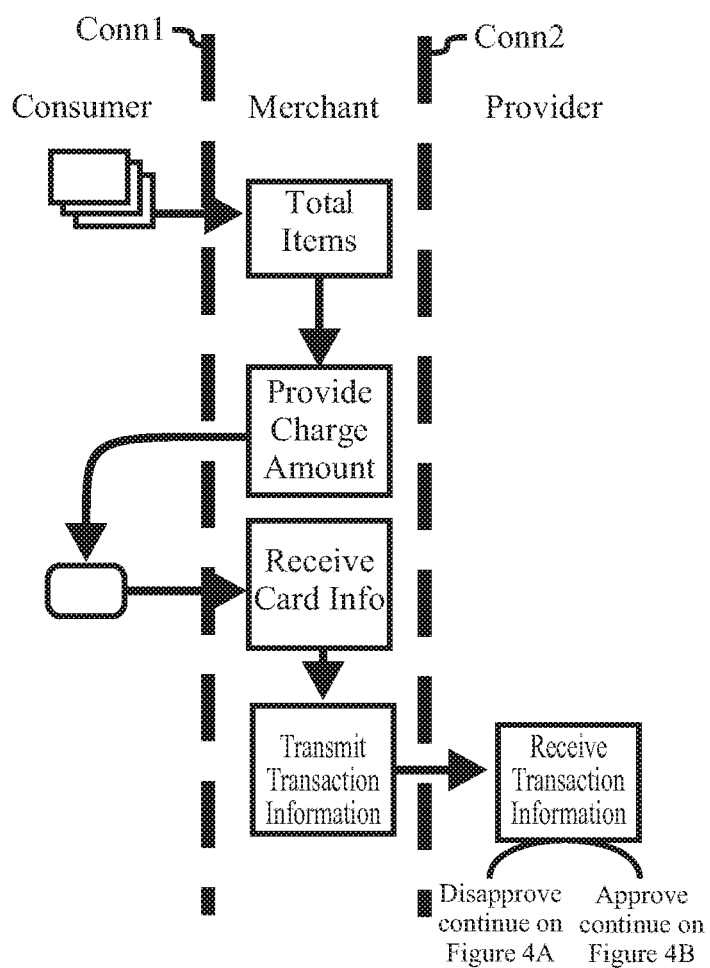
FIG. 3B shows initiating steps of a transaction in known systems.
Figure 4A:
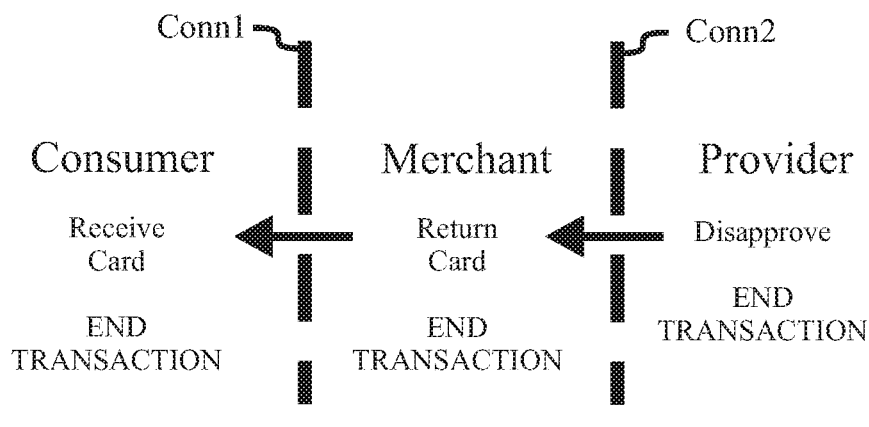
FIG. 4A shows a transaction disapproved in known systems.
Figure 4B:
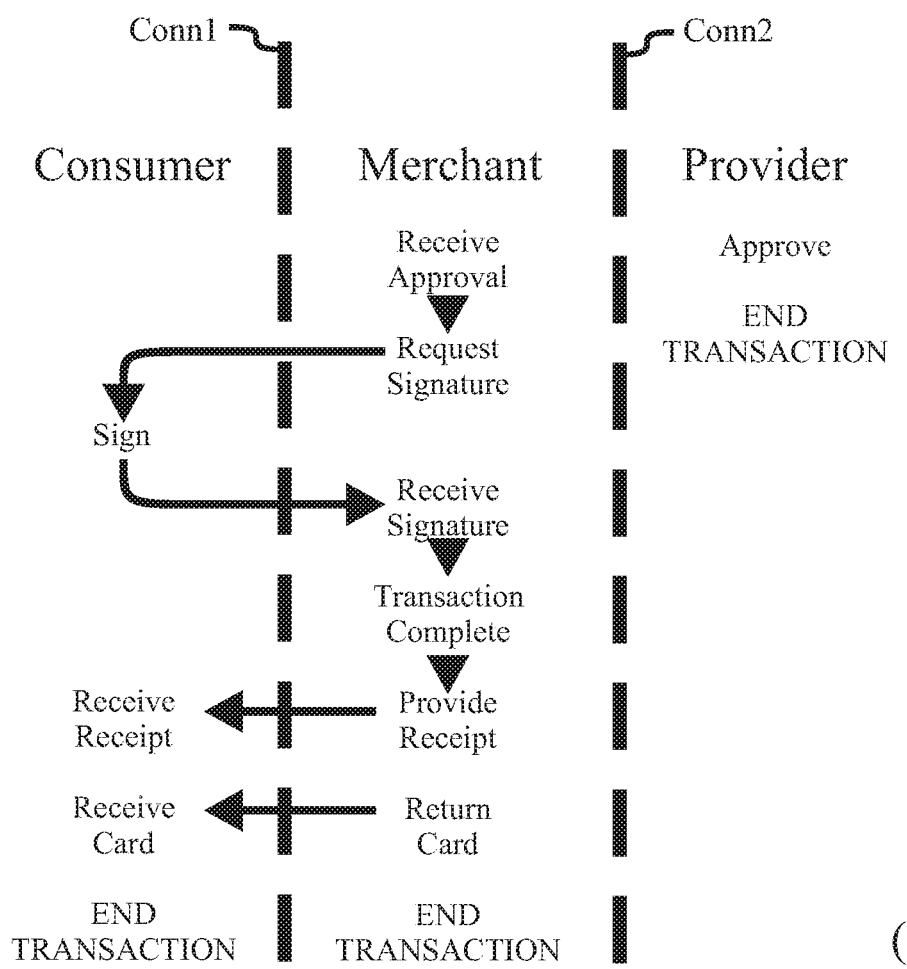
FIG. 4B shows a transaction approved in known systems.
Figure 5:
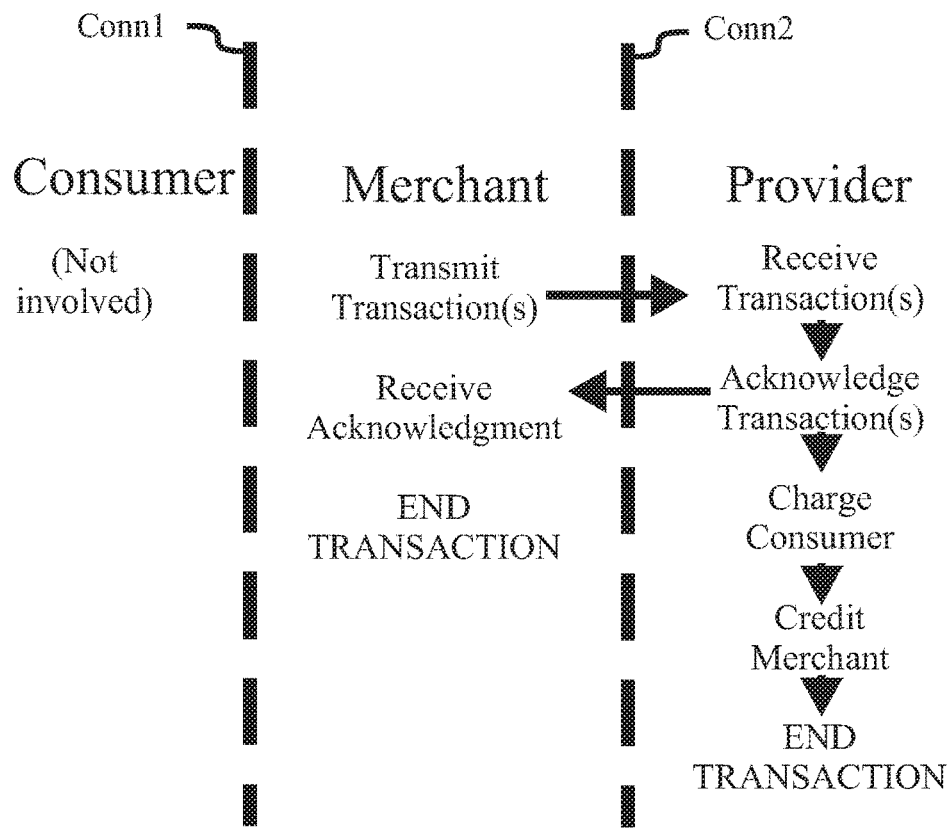
FIG. 5 shows steps to complete an approved transaction in known systems.

Corresponding or related terms and reference numerals or reference symbols indicate corresponding items or parts throughout the several views. Although the drawings represent exemplary embodiments of the present disclosure, the drawings are not necessarily to scale and certain features may be exaggerated or removed to better illustrate and explain the present disclosure.

DETAILED DESCRIPTION

Examples of the present subject matter are disclosed herein. However, it will be understood that the disclosed examples merely are exemplary, and may be embodied in various forms. Therefore, specific details disclosed herein are not to be interpreted as limiting, but as illustrative of various aspects of the present subject matter.

The NC3 system and methods include use of an NC3 code. The NC3 code is a replacement code to identify the consumer to the provider without giving the charge card number and ancillary information to any intermediary, including the merchant. Its advantages come from its use in creating a charge authorization that is specific to a merchant, a specific amount or predetermined limited amount, a date, and a time or time period. Thus, while a charge card provides a visible account identifier and a context-free authorization, literally permitting the account number, expiration date, name and other information on the charge card to be used without constraint, the NC3 system separates the two elements into an encrypted account identifier and a transaction-adaptive, context sensitive, dynamically content-rich, transaction authorization.

A new NC3 code can be electronically provisioned while the underlying charge card number can only be replaced with the provider's human intervention. Indeed, re-provisioning the NC3 code more than once in a card's lifetime increases security.

Creation of an NC3 code includes two important elements: 1) each NC3 code is unique within the system; and 2) no whole attributes (as opposed to fractions of an attribute) should be included, so as to preclude the NC3 code from being reverse engineered to reveal the component elements. Also, the processing for creating an NC3 code is done at the secure provider.

Creation of an NC3 code also could be attribute-based. The NC3 code could be generated as a function of the card attributes, device attributes and the date and/or time the code was created. The possible card attributes include the charge card number, consumer's name, expiration date, credit verification value (CVV) code, and perhaps more. No whole attributes should be used, only fractions of attributes. The device attributes may include device name, unit identification and may include additional attributes, depending on the device.

The NC3 code could be completely randomly generated. This is the preferred method as true random generation defies crypto-analysis. In a large population, random elements could repeat. A mixture of partial attributes and random elements would be the best to create NC3 codes that are unique and contain nothing of value in and of themselves.

It may be beneficial to prepend the provider code to the actual NC3 code. So, if 4673 was the code for a person's provider, then the NC3 code would be 4673xxxxxx. This would have benefits in easily routing transactions to the provider for the paying consumer. It might also be a desirable standard to place the provider code in the plain text section for faster processing.

Storage and Camouflage

Storage and camouflage of NC3 code information could be extremely advantageous. The information could be stored in a base64 code [a:z A:Z 0:9 and two special characters]. This allows for some brevity and camouflage as six numerals 0 through 9 can be expressed by 4 characters in base64 easily. This is not a numerical conversion where 1 base10=1 base16, but a table based translation, using a table such as in FIG. 9. Such a translation is sometimes called a transposition cipher.

Such ciphers are susceptible to frequency analysis, but that frequency often is different from application to application. Old style manual compositors arranged on Linotype machines had an order of etaoin shrdlu cmfwyp vbgkjq xz based on their experience.

Morse Code was created so the most common characters required the least transmission time. Dots went faster than dashes. Fewer of either went faster than more of either. Morse order was e it san hurdm wgvlfbk opjxcz yq (see FIG. 8), different from the frequency based on Linotype usage.

Information within an NC3 data group (such as QR-m and QR-c codes discussed herein) is a mix of characters and numerals. Given that it is not a complete language, but numerals, names and codes, it will be resistant to frequency analysis based on a normal language usage.

Using different translations in the population makes for inconsistent samples (ie: the samples are not representative of the population) which is a detriment, perhaps a defeat, to frequency analysis. Encrypting the material increases resistance to frequency analysis. Using different encryptions in the population also makes for inconsistent sampling which is a detriment, perhaps a defeat, to frequency analysis.

A Base64 Example presents one manner of using this form to translate a charge card numerical sequence for brevity and security. For this example, consider a telephone number:

715-522-8412

The highest value in base 64 is 63 (base numbering starts with zero) so higher numbers are separated into parts each of whose value is less than 64. The telephone number would break down to:

7 15 52 28 41 4

Figures 9, 10:
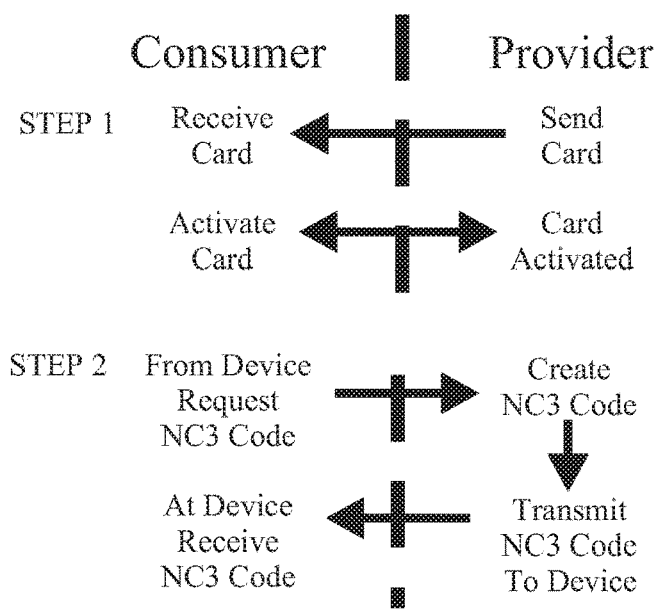
FIG. 9 shows an example transposition cipher.
FIG. 10 shows obtaining and activating an NC3 code.

Using the sample translation table shown in FIG. 9, the base 64 equivalent would be:

| initial | 7 | 15 | 52 | 28 | 41 | 4 |
|---|---|---|---|---|---|---|
| translated or | 7 | f | Q | s | F | 4 |
| initial | 715-522-8412 | | | (10 characters, not counting dashes) | | |
| translated | 7fQsF4 | | | (6 characters) | | |

The 10 original numbers in base10 are represented by six base64 characters for some measure of data compression. Clearly, this would be an error prone sequence for humans so the code sequence is processed only by machine. Indeed, it is noteworthy that the NC3 codes are designed to be used only by machines.

The example table shown in FIG. 9 is only for conceptual understanding, not actual use. Having the base64 numbers zero through nine match the base10 sequence is poor concealment. An actual table for use might have characters appear randomly with the equivalence table. For instance, in the example table shown, 12 is "c" and 13 is "d". In a random table, 12 could be "G" and 13 could be "2". Every element of non-order increases security.

While some systems can process high-order ASCII values for a base up to 255, that is not recommended. Lowest ASCII values include non-printable characters and control codes. Better to use a solid 64 than a questionable higher-value. The base64 equivalents also could be a single table generated at random, or a family of tables with the index to the appropriate table as an element of the NC3 code, or from a digit of the associated consumer's underlying charge card number (UCCN) which is not available outside the provider's control.

There are many options regarding the order of information, coding, self-encryption, check digits, etc. A name could be number shifted (ex: fshift–1(IBM)=HAL) and chopped into parts stored at different locations. Many options are possible and may be selected, as desired.

UCCN not Retained by Device

If the consumer's NC3 code is communicated via a QR-p code (p for provider) using the provider's web site, as discussed further below, then the consumer's underlying charge code number (UCCN) is never entered into, and therefore, never retained by the device. This is true for initial and subsequent NC3 provisioning. If the NC3 code is communicated via another manner, the charge card number and related information are entered by the consumer only during the NC3 initialization process. Once the NC3 code is received, the charge card number is totally purged from the consumer's device. If the consumer desires a new NC3 code, the consumer must re-enter the charge card number and related information, which then again is purged. Both communication methods allow the device to be useful as a charge card without ever exposing the card information to merchants.

Longer Term NC3 Code Retention

With respect to longer term NC3 code retention, in some form of near-line or off-line storage, the provider will retain inactive NC3-UCCN linkages so that merchants who have charge-backs or problems with a consumer can still reference that consumer via the NC3 code. However, such retained linkages are not allowed to authorize transactions. In addition, retention duration is to be determined and should be no less than an estimate based on the historical duration of merchants seeking consumers for error resolution.

Having previously described the discrete steps in activating and completing a transaction with an existing charge card system, attention now is turned to the steps for the NC3 system and methods, again with the arrows indicating the direction of the action.

Activation

There are two steps to activating the NC3 code on a device, which are shown in FIG. 10.

Step 1 includes regular activation, which is similar to the existing process for receiving a charge card. Step 2 includes NC3 code acquisition. The second step is to use the device (an apparatus, comprising a smart phone, portable computer or electronic device having scanning functionality and software to interpret scanned optically-based codes and communication capabilities) to request an NC3 code.

An NC3 code can be used as long as the card associated with it is viable. An NC3 code can be used for a day and a new one created. Only active, non previous, NC3 code(s) reside in the device. The provider also transmits the consumer's name during this process. There is no provision for the consumer to change the name on the account. If the device provides a unique identifier for itself, the identifier should be made (in whole, in part, via hash or other means) part of the code. This also is called NC3 Code Provisioning.

The easiest mode to obtain an NC3 code is to have the consumer initiate a request from the provider's secure https web connection. After the consumer logs into the consumer's account, the consumer requests a new code, a QR-p code (p for provider), which is transmitted by the provider to the consumer's device, where it is displayed, read and logged by the consumer's device. The QR-p code could contain encrypted information that is decrypted by the application running in the consumer's device.

Prior to obtaining the NC3 code, the consumer must obtain from a trusted source an "application" or "app". This is a non-transitory computer program product for use in performing wireless financial transactions, as described herein, which includes code appropriate to the operating system of the consumer's device, which is in the form of a smart phone, computer or other mobile terminal that possesses the ability to receive and store such program logic for execution by the device's processor at the consumer's request to accomplish the tasks described herein.

There are other modes for NC3 code transmission including audio tone sequence which is heard by the consumer's device, a data connection, verbal instructions to the consumer to be entered on the keypad, or almost any other mode. The less difficult, the better, but this is an infrequent process and increased security is worth the slight and short lived pain associated with periodic NC3 code acquisition.

Quick Recognition (QR) Codes

One particularly advantageous use of technology within the present systems and methods is the use of machine readable codes. Use of bar codes started in industry as a non-human readable labeling format that could be read with accuracy and speed by either a fixed or mobile scanner. There are many bar code formats (also called one dimensional, linear or 1D formats).

Two dimensional codes are also called matrix, graphic matrix, or 2D codes. One style of a graphic matrix code is called Quick Recognition (QR). It is easily recognizable by the three positioning blocks in the top two and the lower left corners. The QR code is established as an ISO (ISO/IEC18004) standard. The QR code was developed by Denso Wave (Kabushiki Kaisha Denso), a subsidiary of Toyota Corporation, for car parts management. On Mar. 10, 1998, U.S. Pat. No. 5,726,435 was issued for Optically Readable Two-Dimensional Code And Method And Apparatus Using The Same. The rights were released into the public domain per www.denso-wave.com/qrcode/aboutqr-e.html.

Examples of QR codes may be represented herein in a schematic manner, such as a QR-m code shown in FIG. 11 and a QR-c code shown in FIG. 12, or may include representations that are closer to actual use example QR codes, such as is shown in FIG. 13.

With respect to risk of damage of QR codes when using the novel system and methods disclosed herein, for custom generated, short lived QR codes, such as those created on the fly by merchants at a point of sale or those created by consumers on their devices for a single transaction, the damage risk is negligible and the low error correction is appropriate. The resulting code has fewer data elements and will process in less time. For QR codes that are in a more malleable environment and exposed to potential damage, such as those in printed media, a higher error level of code correction may be appropriate.

The lasers used in 1D bar code scanning generally can't process 2D matrix codes. However, existing systems (such as the register scanners used in stores) can be retro fitted with 2D capable scanners. In addition, a merchant's existing smart phone could serve this purpose presenting a low entry point. At a higher entry level would be existing handheld scanners, such as the CR-1200, manufactured by CODE, or the DS-6700, manufactured by Motorola.

Many QR readers can properly read a code in normal orientation, upside down, sideways and at some angles. This ability is important to ease of use in presenting QR codes for scanning. At present, there are machines made by manufacturers, such as the one shown in FIG. 14 that is representative of machines manufactured by Verifone, that may be considered to be a quadramodal device. Such a device allows for input via: 1) cardswipe—swiping a charge card CC using a slot CS on the right side of the top face; 2) penpad and soft buttons—the top screen softpad SP is touch sensitive and can be used to display buttons (via software, the buttons can appear as needed so they are called "soft buttons") or capture a signature, with the soft buttons activated by finger pressure or a special stylus (shown to the left in a holder) which is generally used for signatures; 3) keypad KP—a numeric entry can be accomplished with the numeric keypad shown on the front face, offset to the left; and 4) fixed buttons FB—with three shown on this model on the front face, offset to the right, although these buttons may be located elsewhere on other models.

In the long run, the least expensive means of achieving an operational device would include modifying an existing device. However, for optimum performance, it would be preferred to achieve a high value, multimodal device for use in performing wireless financial transactions. The multimodal device optically scans graphic matrix codes displayed by the account holder's apparatus, a device that has already performed internal operations to generate, format and present an authorization for payment to an active merchant in physical presence of the account holder.

Figure 15:
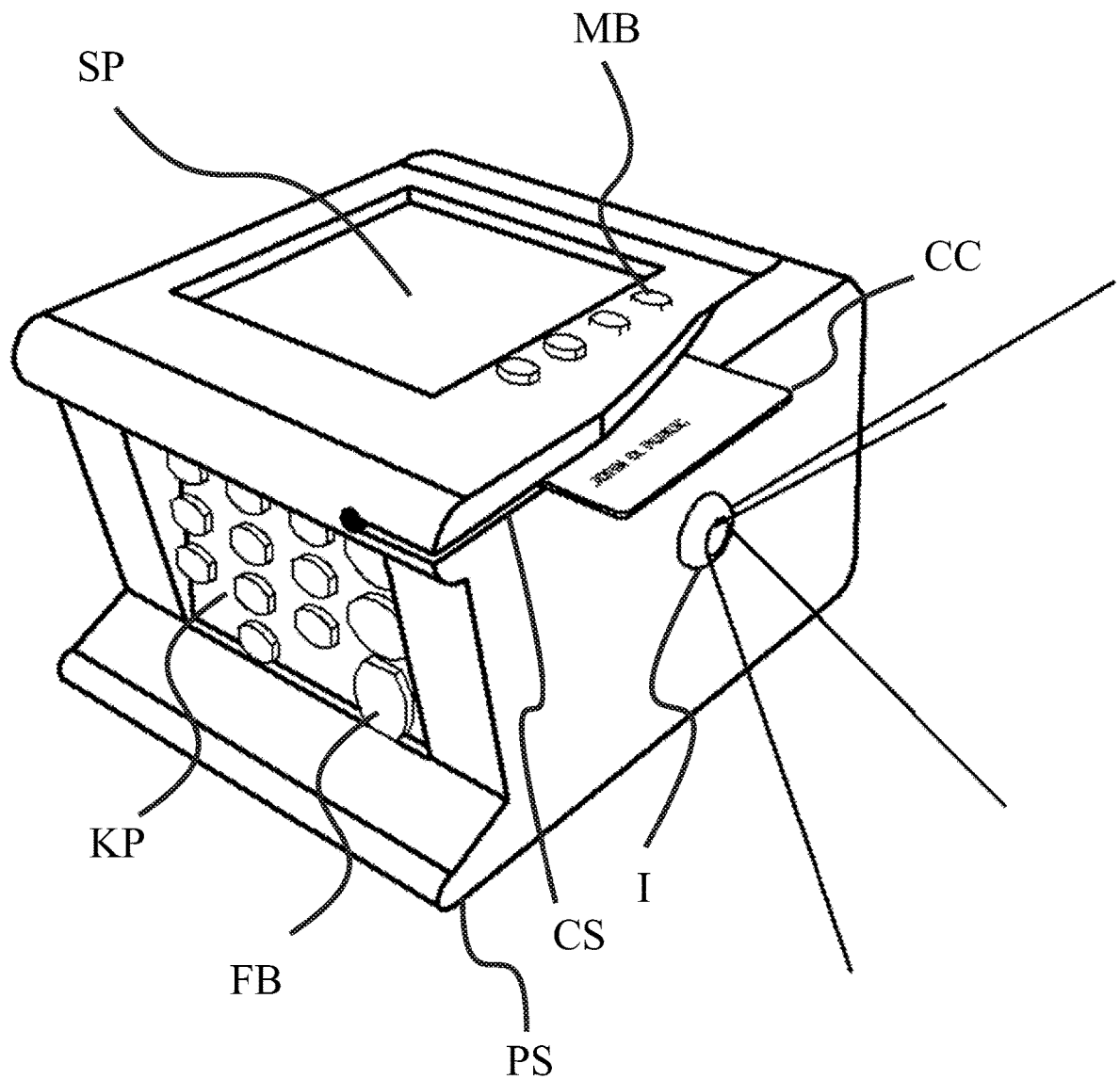
FIG. 15 shows an example of a unique Pentamodal scanner/swiper with a 2D imager.

This new device is pentamodal, and may be referred to as a pentamodal scanner PS such as is shown in FIG. 15, and would provide additional utility, operating via a modification to the platform that already supports the quadramodal functions. It includes the four modes as described above and adds an imager I capable of reading 2D matrix codes on the right side, in this example and further mixed buttons MB to be able to accommodate additional functionality. For the imager I only the lens appears externally, everything else is internal. The stylus (not shown) is held on the left side. It will be appreciated that other configurations that achieve such functions would be considered to be within the scope of this disclosure.

Use of Specialized QR Codes

The NC3 systems and methods disclosed herein use specialized QR codes within transactions. For instance, a QR-m code (m for merchant) contains the charge amount, merchant identification (could be alpha and/or numeric), merchant's transaction identification (could be alpha and/or numeric), date and time, all of which is presented within a quick recognition graphic. All of these are limited to upper and lower case A through Z, the numbers zero through 9, period, comma, special characters –/ @ ( ) [ ]: $ and other currency symbols. Others may be considered for inclusion, but specifically excluded are angle brackets < > which are reserved for special uses that will be discussed further herein.

Figure 16:
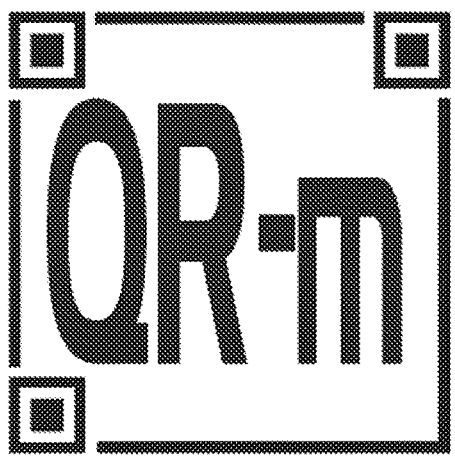
FIG. 16 shows an example of a printed receipt with a QR-m code.

FIG. 16 presents an example of the content of a QR-m code, schematically shown, in conjunction with an example invoice, where the free-formatted QR-m code resolves to:
Mary's Munchies
M:123987 T:5588226789
$6.50 05/01/2012 1:59PM
G:
which constitutes a request for funds with these details: $6.50 to be paid to Mary's Munchies, merchant identification 123987, merchant transaction identification 5588226789 on 05/01/2012 at 1:59PM and a request for the consumer to consider a gratuity.

The merchant name appears on top. Code-M (shown as M: for merchant identification) is included, where the merchant in this example, Mary's Munchies, has a merchant identification 123987. T: indicates what follows in the merchant's transaction identification. Mary's Munchies sells extraordinary cakes, cookies and confections. Consumers may purchase at the counter for take-out, or for on premises consumption in the cafe that also provides coffee, tea, etc. On May 1, 2012, at 1:59 pm, a customer receives an invoice for the cafe. As seen in FIG. 16, the Code-T (T for merchant transaction identification) is 5588226789. The next line contains amount, date, and time all separated by a space. The date is shown as MM/DD/YYYY but could easily be reformatted for the European standard of DD/MM/YYYY. While it could be YYYYMMDD the consumer confidence is increased if the QR-m is read with any QR reader and displays what is expected. Code-G (G for gratuity) is provided and G: is one of a series of special action codes, which is discussed below. This plain text version would be displayed on the consumer's device after scanning the QR-m code.

Code-G

The Code-G (G for gratuity) in the above example is the first of several NC3 system special action codes that provide new capabilities by triggering special actions. Code-G may be placed in the QR-m code by merchants for whom such additional amounts may be appropriate. When the consumer's device encounters a "G:" the consumer is presented with a screen that allows them to enter a gratuity or not.

Figure 17:
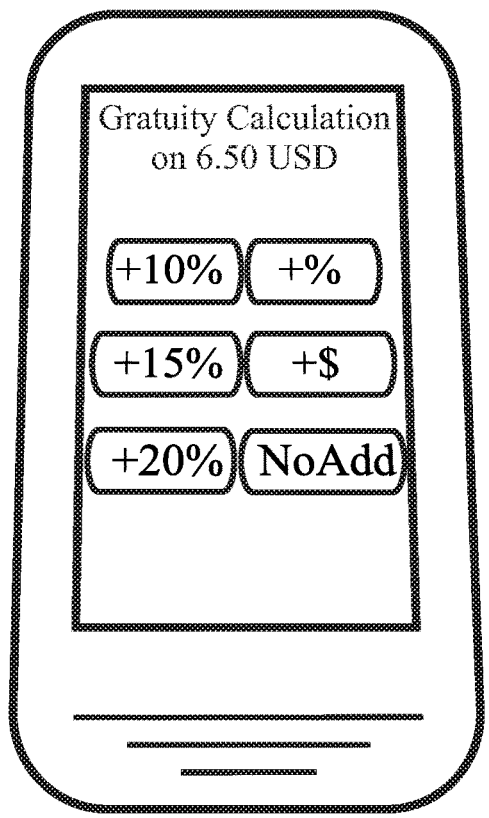
FIG. 17 shows an example Code-G (G for gratuity) calculation screen on a smart phone.

The request is presented with pre-programmed options that can be replaced by user defined options. An example of one set of consumer options is shown in FIG. 17.

If the consumer elects [+%] or [+$] then the consumer is presented with an appropriate keypad for further entry. Calculated gratuities are calculated and displayed with the base charge and total. Confirmation should be requested.

If [NoAdd] is selected, then no additions are made.

If there was an additional amount added then the amount is updated with that addition.

In this example the service was good and the consumer selected the [+$] option, and added $1.34, or a bit more than 20%.

Code-S

If a Code-S (S for Specie) was contained in the QR-m code, then the "USD" shown in FIG. 17 would be replaced with the appropriate currency code. If USD is the "native" currency of the account, the label "USD" may be omitted. Additional operational efficiency increase, including consumer actions and voice commands, as well as currency Code-S are discussed further herein.

When the above step is completed, the device performs internal operations to generate an authorization for payment to the respective entity, in the form of a QR-c code. In simple terms a QR-c code (c for consumer) is used in obtaining authorization from the consumer in the form of a specific charge authorization, not a charge card number. The QR-c code contains an NC3 code, charge amount, Code-M (M for merchant identification), Code-T (T for merchant's transaction identification), Code-C(C for consumer name), date and time. Note that the actual charge card number is not provided to the merchant. The consumer's name, in this example, Cathleen Jones, was provided to the device with the original QR-p code from the provider, during the NC3 request process. The consumer name can't be changed by the consumer.

Figures 18, 19:
FIG. 18 shows an example of a QR-c code.
FIG. 19 shows abbreviations for common/unique encryption/decryption keys.

The consumer uses the QR-c code to initiate and complete communication of the authorization, thereby approving the transaction. The consumer's device displays a QR-c code, an example of which is shown in FIG. 18, along with data that corresponds to the QR-c code, namely, NC3 is the NC3 code, and TL is the Time Limit, which will be discussed further herein. The order of presentation of data associated with both QR-m and QR-c codes can be easily rearranged. For instance, it may be preferred to have the amount displayed more prominently at the top of the display.

QR-c Capacity

It also is important to note the flexibility with respect to the capacity of the QR-c code use. For instance, the example QR-c code shown in FIG. 18 is a version 10, with 57×57 modules at high error correction. It can hold 395 alphanumeric characters at the low level of error compression. Such an example QR-c code resolves to 104 characters, which is under 27% of a version 10's capacity. The characters could triple due to longer values for M:, T:, C:, NC3:, TL:, or encryption, and the QR-c code capacity would still be sufficient.

Time Limits

The above example presents a Code-TL (TL for Time Limit), which represents that the merchant has a deadline by which or period until, or by when the merchant must scan that QR-c code and send it to the provider. In this example, the time limit is represented as plain text yyyymmddtttt where tttt is a 24-hour representation of the local time as provided by the merchant plus, for instance, a preset time limit of 60 minutes. In actual use the TL could be reduced in length using several techniques already in common use and well defined. Shortening the time limit also enhances security by providing a reduced window of opportunity for cyber-miscreants.

The purpose of having a time limit is to protect the consumer by limiting the effective utility of a QR-c code to a pre-defined date and time window. The time limit could be shorter than the 60 minutes used in the example. Shorter time limits increase security, but too short of a period may interject an inconvenient operational constraint on the merchant. Time limits may be longer, but as the merchant no longer has to connect to the provider a second time, the need for batch processing should be is eliminated. Importantly for security purposes, any QR-c code presented after the time limit has expired will be declined.

Generating a Code is not a Charge

Also important to security, is the fact that simply generating a QR-c code does not generate an actual charge to the consumer's account. Only after a merchant transmits the QR-c code to the provider is there a transaction.

Encryption

Additional security enhancement can be had by using encryption of the QR-c code. The merchant does not have decryption capability and passes the QR-c code to the provider who can decrypt and apply it. If the QR-c code contains the charge authorization plus additional information that the merchant needs to read (such as the consumer's order in accordance with the Voice Command, Voice Master, and Order Code-O discussed further herein), then unencrypted, or partially unencrypted, QR-c codes may be desirable.

Referring to common paired key cryptographic systems there is an encryption key for each user and that key is generally widely disseminated. The matching decryption key, however, is tightly held. Upon receipt of an encrypted QR-c code, the provider must know which encryption key was used during the QR-c code generation. The simple solution is to use a single common key pair for all elements of all consumer transactions. The downside is that all consumers have the same key pairs, which may present a security weakness.

Partial Dual Encryption

Another way that offers greater security would be to utilize Partial Dual Encryption (PDE). As an option, during the creation of an NC3 code, a unique key pair may be created for the account holder. The unique encryption key is transmitted to the device and the unique decryption key associated with that unique NC3 code is held at the provider. Once the encryption key is transmitted to the consumer, it is not retained by the provider. There also are keys that are in common use for more than one account holder, such as the two that are shown with abbreviations in FIG. 19.

In preparing the encrypted QR-c code, a block is prepared with the NC3 code and all other information. This copy of the NC3 code is called "internal", meaning internal to the block that will be doubly encrypted. There also is an "external" copy of the NC3 code. The external copy will be singly encrypted only. First, the block is encrypted with EK-u, the encryption key unique to that single NC3 code. The resulting block and the external NC3 code are then encrypted with the EK-c, the common encryption code. The result is a single block that is converted to a QR-c code. Reading the encrypted QR-c code will reveal only encrypted material easily interpreted as random characters. The encryption keys used for first encryption are dissimilar from encryption keys used for the second encryption. Encryption keys for tertiary or subsequent encryption also are dissimilar from all previous encryption keys. Casual inspection will not reveal even the existence of double encryption of part of the contents.

Figure 20:
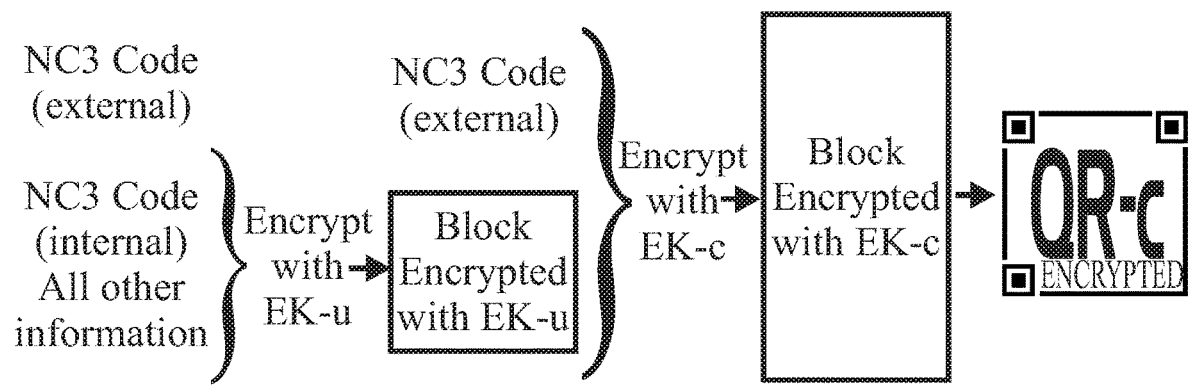
FIG. 20 shows a schematic diagram of encrypting with unique and then common keys.

For security purposes, the concepts of double encryption and unique encryption should not be disseminated to the public in association with a system. Reference instead simply should be to the systems having "advanced encryption". One form of partial dual encryption with unique and common keys is shown schematically in FIG. 20.

Figure 21:
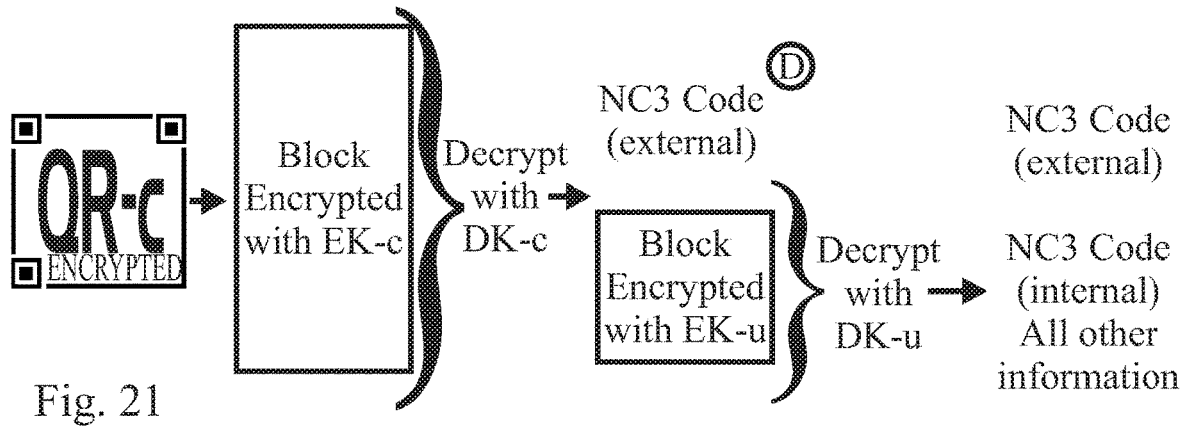
FIG. 21 shows a schematic diagram of decrypting with common and then unique keys.

A further schematic representation is shown in FIG. 21, and when the encrypted QR-c code arrives at the provider, it is translated from a QR-c code to an encrypted block which is then decrypted with DK-c, the common decryption key. This exposes the external NC3 code (see Circle-D) which is used to locate the appropriate unique decryption key DK-u. The DK-u key then is used to decrypt the doubly encrypted block (now singly encrypted after being first decrypted by the DK-c), which exposes the internal NC3 code and all other information. The internal NC3 code must match the external NC3 code for the QR-c code to be valid and further processed. In this manner, even if the common encryption is compromised, the block containing the amount and NC3 code (internal) are not compromised. Changing the NC3 code (external) provides no benefit to a thief.

Partial Dual Encryption with Multi EK-u/DK-u Pairs

The system also may employ partial dual encryption with multi EK-u/DK-u pairs. One or more digits of the NC3 code may not be part of the actual NC3 code. It could be an indicator as to the unique encryption used. A zero code could indicate no encryption as may be required for a Code-O transaction, which is discussed further herein. Code 1 could indicate the use of a first unique key pair for that NC3 code. This makes the use of not just a single unique key pair per NC3 code, but multiple unique key pairs whose existence and use makes unauthorized decryption much more difficult.

For example: If the "real" NC3 code was "abcdef" the presented NC3 code could be "abc8def" where the fourth character refers to unique encryption code number eight. This is an indicator as to which encryption code was used, not the code itself The provider reference table then would contain entries for:

| | |
|---|---|
| NC3, ExpiresOn, DK-u, UCCN | < a single EK-u/DK-u |
| NC3, ExpiresOn, <links to appropriate DK-u>, UCCN | < for multiple EK-u/DK-u |

These multiple encryption keys may be unique to each account holder as described above. They also may be made common for a group ranging from two account holders to all account holders. The encryption keys, common or unique, may be used for first, second, tertiary or higher orders of encryption, as may be defined by the level of security desired.

Encryption for Code-O information

Figure 22:
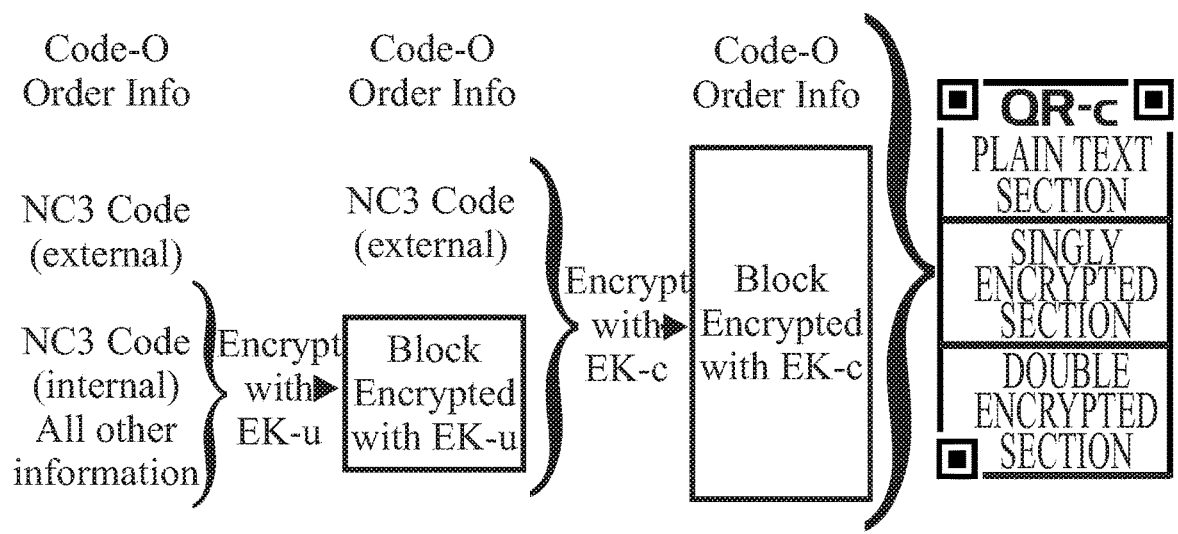
FIG. 22 shows a schematic diagram of encrypting with Code-O (O for order).

The order information is not encrypted before being transformed into the QR-c code. This makes the order information visible to the merchant, but all remaining information is encrypted. However, encryption for Code-O information could be employed, such as is shown schematically in FIG. 22.

Then the merchant scans the QR-c code, the plain text information is revealed and the rest is illegible. Decryption by the provider is similar to that used in the prior examples, except that the Code-O information would be discarded. In some of the examples, the content of the QR-c code is not broken down into plain text, single encryption, or double encryption sections.

Optional Indigenous Authentication

The system further may utilize optional indigenous authentication. All the information contained within the previous QR-c code example is called BLOCK. It may be desirable to append to the source a code generated from the existing information, that is:

S2=f(BLOCK)

So, the resolved information would be:

Mary's Munchies
M:123987 T:5588226789
$7.84 05/01/2012 1:59PM
C:Cathleen Jones
NC3: KU84NQPD
TL: 201205011459
S2:xxxyyyzzz Conventional encryption reveals information only to the intended recipient. To achieve this the encryption key is widely disseminated (public) and the decryption key is tightly held (private).

This can be modified in a manner to authenticate the sender. Both keys would be tightly held; the encryption key by the consumer and the decryption key by their provider. The block may include the encryption key. The only copy of the encryption key is held inside the device. The encryption key cannot be reverse-engineered from the decryption key, so the provider knows if the section decrypts with the decryption key they hold for that consumer, then it was encrypted with the matching encryption key held by the correct consumer.

This allows the provider to authenticate the QR-c code as at least being un-altered from the point of transmission. Line burps or deliberate alteration would be detected, unless a new S2 code was created.

Implementing this concept means the unique encryption key (EK-u) could be included in the doubly encrypted section. If the NC3 code were compromised the thief could only duplicate the same transaction without altering the material inside the doubly encrypted section.

So, if a QR-c code is received for payment and the S2 signature provided does not match an S2 signature generated at the provider using the provider's copy of the encryption key, then the QR-c code must have been altered, damaged or otherwise is not valid.

Initiate a Physical Presence Transaction

Figure 23:
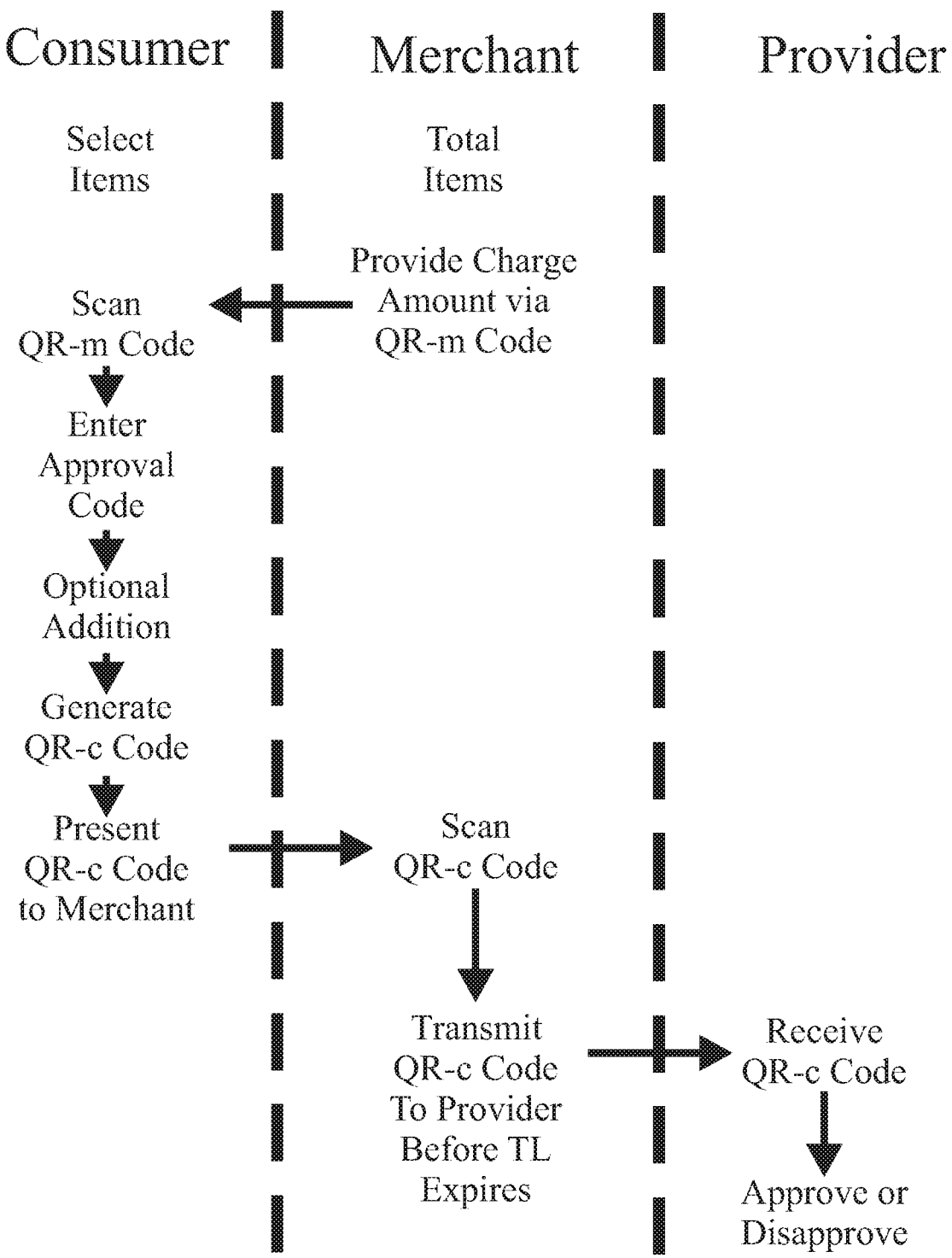
FIG. 23 shows initiation of an NC3 physical presence transaction.

FIG. 23 schematically shows the initiation of a physical presence transaction, sometimes also referred to as a "card-present" transaction.

Similar to the existing process, the merchant provides an invoice (sometimes a paper tape) with details (sometimes without), a total, and a place for the consumer to sign. If the transaction type is appropriate (such as a restaurant), there is a place for the consumer to add additional charges, such as a gratuity. At the bottom of the invoice is a proffered graphic matrix code, specifically the QR-m code as described herein.

For merchants where the consumer is in the physical presence of an active merchant, the QR-m code may be printed and proffered, as described above. For merchants where the consumer is in the physical or electronic presence of an active merchant, the QR-m code may be proffered by being displayed on a terminal, computer or other electronic devices performing the operations commonly associated with the payment process at the end of a transaction in the active presence of a merchant.

If the consumer wishes to use the NC3 application they must first prepare their device (or apparatus) for use, by ensuring the device is powered on, that the device has determined whether it is active and operating in an application mode for performing date transactions, such as being prepared to scan a QR-m code, as the first step to accomplishing a transaction with external entities comprising an active merchant entity, a passive merchant entity, or a non-merchant entity.

The consumer scans the QR-m code, enters their approval code, provides optional additions, and approves the transaction allowing the apparatus to perform internal operations that generate and present an authorization for payment to the respective entity, specifically the requester of the funds as detailed in the scanned QR-m code, then initiates and completes communication functions to wirelessly optically transmit the authorization (a graphic matrix code QR-c as described above) from the consumer (account holder) to requester of funds, in this example, the physically present (active) merchant.

Before the Time Limit is reached the merchant scans the QR-c code and transmits to the provider for approval. At the provider, any QR-c code presented more than once is automatically declined as a duplicate.

Consumer Action 1—Code G Optional Addition

If the QR-m code has a G:, then the merchant has triggered an optional addition to be presented to the consumer as described above with respect to a Code-G, prompting potentially first action required by the consumer.

Consumer Action 2—Approval

A second consumer action ultimately is required in the form of providing approval for the transaction. A summary may be displayed on the consumer's device, for example:

Mary's Munchies
M:123987 T:5588226789
$7.84 05/01/2012 1:59PM
[Approved] [Cancel]

Notice that the transaction amount now is about 20% higher. The merchant and transaction code are the same. The order of presentation in both QR-m code and QR-c code easily can be rearranged. It may be desirable to have the amount displayed more prominently at the top of the display. The G: information is not reiterated in the QR-c code, as the $7.84 amount now contains the optional addition of $1.34 for the gratuity.

Under the NC3 system, the request for transaction approval by the provider is based on what the consumer provides to the merchant and information added by the merchant. The consumer provides authorization, generally in the form of a graphic matrix code, generally referred to herein as a QR-c code, or a mixed encrypted text equivalent, depending on the intended mode of transmission as appropriate to the type of external entity comprising active merchants (in physical or electronic presence), passive merchants, or a non-merchant entity.

In general, the graphic matrix code will be provided to an active merchant entity in a physical presence. In general, the mixed encrypted text equivalent will be provided to an active merchant entity in an electronic presence, a passive merchant entity, or a non-merchant entity.

The authorization section of either the graphic matrix code or the mixed encryption text equivalent contains only encrypted information in that authentication section when presented to the merchant as authorization to pay in response to the request for funds.

Unencrypted information may be a portion of what is proffered, but unencrypted information, such as Code-O described herein, is not part of the authorization. The authorization includes the consumer identification (the NC3 code), and perhaps the expiration date, and the credit verification value (CVV) code, in the same manner as existing systems. However, in addition to the preceding, the consumer (not the merchant) provides encrypted values for merchant identification, merchant transaction identification, the amount of the transaction or a not-to-exceed value, the date of the transaction, the time of the transaction, and a time limit by which the merchant must present the authorization for approval and payment. Because these latter values are transaction dependent they are dynamic, changing with each transaction. Thus, under the NC3 system, the consumer provided authorization contains materially more information, and is richer in content than the existing system. Thus, the NC3 system provides a dynamically, content-rich authorization when compared to the more content-lean existing systems.

Under the NC3 system the merchant may add plain text information to the proffered charge authorization. Those additional elements are related to specifics of the transaction and are not part of the consumer's (account holder's) authorization proper. These plain text elements comprise the actual charge amount (such as if a Code-A not-to-exceed amount was used in the consumer provided authorization, as described further herein), the merchant identification (if the consumer used Code-M:<ANY>, as further described herein), and the merchant transaction identification (if the consumer used a Code-T:<ANY>, as further described herein). Thus, under the NC3 system, the merchant additions to the consumer provided authorization also contain more information than the existing systems.

While "approval" could be a single button press (simpler) it may be preferred to require a short numeric code entry on the touch screen of keypad, or a voice command input, for approval. Such a code increases security, so that even loss of the device cannot immediately result in fraudulent use.
Physical Presence, No Signature Required Equivalent Transaction—Part 1

In existing systems there are transactions for which a consumer provides a charge card to a merchant, approval is obtained and no signature of the consumer is required.

In the NC3 system there is one, and only one, connection between the merchant and the provider. The merchant identification and charge amount are provided via the QR-m code. The merchant may, or may not, provide a QR-m code to scan, and the transaction proceeds as other transactions under the NC3 system.

Figure 24:
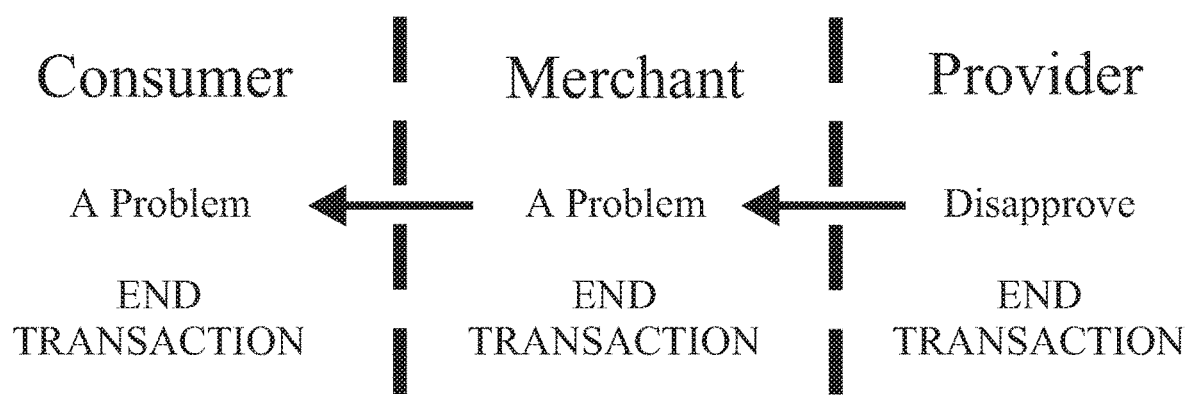
FIG. 24 shows an NC3 physical presence transaction that is disapproved.
Figure 25:
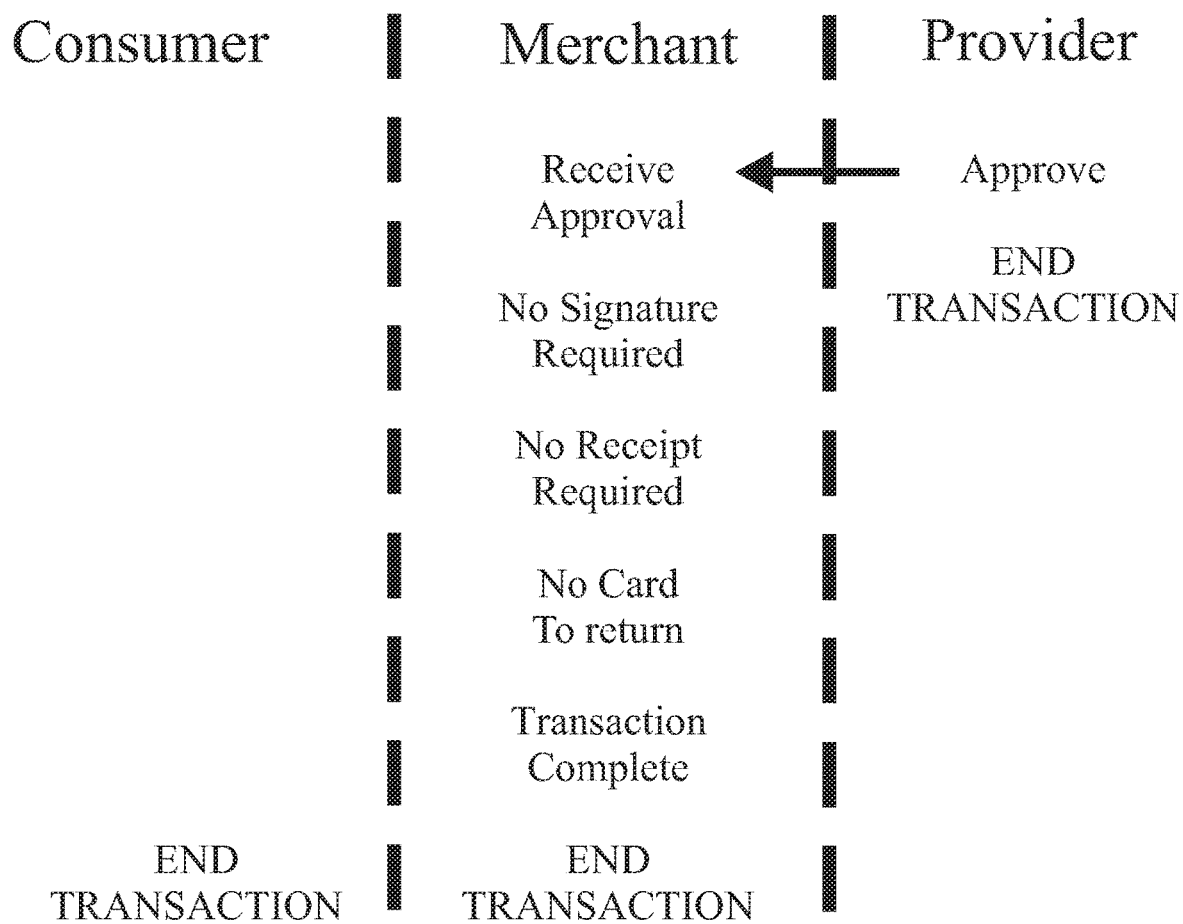
FIG. 25 shows an NC3 physical presence transaction that is approved.

However, the NC3 system also can permit a consumer to provide information sufficient for approval without obtaining a QR-m code and without providing the charge card number. This is described further herein in reference to a Recurring Charge—Inconsistent Amount.
Transaction—Disapproved There are instances when a transaction will be disapproved. With respect to all information, the provider is contacted just once by the merchant. If a transaction is disapproved, as shown schematically in FIG. 24, then it is between the merchant and the consumer to abandon the transaction or resolve it.
Transaction—Approved In the ordinary course, if a transaction is approved, then the transaction is complete. Notice that, as shown schematically in FIG. 25, there is no further action required by the consumer. There is no charge card to be returned to the consumer and to have to store in a wallet or purse. There is no signature required. The consumer transmitted their approval via the QR-c code.
Receipts and Record Keeping The enhancements to convenience continue with respect to receipts and record keeping. Indeed, a receipt is not required. The merchant may provide one, the consumer might request one, but it is not required. This permits merchants and consumers to embrace an environmentally beneficial policy, under which paper receipts may be discouraged.

In addition, given the ability to manipulate electronic data, there are many non-exclusive receipt options for each consumer, depending on their desired level of detail. Some examples of those options include:

Receipt Message Sent or Retained—under this option, consumers could elect for each transaction to send a message to themselves with the information. This would be easy, but would expose the transaction to communication via the internet. Therefore, it may be better to simply provide a plain text message to be stored in a special place for receipts within the consumer's device.

QR-c Code Transmitted or Retained—under this option, the code could be transmitted outside the device to the consumer, and the information or the code could be retained by consumer. However, neither option would do the consumer any good, because the QR-c code would be encrypted and the consumer does not have the decryption keys.

QR-c Code Receipt Generator—under this option, an application could be provided to read the code as a file and prepare a document with the plain-text contents and the code, with a statement that it was code-generated and not a faux-receipt created by something other than the message. However, this option may be undesirable as the device would require decryption capability, making that generator a source for the decryption keys, which are to be retained only by the provider.

Provider Memo—under this option, the provider could provide documentation via a message. This places a burden on the provider and exposes the transaction to communication via the internet. In general, the same information already should already be available to the consumer via https on the provider's web site.

An Electronic Transaction

Figure 26:
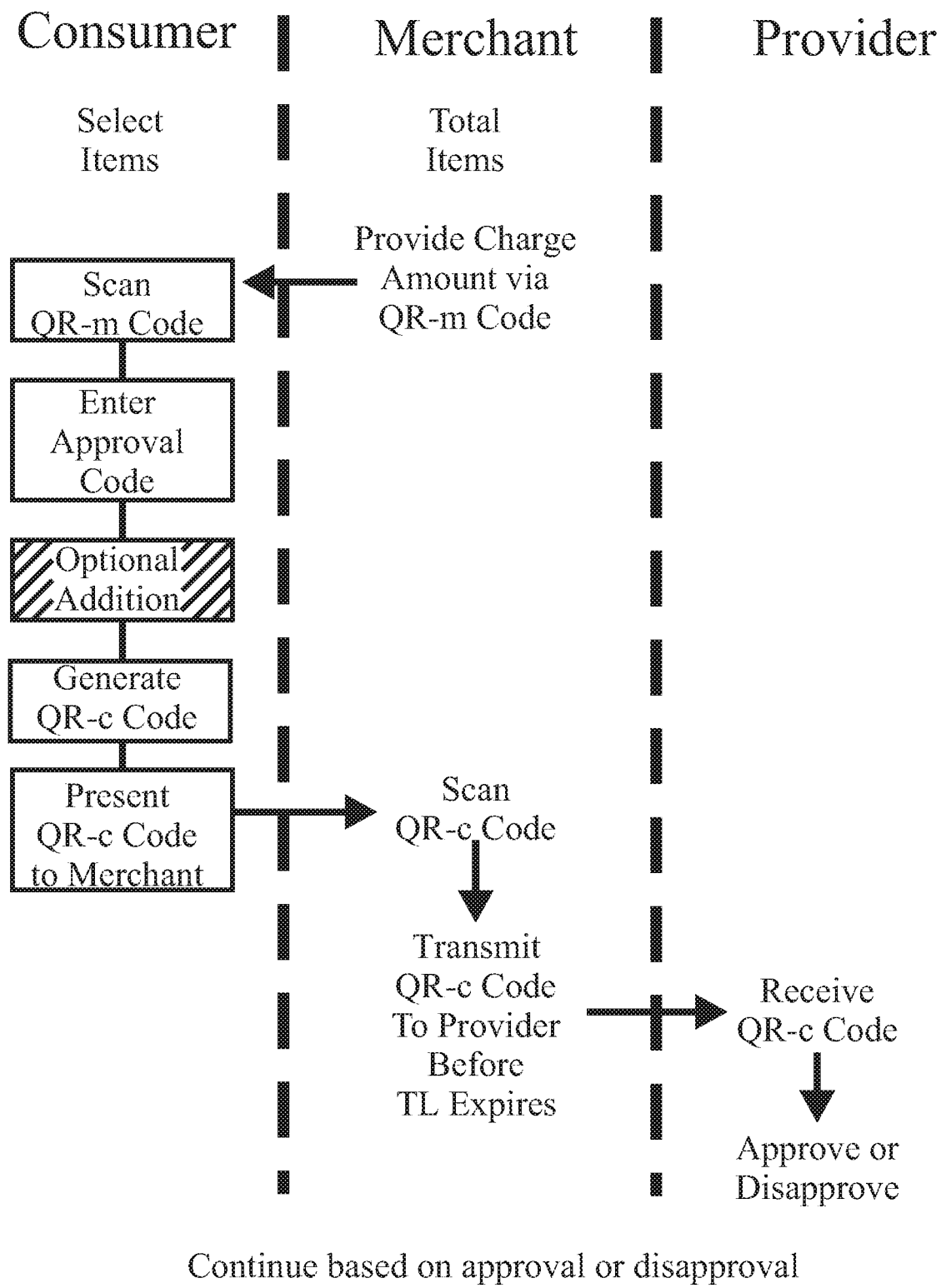
FIG. 26 shows an NC3 electronic presence transaction.

An example of an electronic transaction is shown schematically in FIG. 26. This is functionally identical to the Physical Presence Transaction above, up to the point that the consumer has entered their approval code.

In this example (and as for most electronic presence transactions) the merchant should not include code G:, so the consumer is not prompted to provide a gratuity. In FIG. 26 the functionality is shown in a box with partial hatch marks to indicate its possible presence. Then t The QR-c code is generated.

The main difference here is with respect to "transmit" QR-c code. In a physical presence transaction, the QR-c code is presented for the merchant to scan. While many computers have cameras, not all do. Accordingly there are several possibilities.

Because the unique merchant's code and unique merchant's transaction ID are included in the QR-c code, a single provider could process payments for many, many merchants. This is discussed further herein in reference to NC3 Benefits, Competitive Advantages, and Better Internet Clearinghouse activity.

Transmission Size

It should be noted that the content of an unencrypted QR-c code might be 200 characters which would render a QR-c code of about 1,200 bytes as a Portable Network Graphic (PNG) file with two colors. PNG files use loss-less compression, which is better for data integrity than lossy-compression formats such as Joint Photographic Experts Group (JPEG or JPG). Even if encrypting doubles the size to 400 characters (2,400 bytes) these are still small files that should not present transmission difficulties.

Phone Code-P: Subcode

In addition, the merchant in an electronic presence transaction may include a Code-P (P for phone code), which indicates the telephone number for their electronic provider. The code could indicate that it is a voice telephone number, a text message destination or email address. While this is visible to the consumer it does not require the consumer's action or intervention, but it should require the consumer's approval. A subcode (in the form P:<subcode>) is required to indicate which option. It may be desirable to give consumers multiple options for transmission as some may be sensitive to data charges. With all options, the destination could be the merchant or another merchant providing this service. Possible transmission modes include known modes that are described further below, such as wireless transmission via attachment to a cellular text message, directly connected file transfer, directly connected text stream, data over voice line telephone, or captured by a computer attached web camera and transmitted to a respective entity, in electronic presence.

Text Message Attachment—P:<PT>nnnnnnnn indicates that nnnn is a telephone number to which a text message should be sent with the QR-c code attached as a PNG file. How many n and their format are flexible to all, for nnn-nnn-nnnn United States, (nnn) nnnn nnnn London, and others. The phone number (nnnn etc.) may be replaced with the keyword <YOURS> in a QR-m code, which indicates that the consumer or account holder's device should send the approvals directly to the consumer's provider.

File Transmission—P:<PF> URL indicates that URL is a uniform resource locater to which the QR-c code information should be sent as a PNG file. If the consumer already is using the device as a mobile terminal, then the QR-c code could be transmitted as a discrete file. The consumer is already connected to the merchant and an application could be created to effect the transfer.

Data Stream Transmission—P:<PD> indicates that the web site to which the user is connected is waiting to receive the QR-c code information as a string of characters. If the consumer is already using the device as a mobile terminal, then the QR-c code could be transmitted as a data stream. The consumer is already connected to the merchant and an application could be created to affect the transfer.

Voice Telephone—P:<PV>nnnnnnnn indicates that nnnn is a telephone number to which the device should dial and transmit the QR-c code information as a data stream using either plain tone, or dual tone multi-frequency, signaling. This requires the merchant's end to have a system that can receive the tones, translate them into plain-text and pass that information on to be processed as the consumer's payment. The merchant may elect to have a toll-free number.

Web Cam—An application could be opened so the installed web camera would be activated. The consumer would present the device to the camera, the application would echo what the camera sees on the screen and provide guidance (ex: "Please move device closer", "Please hold still", etc.) and when the QR-c code has been captured, it would close the application and display a message to the consumer. This would permit transmission to a respective entity, in electronic presence. However, not all consumers have web cams installed and this would be very difficult if the consumer was using their device as a web browser.

Plain Text Info

E-commerce transactions can be identified by the presence of Code-P. For those, the merchant identification (Code-M) and merchant transaction identification (Code-T) are included in the plain text section. The merchant needs the Code-T elements to match the QR-c code to the order and does not have the capability to read the encrypted versions. The Code-M is included in case the merchant uses a service bureau for NC3 e-commerce transactions. The bureau (who serves more than one merchant) will need both Code-M and Code-T to make the match up between charge and payment.

The redundant material makes the QR-c code a little larger, but that is better than allowing the merchant or a service provider access to the encrypted material. The QR has plenty of capacity.

It also may be desirable to put duplicate M: and T: in the plain text block for all QR-c codes, not just those QR-c codes used for e-commerce.

E-Shopping with Device

If the consumer is shopping with the same device used for NC3 payments, then it would be difficult to use the device's camera to capture a QR-m code on the device's screen. There are at least three options to otherwise complete transactions.

Screen Capture—It is possible to capture the screen to a temporary file, for instance for Android® based devices by using www.makeuseof.com/tag/6-ways-to-take-screenshots-on-android/and source code is freely available http://sourceforge.net/projects/ashot/, and for Apple® devices by using www.itworld.com/mobile-wireless/269948/hereshow-grab-screenshot-nearly-any-smartphone, and then to parse that file to obtain the QR-m code and reduce it to the plain text equivalent. This would be transparent to the merchant and require no additional effort by them. It will require the consumer to activate the capture-parse function, but that is a few button presses and represents the simplest solution.

Cut-Paste—Because the QR-m code resolves to plain text in all cases, the merchant may offer a window where the consumer can cut the plain text information and paste it into a NC3 provided window for that purpose. This is more time consuming for the consumer and the merchant would need to provide the window with QR-m equivalent text.

Send Text Stream—Another option is to allow the merchant's web site to transmit the plain text equivalent to the device and bypass the optical transfer. This would require the merchant to provide programmed functionality on their end.

Recurring Charges and Code D (D for Duration)

In authorizing recurring charges the consumer bestows upon the merchant an additional level of trust that the charges will be appropriate as to amount and frequency. One-time currency would appear anathematic to recurring charges, but the NC3 system and methods make them available.

When authorizing the generation of a QR-c code, an option to confirm "Recurring" or not, needs to be presented. Putting such a selection on a commonly accessed page would appear sub-optimal as there are very few recurring versus non-recurring charges and an error is undesirable. Making the selection of "recurring" versus "non-recurring" a requirement is wasted motion for the majority of transactions. However, "Recurring" may be made a flag part of the QR-m code to trigger a screen to confirm the user's acceptance of a recurring charge.

Here is an example QR-m code for a movie rental web site, GetFlix, with a fixed in amount, and specified in duration.

| | |
|---|---|
| GetFlix | <Merchant name |
| M: 657836 T: 835423gdf | <Merchant ID, Merchant transaction ID |
| $13.00 May 1, 2012 1:59 PM | <Amount, date of transaction, time of transaction |
| D: [d] | <Duration Code | where [d] can be
Y indicates that the Time Limit is one year from the first transaction date.
L indicates that the Time Limit is to the life of the card.
< > If [d] is blank then "D:" should not be present.
Or an actual date/time represented in some form such as YYYYMMDDTTTT
Other such codes are available.

The determination of the value for the Code-D (D for duration) is done by the merchant's application, but the duration code "D:" has to be approved by the consumer. Once a recurring charge is authorized, there are two special concerns in creating an appropriate QR-c code: duration and the amount.

Duration

This is example content of the QR-c code for a recurring charge for GetFlix, good for one year:

| | |
|---|---|
| GetFlix | <Merchant name |
| M: 657836 T: 835423gdf | <Merchant ID, Merchant transaction ID |
| $13.00 May 1, 2012 1:59 PM | <Amount, date, time of transaction |
| C: Cathleen Jones | <Consumer Name |
| NC3: KU84NQPD | <NC3 Code |
| TL: 201305011359 | <Time Limit, one year from date, time of transaction |
| D: Y | <Duration Code, one year |

QR-c codes are retained by the merchant and re-submitted per their agreement with the consumer. For an authenticated QR-c code, the properly formatted D: code overrides the reject duplicates rule. If the NC3 code is changed then the recurring charge (either consistent or inconsistent) must be re-authorized.

Amount—Consistent or Inconsistent and Code-A (A for Amount not-to-exceed)

The above recurring charge example is for a consistent amount charged for each transaction. No further changes need to be made to the QR-m code or QR-c code generation.

However, some recurring charges are for amounts that are inconsistent and vary from transaction to transaction. As the amount is part of the encrypted block it can't simply be changed by the merchant during a recurring billing. This is an example QR-m code for a wireless carrier, VT&T:

| | |
|---|---|
| VT&T | <Merchant name |
| M: V663311 T: 824oB1ken0bI | <Merchant ID, Merchant transaction ID |
| A: [a] May 1, 2012 1:59 PM | <Variable Amount, date, time of initial transaction |
| D: 201405011359 | <Duration Code, specific date |

The term "[a]" is a not-to-exceed value. In this example request for funds, A:100.00 indicates that the recurring, but variable, charge cannot exceed $100.00, and the value for Code-D is a specific date, indicating a two year time limit.

An example of the QR-c code from the consumer may be:

| | |
|---|---|
| VT&T | < Merchant name |
| M: V663311 T: 824oB1ken0bI | < Merchant ID, Merchant transaction ID |
| A: 100.00 May 1, 2012 1:59PM | < Variable Amount, date, time of transaction |
| C: Cathleen Jones | < Consumer's name |
| NC3: KQQ3NQPD | < NC3 Code |
| TL: 201405011359 | < Time Limit (set to two years) |
| D: d | < Duration Code (other) |

For the second and subsequent recurring transaction there are no QR-m/QR-c pairs; the QR-c code is re-submitted. For non-recurring, fixed amount transactions only the QR-c code is transmitted by the merchant to the provider. The reject-duplicate rule is overridden by the properly formatted D: code and the not-to-exceed amount is included.

Because the encrypted QR-c code section is encapsulated (sealed) the merchant can't simply insert the variable amount limit. The code would fail a validation testing. One solution is straight forward, namely, special batch processing. Recall that for most NC3 transactions batch processing is no longer required. The merchant could segregate recurring, inconsistent amount, transactions from others. The special batch would have two elements for each transaction, the authorizing QR-c code and the amount. The identification of the special batch could be accomplished in several ways including a file header, naming convention, special reception point or other. To avoid batch processing the system could use Plain Text Modification in Lieu of Batch Processing, as discussed further herein.

Frequency

Not included above are the specifications and use of Code-F (F for transaction frequency).

Semi-Auto Code Renewal—Because NC3 codes have a life that may be shorter than the card life, a mechanism is desired to provide the consumer an easy way to update recurring charges to still be effective with a new NC3 code. For existing charge card systems, a consumer would obtain a new charge card number and each merchant would have to be updated manually by the consumer, which is a time consuming process. In contrast, with the NC3 system, recurring charges are recorded in one of at least two places, each with benefits and drawbacks. Regardless of the method, the merchant needs to receive the new code. The provider needs no special notice as the former NC3 code won't be valid after a new one is issued.

Stored At the Provider—This is the most efficient single place to store recurring authorizations for all consumers associated with a provider. The provider can set up a program within their existing secure web site and allow the user to update all recurring QR-c codes, or select some to update, others to delete, etc. The provider then has to push those updated codes out to the merchant.

Stored At the Consumer—While the consumer could store the QR-c codes for recurring transactions, this means the consumer has to push them out to each merchant. Depending on which method of transmission was initially used by the consumer to push them out to each merchant, this could be easy, or more difficult.

Terminating Recurring Authorizations

When attempting to terminate a recurring authorization, first and foremost, the charge authorization needs to be terminated in accordance with the merchant's procedure. Consideration has to be given to acrimonious terminations (goods not received, wrong goods received, etc.).

If QR-c codes for recurring transactions are stored at the provider, then some option within the secure web site could allow for the termination of a QR-c code for selected or all recurring transactions.

Actually deleting a QR-c code for a recurring transaction may be undesirable. To effectively terminate the ability of that code from creating a charge, it is easier to update the code so that the Time Limit is set to be the prior day (yesterday). The code remains, transactions will be rejected, and eventually clean-up of QR-c codes some days beyond the Time Limit will remove the code from active use.

Physical Presence, No Signature Required Equivalent Transaction—Part 2

In this form of the application, the purchase value is low with an emphasis on speed, and it is known that the process will be sacrificing some, but not all, of the security benefits. With the NC3 system and methods, there are several processing options depending on what the merchant provides.

Transaction Specific QR-m Code

The merchant may provide a transaction specific QR-m code. This would provide the highest level of security and is identical in processing to other transactions under the NC3 system.

Non-specific Transaction QR-m Code/Code-A

In this variant, the merchant provides a QR-m code that identifies only the merchant name, merchant code and the limit on the amount for a "no-signature" transaction. This could be provided on a small poster or placard at the checkout, for example:

[QR-m code graphic]
Mary's Munchies
M:123987 T:<ANY>
A:$25.00

The use of angle brackets marks this as a special purpose code. "<ANY>" is a literal five character code starting with a left angle bracket, the word ANY, and ending with a right angle bracket. The presence of the Code-A (A for Amount not-to-exceed) indicates this is not a specific amount, but instead is a not-to-exceed amount. Code-A may also be referred to as "NTE" for not-to-exceed amount.

In conducting the transaction, the consumer scans the QR-m code above, reads that the plain text decoded matches the merchant's sign, and approves the purchase. The consumer's device then may generate, for example, a QR-c code similar to:

| | |
|---|---|
| Mary's Munchies | < Merchant name |
| M: 123987 T: <ANY> | < Merchant ID, Merchant transaction ID |
| A: 25.00 May 1, 2012 1:59PM | < Variable Amount, date, time of transaction |
| C: Cathleen Jones | < Consumer's Name |
| NC3: KQQ3NQPD | < NC3 Code |
| TL: 201205011459 | < Time Limit = device time + 1 hour |
| S2: xxxyyyzzz | < Indigenous Authentication Code |

The merchant scans the consumer's QR-c code, may transmit it in the same manner as described above with respect to recurring charges having inconsistent Amounts, but this special batch has three elements for each transaction: the authorizing QR-c code, the amount, and the merchant transaction identification. The identification of the special batch could be accomplished in several ways including a file header, naming convention, special reception point or other alternative. To avoid batch processing, the system may use the plain text in lieu of batch processing discussed below. In any event, the charge card number is not provided and the transaction is restricted to the one merchant, a Time Limit and a not-to-exceed amount.

No QR-m Code

In this instance, the merchant provides no QR-m code at all. On command, the consumer (account holder) may create a special version of the QR-c code that defines neither the merchant, the merchant transaction identification, or the amount. In this manner, the step of acquiring the details of a request for funds from a respective entity and obtaining authorization from the account holder to permit payment of that request for funds are both generated by the account holder. This QR-m code would be scanned by the merchant and then approved by the Provider.

The QR-c code for this type of purchasing arrangement could be for a low value transaction where no physical signature would be required and an example QR-c code may be:

| | |
|---|---|
| <ANY> | < Merchant name |
| M: <ANY> T: <ANY> | < Merchant ID, Merchant transaction ID |
| A: 25.00 May 1, 2012 1:59PM | < Variable Amount, date, time of transaction |
| C: Cathleen Jones | < Consumer's Name |
| NC3: KQQ3NQPD | < NC3 Code |
| TL: 201205011459 | < Time Limit (set to two years) |
| S2: xxxyyyzzz | < Indigenous Authentication Code |

Thus, the use of angle brackets marks this as a special purpose code, and the presence of Code-A means this is not a specific amount, but a not-to-exceed amount of 25.00.

This is the same usage as appears above or recurring charges having inconsistent amounts. Because the amount is not provided by the merchant, this limit may be set by the Provider or pre-set by the consumer.

Prior to transmission from merchant to provider the merchant identification, transaction identification and actual amount have to be provided. This can be done via batch processing or plain text in lieu of batch processing, as described below. Nevertheless, even at this lower level of security, the charge card number is not compromised, the authorization is self-expiring with a Time Limit code and there is a transaction value limit.

Plain Text in Lieu of Batch Processing

Several consumer options, such as described above with no QR-m code, require that the merchant provide necessary information to the provider, which was not available via the consumer's QR-c code. That information could include an Actual Amount (if the consumer used Code-A as described above) and the merchant's name, identification and/or transaction identification (under several different scenarios).

Previously described was a batch process where such QR-c codes were gathered and transmitted from merchant to provider in a batch with the additional information provided. Completing the transaction in this manner is a form of exception processing which is generally considered undesirable. The lack of encryption for Code-O information, as discussed above, while still encrypting consumer information, provided a method to mainstream this process and avoid the exception processing. Recall that the provider would discard any received Code-O information.

Figure 27:
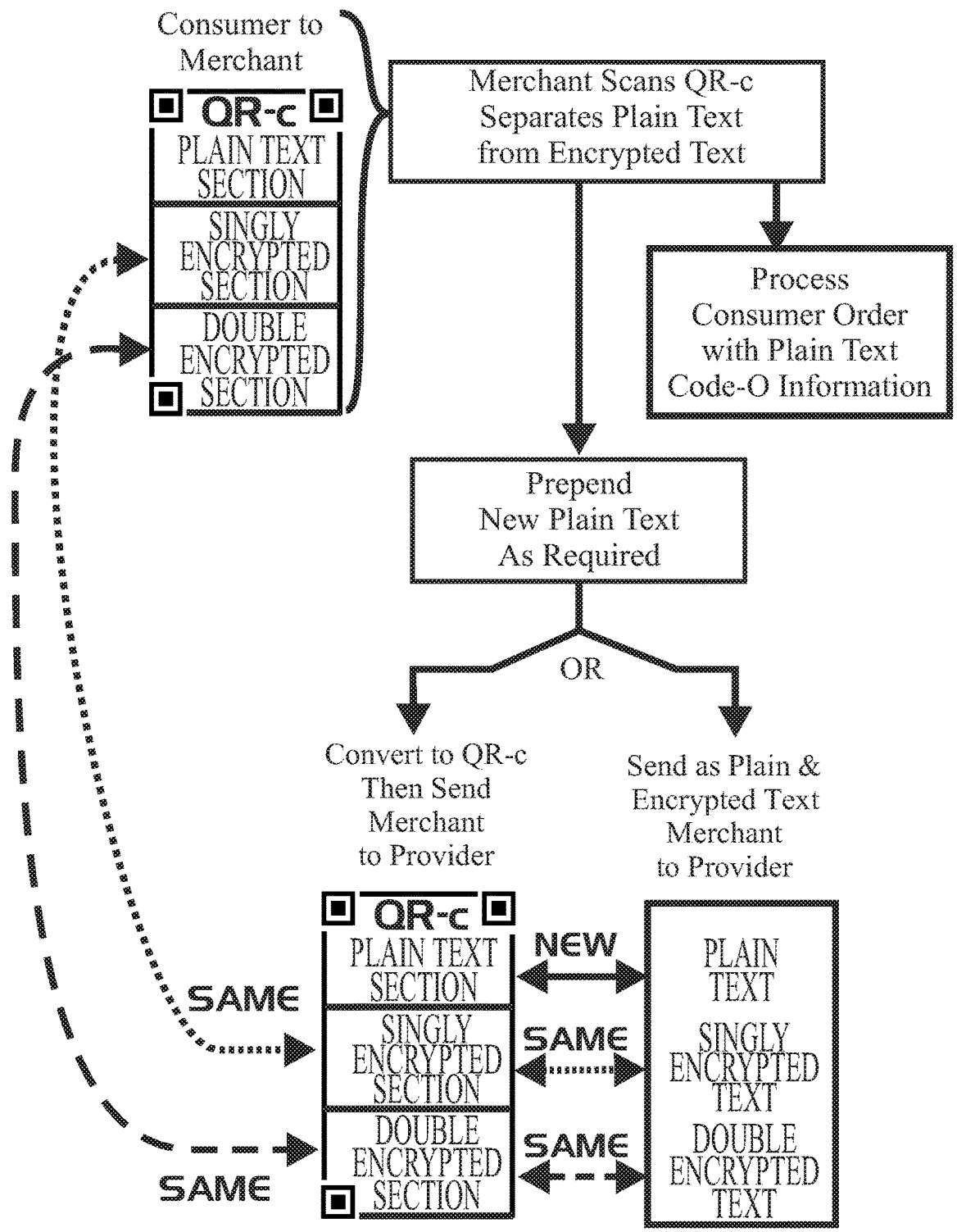
FIG. 27 shows using modified plain text sections in lieu of batch processing.

The plain text capability can be used as a vehicle for the merchant to provide the absent information. FIG. 27 shows a merchant that has received a properly formatted QR-c code with Code-O order information from the consumer. The merchant scans the QR-c code to obtain the order information. The scan also identifies, but does not decrypt, the encrypted information. Once the order is processed, the merchant prepends the absent plain text information, such as, for example, the transaction identification or the actual transaction amount.

The information can be communicated in at least two ways. First, the merchant may convert the character string with plain text followed by encrypted text to a QR generator program. Such a program does not care about the meaning of the content, just the content itself.

Second, the merchant may skip the conversion to graphic matrix code and transmit the equivalent mixed (meaning plain, singly encrypted and doubly encrypted) text to the provider.

In both cases the encrypted sections are as-provided by the consumer. The consumer's Code-O order in plain text has been replaced with new information provided by the merchant.

Code-AA (AA for Actual Amount)

The plain text also may include a Code-AA (AA for Actual Amount) for easier recognition, but in some examples this code is not shown.

Credit Transactions

When a merchant refunds a purchase to a consumer, this is called a "credit". There are other reasons for funds to be paid by the merchant to the consumer. These also may be called "credits". Such credit transactions are easily handled within the NC3 system and methods.

One way is for the merchant to display a QR-m code that indicates a credit transaction, perhaps QR-m-credit. The consumer scans the QR-m-credit and approves it, much the same way the consumer would have to approve a charge. The consumer then generates a QR-c-credit and transmits the QR-c-credit to the merchant, again the same way as for a regular charge. The merchant transmits the QR-c-credit to the provider who completes the proper processing.

QR-m-credits may simply have a negative amount. The merchant transaction identification (Code-T) could contain "CR" or "CREDIT". The advantage here is that the QR-c code includes the merchant transaction identification. QR-c-credits also could include the word CREDIT in the plain-text. Some element within the doubly encrypted section should also reflect the nature of the credit transaction.

Provider Processing

The merchant's provider may, or may not be, the consumer's provider. The merchant's provider might create the charge to the consumer and credit the merchant. To accomplish this, the merchant's provider would need to access the consumer's authorization with its unique encryption codes that should be held only by the consumer's provider.

To keep those codes secure, all providers and authorized service bureaus who are not providers should be able to use the common code to decrypt the QR-c code singly encrypted block to obtain the NC3 consumer identifier. The list of NC3 codes and affiliated provider should be maintained and easily accessible. This way the merchant's provider (if not also the consumer's provider) may forward the QR-c code to the consumer's provider to initiate the charge to the consumer and credit to the merchant.

Each QR-c code contains the merchant identification (Code-M, either in the doubly encrypted section or in the plain text if added by the merchant during a flash purchase), and the merchant's provider may add their code in the plain text section for simpler processing.

Importantly, the NC3 consumer identifier is not an account identifier and, on its own, cannot authorize a transaction. An NC3 identifier in single encryption concealment is still better than placed in plain text. It might also be a desirable standard to place the provider code in the plain text section for faster processing.

NC3 Benefits

Competitive Advantage/Provider

Payments in an increasingly digital world are being made via alternative systems that still suffer from the increased security issues with enormous potential economic damages to consumers, merchants and providers, as discussed in the Background section. None of the other systems provide the security, ease of use in both physical and electronic transactions and other operational benefits of the NC3 system and methods.

Faster Market Capture

Strategic positioning is a matter of timing and preparation. However, being first to claim a poor position fails to offer a sustainable advantage. Hence, although RFID and NFC enabled solutions already exist, the NC3 system is positioned to dwarf their solutions as measured by consumer ease of use, easy merchant adoption, a single solution for physical presence, e-commerce and person-to-person transactions, increased security, and additional functionality.

The competition should not be over which NFC solution is the best, which is the battle many companies are fighting. Ultimately, the competition is over which solution is the best. Within the NFC-based competition, others are first. However, even the winner of the NFC-based competition is poorly positioned for the whole-solution battle.

NFC Barriers to Entry

The predominant competition to the NC3 system is applications using NFC enabled smart phones. The security weaknesses of NFC communications are known, including the ability to intercept the communications and, in some instances, use of the charge card itself within the transaction.

A successful solution needs to address integration and adoption problems of the solution. Some supposed solutions require special hardware in a smart phone, creating a barrier to widespread adoption. Changes in the smart phone, as well as in the merchant's equipment will come at a significant cost.

NC3 not Affected by Those Barriers

The NC3 system is not affected by many of the competition's barriers to entry. The NC3 system uses optical capabilities comprising an optical scanning module to acquire information, an optical display module to display information, a wireless communications module, one or more central processors with access to executable instructions and wherein the central processing unit or units may be coupled to those modules and configured to start and execute an application on the apparatus. All of these elements are already in most, if not all, existing mobile terminal devices commonly known as smart phones, and may be included in computers or other devices. Low end merchants require only their existing smart phones, no attachments, no wireless networks, no special communications links.

As a step upward in technology from there, some merchants may require a scanner upgrade from laser-based to optically-based, or a dual mode scanner, but the communications infrastructure is fundamentally unchanged.

Better Card Present Payments and Internet Clearinghouses

Even for physical presence transactions consumers may elect to use the NC3 optically based system over their existing physical cards, magnetic swipers, RFID tags or repeatedly entering cell phone numbers and PINs.

Adoption of the NC3 system and methods allows for a better internet payment clearinghouse (IPC) for consumer electronic commerce than existing systems.

Figure 28:
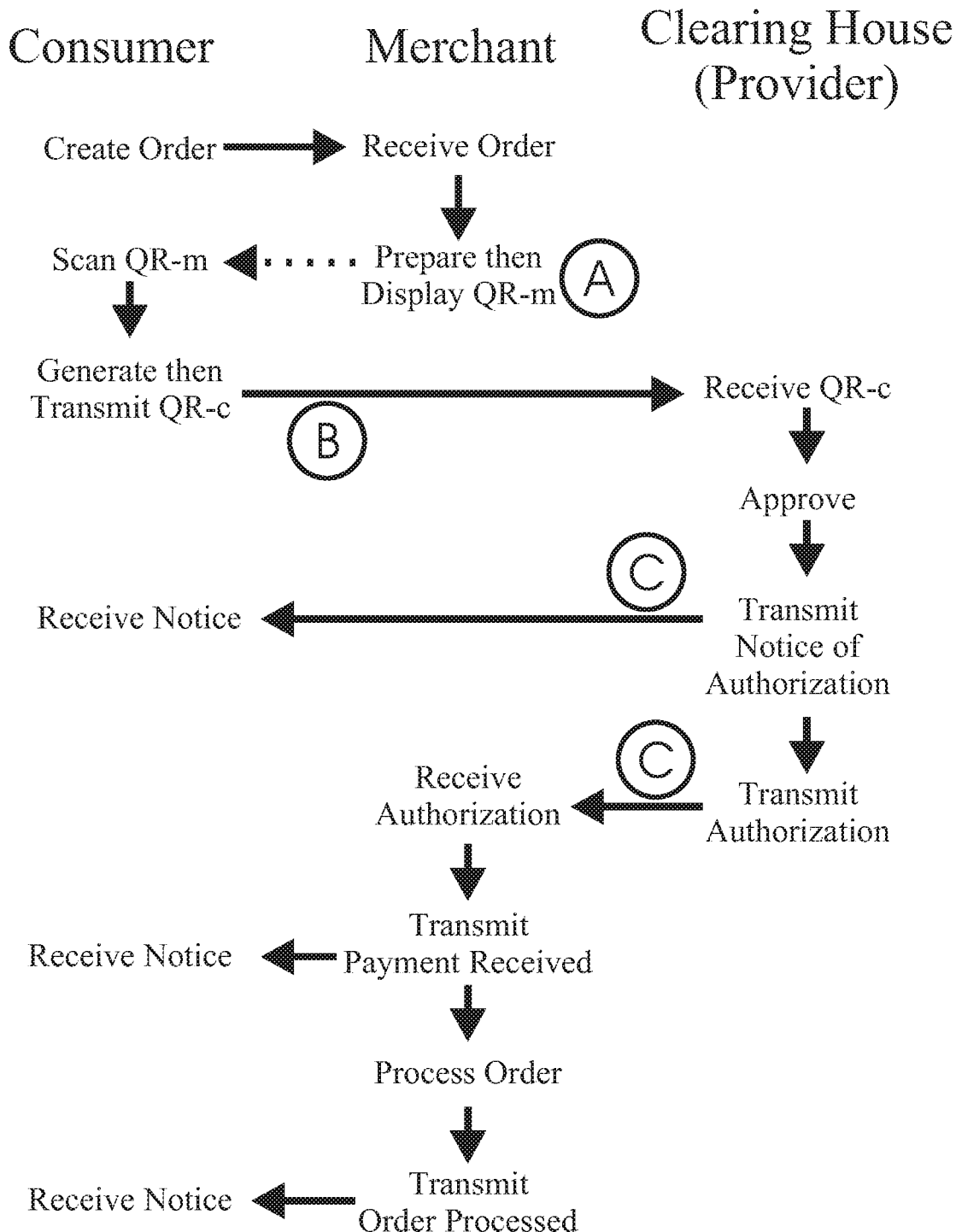
FIG. 28 shows a schematic diagram of an internet payment clearinghouse (IPC).

FIG. 28 shows a schematic diagram of one way an IPC could be created using the NC3 system and methods. It is non-merchant specific and one well-provisioned clearinghouse could process many transactions for many merchants.

The diagram shows the creation of an order by the consumer and receipt of the order by a merchant. The merchant prepares and displays a QR-m code. Particular steps in FIG. 28 are labeled using circles.

Circle-A: The merchant may optionally include a Code-E (E for email address request) discussed below). If the merchant has included a Code-Z (Z for zip code confirmation) and Code-E, then the consumer has to provide that information, and then generate the QR-c code. In general, QR-c codes are encrypted.

Circle-B: The IPC then obtains an authorization when the consumer transmits the QR-c code to the IPC. There are many possibilities for this transmission, as discussed previously. The IPC receives the QR-c code. In this example, the charge authorization was approved.

Circle-C: The IPC transmits a Notice of Authorization to the consumer, if the consumer has included an email in response to the Code-E request. The IPC transmits an authorization to the merchant. These two transmissions could be one transmission with two addressees, perhaps using blind copy addressing, for improved operational efficiency without revealing the merchant's e-address.

Processing continues with the merchant obtaining the authorization and proceeding as indicated.

Code-E (E for Email Request)

A merchant may include a Code-E to request the consumer's email address. The consumer may be allowed the option to decline to provide their email address. If the consumer declines, then none of the notices destined for the consumer will be transmitted.

ePending Pool

Figure 29:
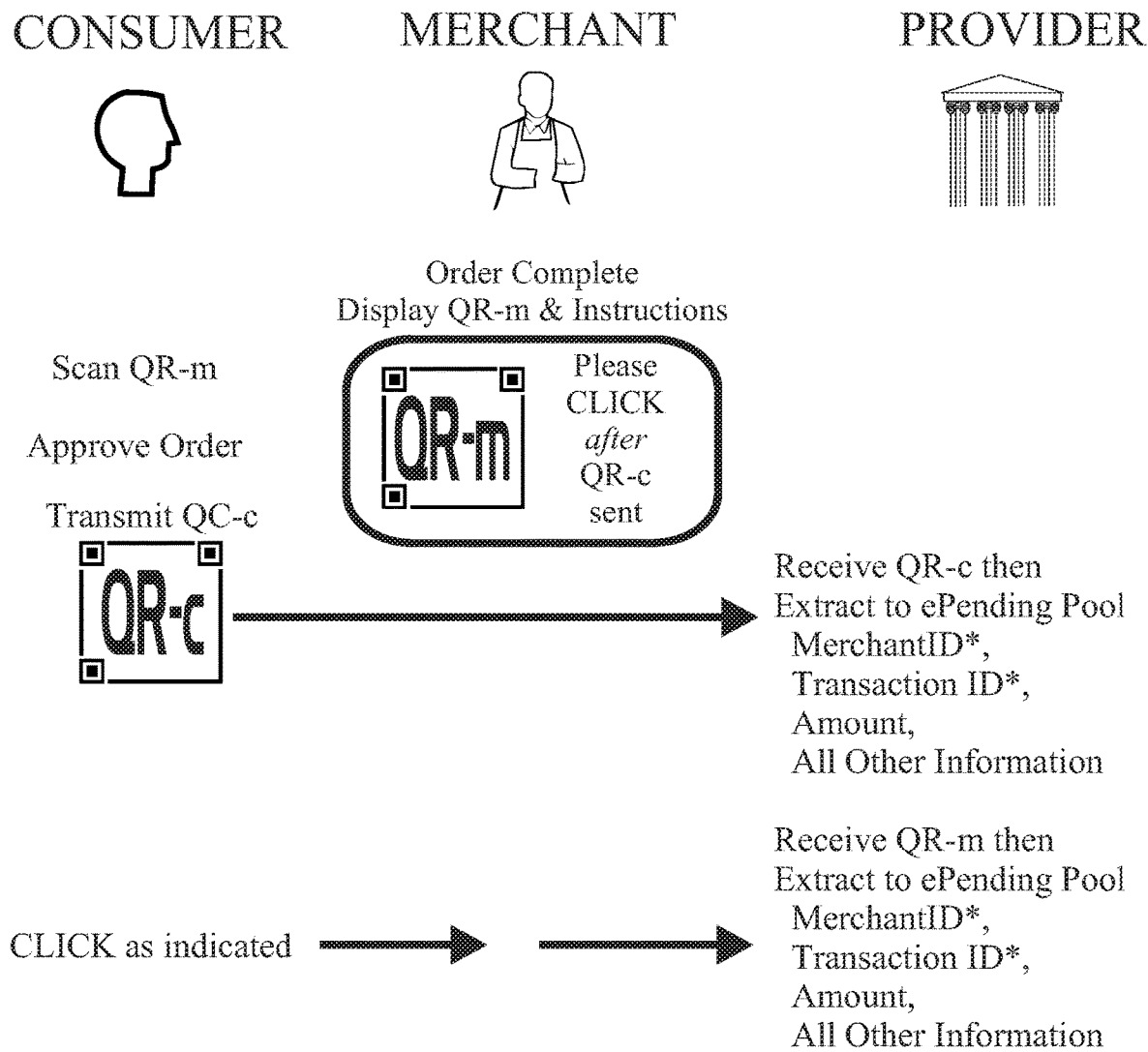
FIG. 29 shows a schematic diagram of using an electronic pending pool to improve performance of the IPC.

The number of consumers being large and the number of transactions also being large, some system for easily matching merchant requests for payment and consumer offers of payment will be addressed, with reference to FIG. 29.

On receipt of either the QR-m code or QR-c code, the pool operator searches for a match based on the two keys marked with asterisks.

There are two possibilities: the "matching half" is either found or not.

A "matching half" depends on what was received. If what was received was a QR-m code, then the matching half would be a QR-c code. If what was received was a QR-m code, then the matching half would be the QR-c code.

Figure 30:
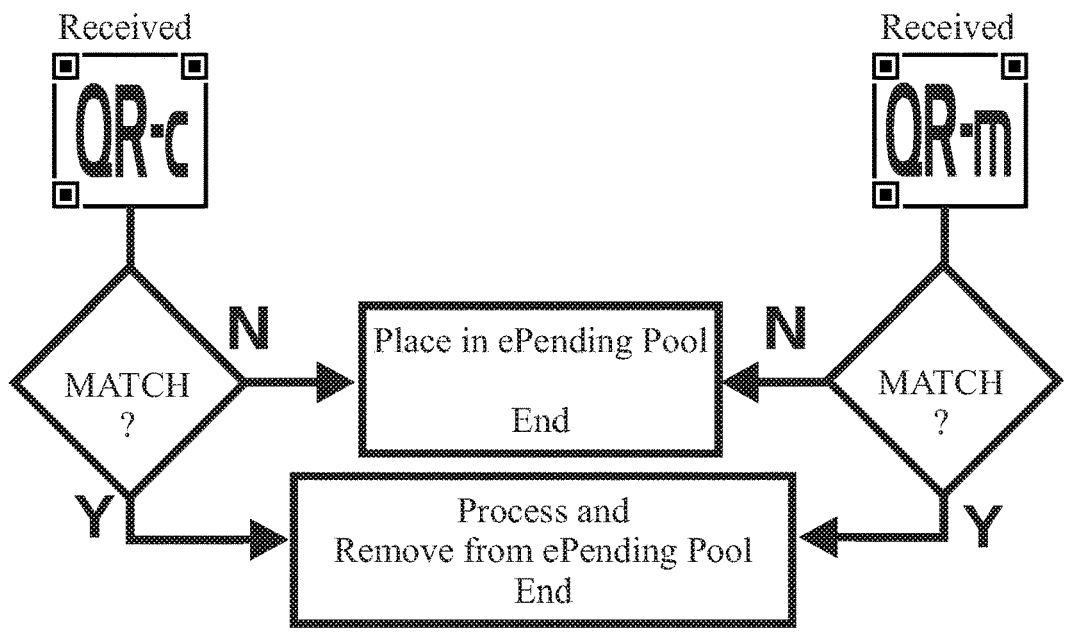
FIG. 30 shows a schematic diagram of using an enhanced electronic pending pool to improve performance of the IPC.

If a match is found, then processing continues with both the QR-m code and the QR-c code being removed from the ePending Pool. A first version of an ePending Pool is shown in FIG. 30. If a match is not found, what was received is placed in the ePending Pool, which may raise an issue to be discussed further. If this were a single thread operation no two codes could be received at the same time. In a multi-threaded operation it is possible that both codes were received, each thread looked for the matching half, and both reported the matching halves were not found.

Under the stated plan both parts would be put in the ePending Pool (acceptable), but there would be nothing else received to initiate part matching (unacceptable).

Rumination Pool Solution

Figure 31:
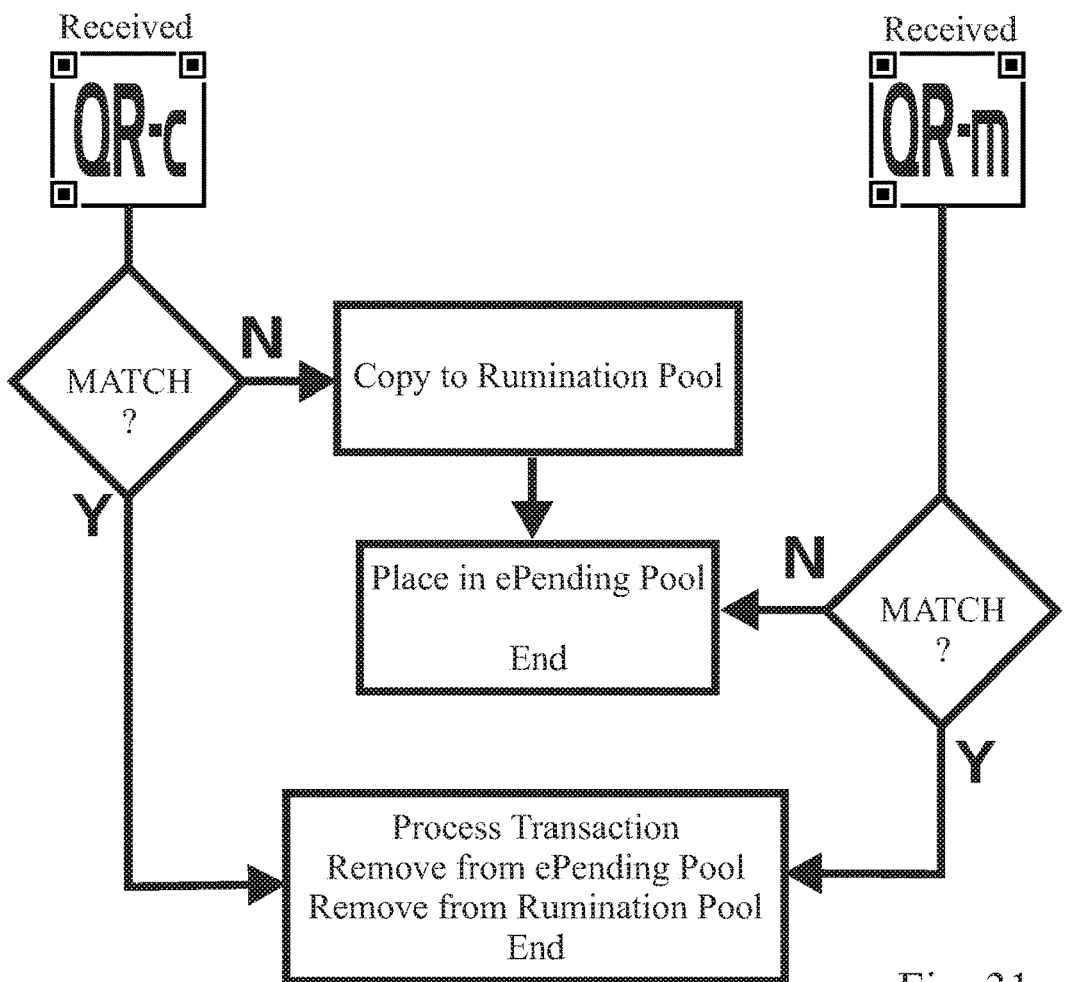
FIG. 31 shows a schematic diagram of using a rumination pool in concern with an electronic pending pool to improve performance of the IPC.

To avoid the situation described above, processing for the QR-c code is altered as shown in FIG. 31. If the QR-c code can't find a match, it is placed in the ePending Pool with a MerchantID* and TransactionID* into a new table called the Rumination Pool. The Rumination Pool is a mechanism to make certain that matches occur. There are just four required fields. Other information is available in the ePending Pool.

| | |
|---|---|
| MerchantID* | The merchant identification, a key field |
| TransactionID* | The transaction identification, also key |
| Tries | A count of the number of times the match has been attempted, starting at zero. |
| TimeIn | The time the entry was placed into the Rumination Pool |

The QR-c codes in the Rumination Pool are checked repeatedly to see if there are matches in the ePending Pool. As shown in FIG. 32, there are four possible mixes of (QR-c code, QR-m code) and (found, not found).

Case A: Both the QR-c code and QR-m code are found. This is a match, but an odd one. When the QR-m code came in, both the QR-m code and QR-c code should have been removed. It is possible both came in at the same time, neither found the other, and no subsequent incoming QR codes initiated the match. Both QR codes are processed, both are removed from the ePending Pool, and the QR-c code is removed from the Rumination Pool.

Case B: This is the expected pending situation. The QR-c code has been received and we're waiting for the matching QR-m code to arrive. The Tries are incremented by one.

Case C: This is very odd as we know the QR-c code was in the ePending Pool. It may be the time of the Rumination Pool was exactly the same time as the two matching QR codes were being processed. So, decrement the Tries by one.

Case D: If this situation occurs, both QR codes are gone. This is perfectly reasonable, if both were processed by the incoming QR-m code. In this case, remove the entry from the Rumination Pool.

Known Error Conditions:

Case B: if (Tries>100 and (TimeNow−TimeIn)>15 minutes)

That means the matching QR-m code has not shown up in a reasonable time. 100 and 15 are arbitrary values for the purposes of this overview.

Case C: If (Tries<=-10)
This means that the expected cleanup of the QR-m code hasn't happened in at least 10 cycles of the Rumination Pool. Notification should be made.

Rumination Pool Enhancements

Improvement options include breaking a single pool into smaller pools. Each side of the transaction needs to carry information to identify the pool.

One example would separate into pools by the first two digits of the merchant identification, as shown in FIG. 33. That might be 00 to 19, 20 to 29, 30 to 59, 60 to 69, and 70 to 99. Notice that the pools need not be equally sized based on the range values. They could be adjusted to provide for pools roughly equal in number of transactions. This schema also allows for easy adjustment in the number of pools by adjusting the table that controls redirection to pool. In this sample table, as soon as the first two digits of the merchant identification meet the left column criteria, processing of this table stops and processing continues for the Pool identified.

Notice the pool names need not be sequential or related. In this example, Pool Zulu previously processed merchant identifications 60 to 99. Pool Smurf was created to handle merchant identifications 60 to 69, and Pool Zulu was adjusted.

Communications Volume Considerations

Low volume merchants, nominally under five transactions per minute, should function quite well as a standalone system using a single telephone number and a single rumination pool.

Medium volume merchants, nominally between five and 60 transactions per minute, will not be able to function well with a single telephone number. That would be busy too frequently for good customer service. A simple solution is a single pilot telephone number with multiple roll over lines. A single rumination pool might still be effective, but several pools are easy to implement.

Large volume merchants may use a single telephone number with roll over, or, because the Code P (discussed herein) is dynamically assigned for each QR-m code, a single telephone number can be selected from a group of single line telephone numbers and assigned with load-balancing in mind at the time of QR-m code generation. Each telephone number can lead to its own rumination pool for rapid matching.

Also, any volume merchant may choose to offload their e-commerce transactions to a very large, well provisioned service bureau.

Competitive Advantage/Merchants

An example may be considered where the NC3 system implementer may wish to assist utility companies (power, water, etc.) in implementing the P2M billing concept (discussed herein). There is an advantage to the merchant and provider because to use P2M the consumer needs to be an NC3 system member.

If the company can go more electronic, benefits may be achieved in reduced expenses (reductions paper, printing and postage would be significant), speed and reliability of electronic delivery, avoidance of bounced checks, etc.

For the consumer, benefits may be achieved in speed and reliability of electronic delivery, reduced costs (postage), etc. For all parties, there are general environmental benefits of saving trees (no paper invoices), and reduced carbon emissions (no trucks hauling mail).

Increased Security

Security For Consumers

Card Never Disclosed to Merchant

At no time does the merchant actually have the underlying charge card or the charge card number. In an existing system, if a charge card is stolen the charge card must be is canceled. In contrast, if the NC3 code is compromised, a new one can be created so that the consumer does not need a new charge card. This eliminates the problem of persons creating unauthorized copies of charge card numbers, imprints or scans, because there is no charge card or charge card number to imprint or scan.

It may be beneficial for users to regenerate an NC3 code from time to time as a prophylactic measure. As noted herein, recurring transactions may need to be re-authorized Code Only Compromise not Possible In some circumstances, consumers may compromise a code element, such as a personal identification code (PIN). The NC3 system has code elements but they require the consumer's device to be useful. Information alone cannot create an NC3 charge card authorization, in contrast to at least one existing system that uses information (mobile number and PIN) alone to authorize a transaction.

Faux-Swiper Threat Eliminated

Criminal devices affixed to charge card readers are no longer a security threat as with the NC3 system there are no cards swiped. Even if a properly formatted QR-c code is cloned, it is protected by encryption. If the encryption is broken, the authorization is limited to the single merchant, single transaction, single amount listed and only until the Time Limit has expired. If the criminal alters the contents of the QR-c code, then it would not pass self-authentication. Also, the NC3 code can be changed by the consumer and the underlying charge card number (UCCN) is never part of what could be stolen.

RFID/NFC Snooper Threat Eliminated

There are no RFID or NFC elements to provide information. While RFID and NFC enabling decreases transaction time, the technologies are vulnerable to snooping or sniffing, which is the practice of using non-authorized technology to query an enabled element and inappropriately receive the information.

Reverse Engineering not Possible

An NC3 code is not created using the complete underlying charge card number. So, even a compromised NC3 code cannot be reverse engineered to reveal the underlying charge card number.

Established Consumer Protections

Consumer protections for fraudulent use of debit and credit cards are well established. Charging to (not via) your cell phone is a new venue and telephone providers are neither providers nor banks Security for Merchants Because the merchant never has the consumer's charge card information, a data breach at the merchant level of any size does not enable fraudulent charge card use. While data center security is certainly important, there would no longer be potential for major financial exposure related to a security failure.

Security for Providers

Providers will always require the charge card number, but because the NC3 code becomes the primary link mechanism it may be possible to move the charge card number deeper inside a protective barrier.

Operational Efficiency Increases

These operational efficiency increase are in addition to increases in security and reduce expenses by avoiding a mass compromise of charge card numbers.

Consumer Operational Efficiencies

The End of "Debit or Credit?"

The QR-c code could contain a definition of the charge card as credit or debit saving tens of millions of "Debit or Credit" inquiries and responses. Because a QR-c code generation could require a password, the debit card password becomes redundant.

Voice Command

Numerous operational efficiencies are available when creating commands for payment without having to use the keypad or touchpad. These are described herein Person to Person The framework of the NC3 system makes person-to-person payment transactions straightforward, as discussed in greater detail herein. These transactions are conducted in keeping with the NC3 system with goals of security, communications efficiency and increased functionality. These transactions are easy to use for the sender and recipient. The receiver's status as family member, friend, or even an unknown, does not matter. It does not matter if the receiver is served by the same provider or not. For mobile transactions internet connectivity should not be required as described with respect to P2PP transactions.

Cost Due to Fraudulent Use

In the end, the consumer bears the cost of fraud. Provider expenses and losses are passed back to the merchants as part of fees. In turn, merchant losses are reflected in their pricing. The consumer gains financial efficiency as costs of transactions are reduced via a reduction in fraud.

Other Efficiencies

With the possible exception of advanced record keeping options, the consumer gains operational efficiency as more merchants move to the NC3 system. The Affiliation Code Locker, optional adjunct, could also provide efficiency increases to the consumer.

Merchant Operational Efficiencies

Scalable Implementation Cost Starts at Zero

The zero-cost start option may be achieved by using an existing device, such as a smart phone capable of scanning, with no additional hardware required. This is in contrast to a need for a wireless network.

The next step up may be a matrix code imager on a stand that feeds into an existing charge card processing system. Or, an optical scanner could be placed adjacent the existing standard checkout swiper. This would bring the integration up to the point that every point of sale (POS) system is able to scan QR-c codes as easily as the existing same systems are able to process a charge card swipe.

For some applications, the preferred or optimal hardware would be to use an entirely new device in the form of a pentamodal scanner, as previously disclosed herein.

The integration could include having service personnel, for example, waiters, provide QR-m codes displayed on smart phones, tablets or similar devices, and then scanning a consumer-provided QR-c code with the same device, allowing submission to a provider directly, via a local wireless network or via a similar shared resource, as discussed herein with respect to a Wireless Multipoint Checkout.

Optical Versus Magnetic Scanners

The optical nature of scanners is less prone to wear generated damage than existing magnetic-mechanical charge card swipers. The charge card's magnetic stripe also degrades with wear as does the swiper. With the NC3 system, each QR-c code is generated anew and does not "wear out". While the optical scanner is not indestructible, it is likely to provide reliable service for a longer time period than magnetic-mechanical counterparts.

Wireless Multipoint Checkout

As technology becomes more ubiquitous and less expensive some merchants will be able to realize more operational efficiencies. Perhaps the most common beneficiary would be restaurants. Servers connected via a wireless NC3 system no longer would have to scribble orders, but can enter them for electronic transmission to the preparers. Misunderstandings are reduced, increasing consumer satisfaction. There are no off-charge items. Each server also can present the electronic invoice and QR-m code, as well as scan the QR-c code from the consumer. Each server becomes a personal mobile checkout terminal, reducing or eliminating potential checkout bottlenecks.

The merchant no longer would need to separately process the charge card charges, because an NC3 system connected wirelessly could process them automatically.

Low Volume Merchants/No Terminal

Low volume merchants are generally reluctant to acquire expensive machinery with expensive fixed costs when the value of those expenses is unknown. This situation led to the development of products discussed herein, that present a comparably low cost alternative and may add a small card swipe reader to a smart phone. Because the NC3 system is optically based, as opposed to a physical charge card swiper, such a magnetic card reader is no longer required.

The method of using the NC3 system simply requires the steps of: 1) The merchant displays the QR-m code on the merchant's device; 2) The consumer scans the QR-m code, approves of the transaction, and then displays the QR-c code on the consumer's device; and 3) In larger systems, a merchant may have a dedicated scanner that would read then process the QR-c code, while low volume merchants may use the merchant's smart device to scan the QR-c code.

The QR-c code should not be stored for later batch transmission, because the merchant would like to see the approval prior to departure of the consumer. The QR-c code could be transmitted as a file to the provider immediately, as either an encrypted data stream or as a graphic file (which is its own at least, partial encryption). This is similar to the method described with respect to Electronic Transaction Example and File or Data Streams. All of the other NC3 system options (Code-A, Code-G, Code-Z, etc.) are available. There is no logical distinction between a large or small volume merchant in transaction processing.

As with other NC3 system transactions, the consumer's charge card number is never exposed. If consumers are not using the NC3 then the merchant can still avoid adding a magnetic-mechanical reader by entering the necessary information manually, but that is time consuming and error prone.

Auctions

With existing systems, a large auction with hundreds of lots and thousands of bidders may have a long line to check out, as each purchaser has to be matched with their purchased items and pay. Consider that with the NC3 system, the auctioneer's aides (spotters in the crowd) could have devices on which they could enter (or have pre-programmed) the lot number, description and amount. A QR-m code could be presented to the winning consumer, who would scan the QR-m code, accept and proffer a QR-c code. The aide then would process that QR-c code in the same manner as a low volume merchant either directly or via a wireless network. At checkout the bidder would have already been matched to their lots and paid. Certainly there are variations on this theme, but all provide improved operational efficiency with the NC3 system.

Migrate to eBilling

If a merchant can go more electronic in billing, the benefits include reduced expenses (reduced paper, printing and postage would be significant), speed and reliability of electronic delivery, avoidance of bounced checks, etc. Indeed, given the flexibility of the NC3 system architecture, many other operational efficiencies can be provided.

Provider Operational Efficiencies

Near Lifetime Charge Card and Charge Card Number

Compromised charge card numbers (versus physically stolen cards) may be the single most frequent reason for replacement of a charge card. If compromise frequency and volume are diminished, it could be that charge cards would only need to be replaced if they were truly lost or stolen. While re-certification and creditworthiness may remain a consideration, it also may be possible that a single charge card number could be assigned to a consumer for the life of the consumer.

Reduced Communications with Merchant

A significant advantage can be realized in that provider-merchant communications may be reduced up to 50%.

Instead of one communication for preliminary authorization and a second communication to report the completed transaction, for some types of transactions the NC3 system may have only one communication between the merchant and the provider that provides all the information. FIGS. 34-37 schematically show two illustrative examples, comparing existing systems to the NC3 system for typical retail and restaurant purchases.

Retail Example

Under existing systems, as shown in FIG. 34, for a typical retail transaction there are at least two communications between the merchant and provider. Similarly, under the NC3 system, as shown in FIG. 35, for a typical retail transaction, there still would be two communications between the merchant and provider.

Restaurant Example

Under existing systems, as shown in FIG. 36, for a typical restaurant transaction there are up to four communications between the merchant and provider. Under the NC3 system, as shown in FIG. 37, there would be just two communications, for a 50% savings.

When using batch processing for the last two transactions under an existing system, the savings decline rapidly as a percentage of total. As shown in FIG. 38, even with declining savings, using a large number of transactions per batch under an existing system, there are significant advantages to using the NC3 system.

First, the merchant no longer has to do batch processing at all. Second, the average number of communications per transaction is only two, regardless of the number of transactions. Existing systems do not reach that level until sustaining 50 transactions per batch. Third, if Code-A transactions (discussed above) are used, they require just a single transmission. Because the QR-c code is encapsulated (sealed) the merchant cannot simply insert the variable amount, because the code would fail a validation testing. So, that transmission has to link the actual amount, as well as the QR-c code.

QR Abbreviations and Codes Used

This disclosure uses several abbreviations that begin with "QR", which are listed in the table in FIG. 39, and discussed herein.

To distinguish particular codes from other letters, a code is generally prefixed with the word "Code" and a hyphen, such as Code-A or code-A. This disclosure uses several codes, which are listed in the table in FIG. 40, and discussed herein.

Code-Z & Gas Stations

This situation requires some additional processing that may not be apparent from the general description of the NC3 system.

Given the problems with miscreants taking gas and driving away, gas stations are understandably reluctant to activate pumps for delivery without some manner of payment security. This is easily accommodated using a variant of the Non-specific transaction QR-m code described above and the Inconsistent Amount also described above. The Merchant displays a QR-m code that identifies the merchant name, merchant identification, and a "not-to exceed" limit. This could be provided on a small poster or placard at the pump.

| | |
|---|---|
| Gloria's Gas | < Merchant name |
| M: k813GH T: <ANY> | < Merchant ID, Merchant transaction ID |
| A: 50.00 | < Not to Exceed Amount/Code-A |
| Z: | < Code-Z Zip code confirmation request |

The use of angle brackets marks this as a special purpose code. "<ANY>" is a literal five character code starting with a left angle bracket, the word ANY, and ending with a right angle bracket.

The presence of the A: code indicates that this is not a specific amount, but a not-to-exceed amount. It may be the merchant would present several codes for differing dollar levels.

The consumer scans the merchant's placard, sees the translated plain language version, approves the transaction, and presents the QR-c code to the scanner. The QR-c code from the consumer could be:

| | |
|---|---|
| Gloria's Gas | < Merchant name |
| M: k813GH T: <ANY> | < Merchant ID, Merchant transaction ID |
| A: 50.00 | < Not to Exceed Amount |
| NC3: KQ6asjTD | < NC3 Code |
| TL: YYYYmm[DD + 2]time | < Today's date (+2 days), time |
| Z: | < Zip code confirmation request |
| S2: xxxyyyzzz | < Indigenous Authentication Code |

Because the consumer's QR-c code is encapsulated (sealed), the merchant can't simply insert the variable amount. Such a code would fail validation testing. The solution is straight forward; the merchant segregates these transactions and transmits a special batch with the following three elements for each transaction:

| | |
|---|---|
| QR-c | QR code from consumer |
| T: xx | Merchant's transaction ID |
| AA: | Actual amount charged |

The identification of the special batch could be accomplished in several ways including a file header, naming convention, special reception point or by other means. To avoid batch processing one may use Plain Text Modification in Lieu of Batch Processing, as discussed herein.

Traveler Zip Code

Travelers often have to manually key in the billing zip code when "far" away from the billing address. This is a minor nuisance, easily tolerated. Some code in the card magnetic strip may provide information on the zip code. The NC3 system may carry the zip code information.

Ask Provider First

In the same manner as a merchant may set a flag to initiate tip processing, such as with Consumer Action 1—Optional Addition discussed herein, the merchant's posted placard could contain a code to initiate a zip code confirmation request. For instance, the merchant may place a QR-m placard (or multiple placards for varying values) in a location for the consumer to scan.

| | |
|---|---|
| Gloria's Gas | < Merchant name |
| M: k813GH T: <ANY> | < Merchant ID, Merchant transaction ID |
| A: 50.00 | < Not to Exceed Amount/Code-A |
| TL: YYYYmm[DD + 2]time | < Today's date (+2 days), time |
| Z: | < Zip Confirmation Request/Code-Z |

The consumer then scans the QR-m code, approves the maximum charge limit and presents a QR-c code that is read by the merchant's scanner and transmitted from merchant to provider. In both the existing and the NC3 system the consumer's approval is provided to the merchant prior to receiving the goods and/or service.

| | |
|---|---|
| Gloria's Gas | < Merchant name |
| M: k813GH T: <ANY> | < Merchant ID, Merchant transaction ID |
| A: 50.00 | < Not to Exceed Amount |
| C: Cathleen Jones | < Consumer's Name |
| NC3: KQ6asjTD | < NC3 Code |
| TL: YYYYmm[DD + 2]time | < Today's date (+ 2 days), time |
| Z: | < Zip Confirmation Request |
| S2: xxxyyyzzz | < Indigenous Authentication Cod |

Because the actual amount is not included in the transmission to the provider, the provider will not generate a charge, but will respond in one of three ways:

Authorization Declined

For some reason the account associated with that NC3 code is no longer viable.

Local/Approved

The provider determines that the consumer is "local" (however that is defined) and the provider approves the transaction.

Not Local/Contingent Approval

The provider determines that the consumer is not local and the provider responds to the merchant with an approval that is contingent on receiving a response to a zip code query, with the proper zip code being entered. The merchant's pump asks the consumer for the zip code and accepts input from the consumer. If the zip code from the provider matches the consumer's entry, then the transaction is authorized.

No Communications Efficiency Gain or Loss

In existing systems, there are two sets of communication between the merchant and provider. In the first, the consumer swipes the charge card, the pump recognizes the consumer as not-local and asks for zip code confirmation. Upon confirmation, authorization is requested and received. The transaction is completed and the merchant transmits the total to the provider and receives an acknowledgement.

Under the NC3 system there are still two sets of communication between the merchant and provider, but they are organized a little differently. The first generates a Code-Z request along with a Code-A request. The response includes either a determination of local or the zip code of a not-local, and a contingent approval. The not-locals are asked for their zip code. If they reply properly, then product is dispensed.

Because the actual amount has not been transmitted, the merchant has to prepend the actual amount and the merchant's transaction identification to the QR-c information already received. This is the same process as shown in the discussion of Plain Text in Lieu of Batch Processing.

Figure 41:
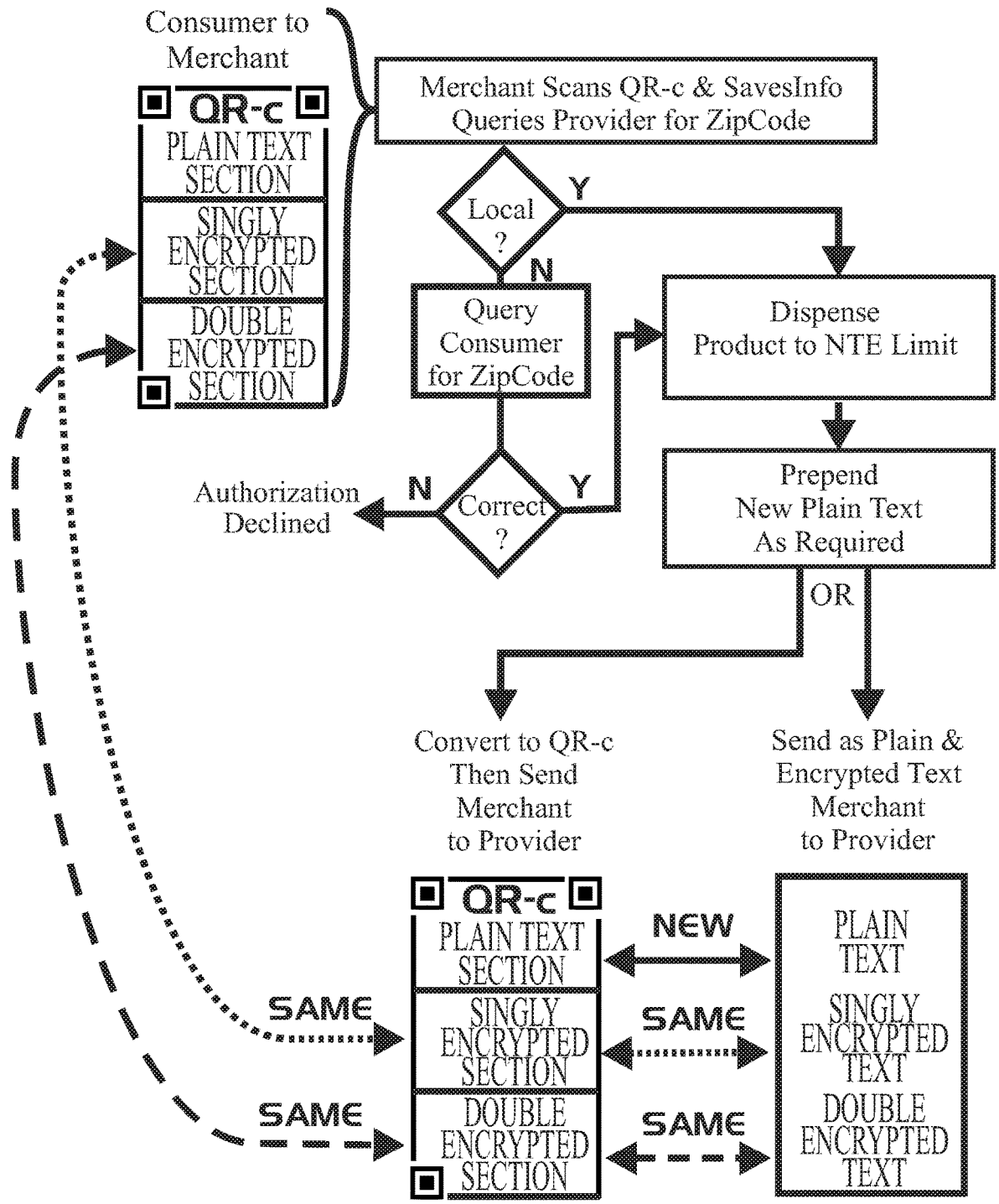
FIG. 41 shows a schematic diagram of the NC3 processing of Code-Z used in zip code verification.

A Code-Z determination is schematically shown in FIG. 41.

Ask Consumer First

In the same manner as a merchant may set a flag to initiate tip processing, such as discussed above with respect to Consumer Action 1—Optional Addition, the merchant's posted placard could contain a code to initiate a request for the consumer's zip code to be entered into the device and appear in the generated QR-c code like this:

| | |
|---|---|
| Gloria's Gas | < Merchant name |
| M: k813GH T: <ANY> | < Merchant ID, Merchant transaction ID |
| A: 50.00 | < Not to Exceed Amount |
| C: Cathleen Jones | < Consumer's name |
| NC3: KQ6asjTD | < NC3 Code |
| TL: YYYYmm[DD + 2]time | < Today's date (+2 days), time |
| Z: nnnnn | < Consumer's billing zipcode |
| S2: xxxyyyzzz | < Indigenous Authentication Code |

The merchant transmits the QR-c code for approval and the provider has the consumer's zip code for additional information. This does not segregate travelers from locals who may consider the continued request to be an annoyance.

Include Zip Code as Unchangeable Element?

The billing zip code could be one of the elements transmitted by the provider to the consumer with the NC3 code. It would be not changeable by the consumer and could automatically be provided in the QR-c code when requested by a QR-m code containing Code-Z. If non-local, the consumer would have to manually enter the code, but the merchant does not have to query for the comparison zip code. Even though locals would transmit their zip code, there is no additional effort or manual activity by the consumer. If this is done with existing charge cards, that might make this the preferable solution.

Prior to Charge Transmission

After the product is dispensed the QR-c code will be transmitted to the provider. In the plain text section, there will be a Code-AA: containing the actual amount and a Code-T: with the transaction identification.

Dynamic Placard

Some fuel pumps include very capable computing machines with a video display, numeric keypad and control keys. Once identified as an NC3 system consumer, the pump could ask:

What NTE value would you like?

Enter the value and press ENTER.

The consumer could press "4" "0" "enter" and the pump would display a placard-equivalent on the display. This version could include the transaction identification as well as a specific date and time.

| | |
|---|---|
| Gloria's Gas | < Merchant name |
| M: k813GH T: 5409135834 | < Merchant ID, Merchant transaction ID |
| A: 40.00 | < Not to Exceed Amount/Code-A |
| TL: 201211031600 | < Nov. 1, 2012 + 2 days, time |
| Z: | < Zip Confirmation Request/Code-Z |

Processing continues in the regular manner.

Further Notes

Implicit & Explicit Trust

The consumer has to trust the merchant not to exceed the not-to-exceed amount. In existing systems, the consumer implicitly trusts the merchant to process only the displayed and approved amount. In the NC3 system, the same implicit trust would be there, but the consumer's approval contains an explicit limitation.

Merchant Transaction ID

In the example under Recurring Charges with an Inconsistent Amount, the merchant transaction ID was provided by the merchant. That was possible because that transaction is for a specific customer transaction. A printed poster has to be non-customer and non-merchant transaction specific as the merchant transaction code would change for each customer. If the merchant implements Plain Text Modification in Lieu of Batch Processing, discussed herein, then the T: could be placed in the plain text section of the QR-c code.

Multiple & Dynamic Placards

The merchant may display several QR-m code placards, as discussed herein in reference to Dynamic Placard, for different not-to-exceed levels such as $20, $50, $100. The values might be higher in truck stops.

Pump Software Upgrade

The scanners and pump transaction software will need to be upgraded to process QR codes. It could take years, but also could be rolled out only as the scanners are in need of replacement. The optical nature of scanners, versus the contact nature of charge card swipers, may provide some justification for the cost of shifting to optical. Still, it is expected that swipers would be retained for the indefinite future.

Voice Command

Overview

Figures 42, 43, 44, 45:
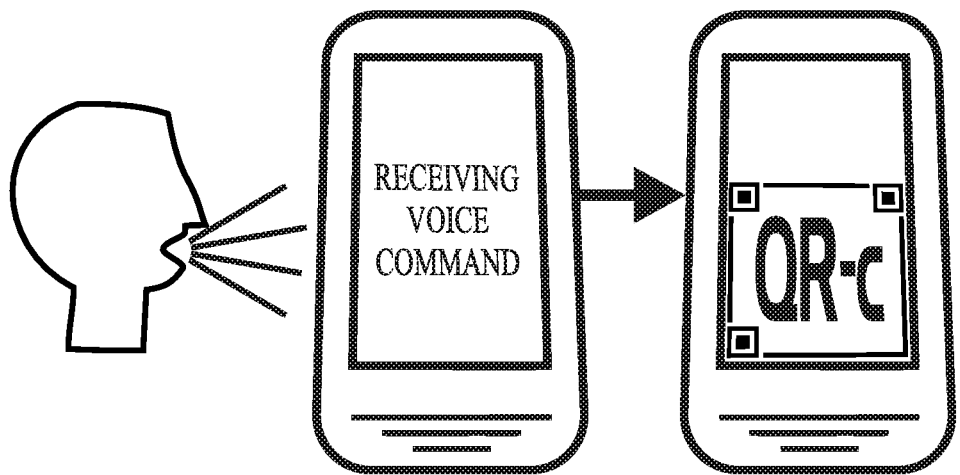
FIG. 42 shows the progression from a consumer to the smart device to the QR-c code using a voice command to generate a QR-c code.
FIG. 43 shows one entry in the voice master table without a specific merchant and without a specific order number.
FIG. 44 shows one entry in the voice master table without a specific order number.
FIG. 45 shows one entry in the voice master table with a specific order number.

There are many opportunities to use voice activated operations in the NC3 system, such as within the steps of acquiring details of a request for funds from one of the respective entities and/or obtaining authorization from the account holder to permit payment of such a request for funds. They all start with the consumer speaking a word, phrase or sound into a device. It even could be a grunt, and as long as it is reproduced with fidelity, it would be acceptable, and this is differentiated from voice-to-text inputs. As shown in FIG. 42, the device matches the word, phrase or sound to an entry in a "Voice Master Table" (VMT or sometimes shortened to "Voice Master"). Processing continues depending on the information for the VMT entry. Remember: QR-c codes are encrypted unless otherwise specified.

Mnemonic or not, Content-Free

A Voice Command can have meaning (such as in the example below for Any Merchant) or be totally devoid of meaning (such as for the Non-English Example discussed further herein). Voice Command elements are, in and of themselves, content-free. They require only that the consumer be able to repeat the word, phrase or sound with sufficient fidelity for the new sound to be adequate to match the original sound in the voice master table. There are no pre-defined commands, verbs, terms, etc. This is not a speech-to-text conversion, followed by a match. Literally, the consumer could whistle a tune and, if they can repeat it with sufficient fidelity for a match, the NC3 system would accept such as a Voice Command.

Voice Master/any Merchant

FIG. 43 shows a VMT table entry for the mnemonic voice entry "MAXTEN". An asterisk is used with the Voice Code to indicate a key, or index element. All index elements must be unique in any single table. Throughout this disclosure an asterisk is used to indicate unique elements. This example illustrates a command to prepare a QR-c code in the same manner as described elsewhere herein under No QR-m Code, with a not-to-exceed amount of $10. The table generates a QR-c code that contains the following information:

| | |
|---|---|
| ANY | < Merchant name |
| M: <ANY> T: <ANY> | < Merchant ID, Merchant transaction ID |
| A: 10.00 date time | < NTE, date, time of transaction |
| C: Cathleen Jones | < NC3 Code |
| NC3: nc3nc3nc3nc3 | < Time Limit |
| TL: yyyymmddtttt | < Nov. 1, 2012 + 2 days, time |

The consumer can create the associated QR-c code without additional information. Other entries may require additional information, such as from a Merchant Table and/or an Order Table, as described further herein.

Voice Master/Merchant Specific

To create the example entry in the VMT table shown in FIG. 44, the consumer must already have the merchant code in the Merchant Table. The table generates a QR-c code that contains the following information:

| | |
|---|---|
| Dunkin Donuts | < Merchant name |
| M: DD124 T: <ANY> | < Merchant ID, Merchant transaction ID |
| A: 10.00 date time | < NTE, date, time of transaction |
| C: Cathleen Jones | < Consumer's name |
| NC3: nc3nc3nc3nc3 | < NC3 Code |
| TL: yyyymmddtttt | < Time Limit |

Voice Master/Code-O

To create the example entry in the VMT table shown in FIG. 45, the consumer must already have the merchant code in the Merchant Table and an order prepared in the Order Table.

| | |
|---|---|
| Dunkin Donuts | < Merchant name |
| M: DD124 T: <ANY> | < Merchant ID, Merchant transaction ID |
| A: 15.00 date time | < NTE, date, time of transaction |
| C: Cathleen Jones | < Consumer's name |
| NC3: nc3nc3nc3nc3 | < NC3 Code |
| TL: yyyymmddtttt | < Time Limit |

O:"Lg Regular Coffee, 2× cream, zero sugar, apple fritter & choc covered crème bismark"

A QR-c code with Code-O contains information necessarily visible to the merchant, so the Code-O section of the QR-c code is not encrypted.

On the Fly Change

Figures 46, 47, 48:
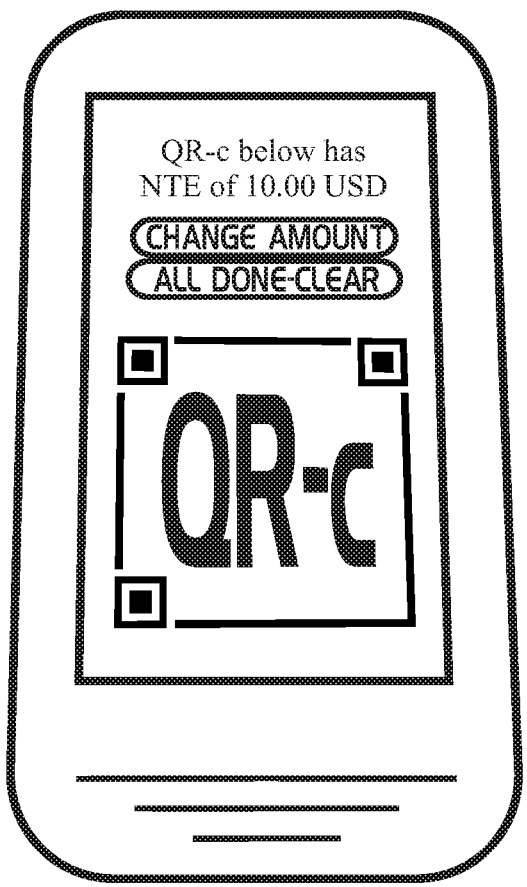
FIG. 46 shows the display screen of a generic smart device with a QR-c code and a not-to-exceed amount.
FIG. 47 shows one entry in the merchant table.
FIG. 48 shows one entry in the order table.

The consumer may be allowed to change the not-to-exceed value with the generation of the QR-c code. While this option should be easy to access, because this may be selected infrequently, the consumer should not be forced to do anything additional to bypass it. FIG. 46 shows one possible example presentation that may be presented to a consumer held device.

If the consumer elects the change option, the consumer will be prompted with a numeric keypad to enter a value and an option to select a specie code, or Currency Code-S, and then be returned to the screen shown in FIG. 46.

The Merchant Table/QR-mId

Additional entries to a Merchant Table, such as is shown in FIG. 47, come from placards at the merchant, web sites, advertisements or similar means. The Merchant Identification QR Code (QR-mId code) provides the merchant ID to the consumer in advance of a transaction, so that the consumer may prepare an order with Code-O. The consumer first scans the QR-mId code. The NC3 system should recognize the format and properly enter the new merchant in the Merchant Table, or indicate the entry already exists.

Consumers may delete entries in the Merchant Table, but not edit them. The literal "QR-mId" is included at the top of a QR-mId code to trigger actions by the device depending on what else is in the QR-mId code. It may just add an entry to the Merchant Table or prepare everything for a voice order.

The Order Table

Consumers may add, edit or delete entries in the Order Table, an example of which is shown in FIG. 48. A merchant must exist before an order for that merchant can be created. Also, notice that the pair Merchant ID and Order Number must be unique in the Order Table.

Optional Manual Input as Alternative to Voice Command

Figure 49:
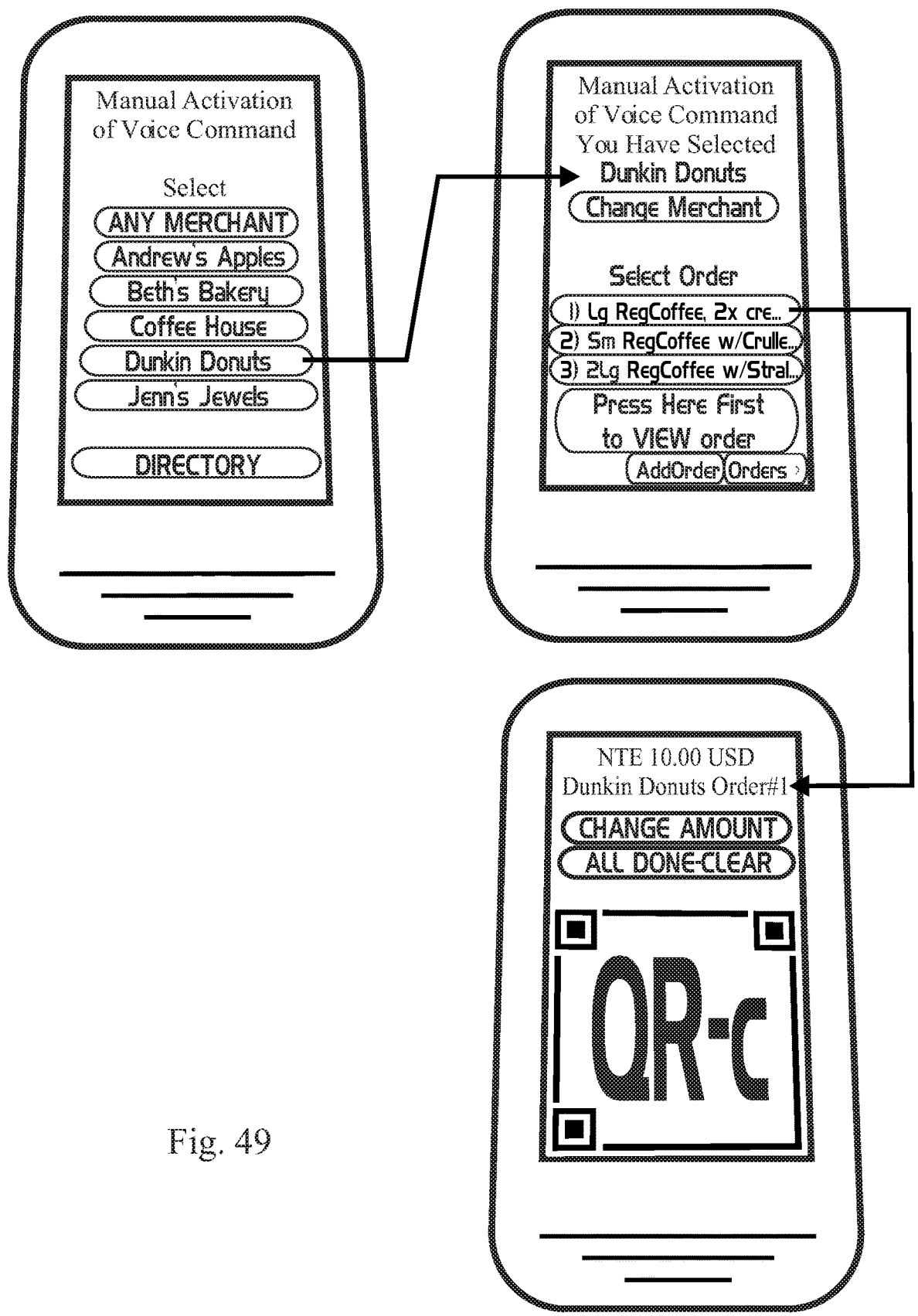
FIG. 49 shows the progression of manual access to predefined orders.

Consumers may also access the same information with manual (non-voice) input. For example the consumer may be prompted to Select Merchant. Merchants appear on the first page in order of frequency (adaptive order). Consumers are allowed to select the "Any Merchant" option. The directory would display the alphabet and allow the consumer to start spelling, or only the letters of the alphabet would appear for merchants already in existence. That is: if there were only merchants beginning with A, B, J, and R then only those letters would appear. There are many ways to present this, and an example of the series of views is shown in FIG. 49.

If the merchant has no orders then a Merchant Specific/Non Transaction Specific QR-c code would be prepared. If there was a single order for that merchant then the QR-c code for that order would be used in preparing the QR-c code. If there were multiple orders for that merchant, then the consumer would be prompted to select which order is to be used.

Display space on a screen may be limited and the entire text of an order may not fit inside the space allowed. If the consumer presses the "VIEW" option, then a listed order may be presented with the full text of the order, an option to edit, an option to delete, and/or an option to generate the QR-c code.

If there are more orders than initially displayed, the "ORDERS>" option will appear. If the consumer activates this option, the consumer will be presented with the next screen of existing orders. There may be a parallel option of "<ORDERS" that appears at the bottom. When activated, that option displays the previous page of orders. As the example displays the first page of orders, then the "<ORDERS" option is not applicable and is not displayed. Similarly, the last page of orders would not display "ORDERS>" at the bottom right corner.

In the example shown in FIG. 49, at the bottom center is an "ADD ORDER" option. From here the consumer is guided through creating a new order. On each screen the consumer also may be offered an exit option. Because a consumer may add, edit, or delete these functions provide for order table maintenance.

Non-English Example

Previous voice command examples used English words that contained some references to their content. FIG. 50 presents an example of what could be done with less reference.

The voice command Ka'plah (an Anglicized pronunciation of the original spelling Qapla from the Klingon dictionary, http://en.wikipedia.org/wiki/Klingon_language#Writing_systems) would be interpreted as shown in FIG. 50. In the QR-c code appears Code-S for Specie S:Darsek (a Klingon unit of currency). In this example the Code-S was not shown as defined in the Merchant Table or Order Table. Although there are not many speakers of the Klingon language, this example shows how the concept of Voice Command can be adopted to many languages. The table generates a QR-c code that contains the following information:

| Plain Text: | Encrypted: |
|---|---|
| O: "Blood wine, traditional container, warm, no froth, dash of bitters, stirred, not shaken." | Kang's Klingon Kafe<br>M: STR9Z4 T: <ANY><br>A: 20.00 date time<br>C: Koroth<br>NC3: nc3nc3nc3nc3<br>TL: yyyymmddtttt<br>S: Darsek |

Code-S (S for Specie)

The Code-S (S for Specie) relates to the currency being used. The consumer may change the "default" currency for transactions. However, consumer may not change the "native" currency which is used for billing and reconciliation.

In addition to the default currency type (created when the NC3 system is installed), it would be a simple matter to add additional currency types, so the Merchant Table would use a default or alternative currency. A selected currency reference would over-ride the default, so that a not-to-exceed value would be in dollars US, dollars Canadian, Euros, Swiss Francs, French Francs, etc.

To be forthright and helpful, when a consumer changes from their native Specie (the specie native to the account) to a local currency while traveling, a Code-S will appear for all transactions in the local currency. It may be better to always use a Code-S to catch the situation where the consumer neglects to change the default currency when traveling.

Code-R (R for Rebate)

Code-R (R for Rebate) is provided by a merchant either by placard or other display, such as an advertising flyer, to connect to a promotion of some variety. For example, a merchant identification QR code (QR-mId) may contain:

QR-mId
Dunkin Donuts
M:DD124 T:<ANY>
O: Large coffee, any donut
R: AARP Promo 8954 $0.99
A:2.00
S: USD The presence of a QR-mId triggers initial processing and the presence of Code-R causes preparation of an order, which may contain a Code-O (O for Order), by following these steps.

In the Merchant Table: If merchant "DD124" does not already exist, create a new entry for "Dunkin Donuts" M:DD124.
    Ask the consumer to record a word, phrase or sound for this entry.
    In the Order Table: If no orders exist for merchant DD124, create order "1". If orders exist for merchant DD 124, create the next order number.
    In the Voice Master Table: Create an entry for the word, phrase or sound as the index elements and include merchant DD124, the order number, and Code-A not-to-exceed $2.00.

Because USD is the native currency of the consumer's account, Code-S is ignored.

Display the Code-O information and ask the consumer to confirm or modify.

The Code-O order would initially contain the Code-R elements like this:

Order:"<Large coffee, any donut R:AARP Promo 8954 $0.99>"

Text in the angle brackets is not consumer editable. But, the order can be deleted. The consumer may pre-pend and/or append alterations. For example:

Order:"2x Cream, no sugar <Large coffee, any donut R:AARP Promo 8954 $0.99> crèam filled, choc covered bismark"

When implemented, Code-R should have some form of expiration date as well as a flag to indicate pre-tax or after tax amounts.

Security

National level cell phone theft is on the rise and has been the subject of increasing media attention. It would be advantageous to have financial related applications be specifically secured on such devices. General security (the general phone lock/unlock feature) may be ineffective as the phone may be in use, and hence unlocked, when stolen.

The NC3 system may lock itself when closed or inactive after a time. When the application that runs the NC3 system is opened, or reactivated, it may be set to display or speak a request for a password. No keypad or input method is made evident. However, the user has two unlocking options: voice and pad.

Voice Unlock

Unlike a numeric keypad or typed phrase, the unlock "noise" in the form of a selected sound is not recorded as something you can play back, but rather as a code derived from the sound. Thus, it is not the sound itself The unlock "noise" has to be received from outside the device. Therefore, even if a crook knows the unlock noise, if the crook is unable to pronounce or replicate the sound correctly, it will not work to unlock the application.

Pad Unlock

Optionally, although also less secure, a consumer could enter a numeric entry by tapping on an imaginary 12-digit numeric keypad, for instance, with the display in portrait orientation. The display would show only the request for a password, as no keypad image or grid would appear.

Temporary Disability and Notification Alert

The ability to generate QR-c codes could be disabled after a set number of failed attempts, such as three. A message could be displayed, after three failed attempts, that the consumer needs to unlock the application at the provider's secure web site, or via another unlocking service that would require human intervention at the provider's end.

The NC3 system application would not have to be re-installed, so loss of all defined items would be avoided. The NC3 code would not have to be re-provisioned, just unlocked. After being disabled, an alert email could be sent, ideally to an account not on the smart phone device, with GPS coordinates of the device.

Alarm

If the number of attempts to unlock the application is two or more greater than the amount specified for the temporary disability, the device could be set to silently and continuously ping cell towers, or provide some other method of being tracked as though it were stolen. As a further intervention, an email could be automatically sent to the provider's security service, and the provider can attempt to reach the consumer by a method other than via the cell phone device.

Reactivation

One method of reactivation is to require human intervention, which would require the consumer to provide adequate identification. For example, a provider could generate an email containing an unlock QR code that is custom and is made from the consumer's NC3 code and another unchangeable item such as the consumer's exact name or zip code. The unlock code also could contain an expiration date and time of short duration.

The reactivation QR code preferably would be encrypted with the same codes used to transmit the original provisioning QR code, such as is described with respect to NC3 system activation.

The consumer may receive the email and drag-drop it on top of an NC3 system application icon which would then cause the reading of the reactivation QR code, recognition of a reactivation sequence, decryption of the information, matching of the NC3 code and other elements identification to what is already in the system, and confirmation of the expiration date and time that have not passed. The device would then be reactivated.

Support for Visually Challenged

Routine Operations—The NC3 system is easily adapted to serving the special needs of visually challenged persons (VCP). For example, after scanning a graphic matrix code containing a request for funds (QR-m code), the device may instead of displaying a request for authorization, utilize a text-to-speech capability and say, as a generic example of <merchant name> is requesting a payment of <amount> for <transaction identification>. A more specific example would be "Merchant Kroger wants twenty two dollars and sixteen cents. Is that ok?" In a similar manner other functions can be processed.

Security—For security purposes the request for password could be spoken instead of displayed. The consumer may need assistance in setting the password, or could be voice guided. This voice-activated security capability also is valuable for general usage.

Replacement application—For processing speed, the VCP version might be a supplemental or a complete replacement application, so that VCP users benefit from potential optimizations that don't generate non-value-added overhead processing for non-VCP users. Initial options allow the suppression of repetitive elements, such as the prefixed word "merchant" and for shorter phrases.

Types of Transactions and the Structured Logic

Figures 51, 52:
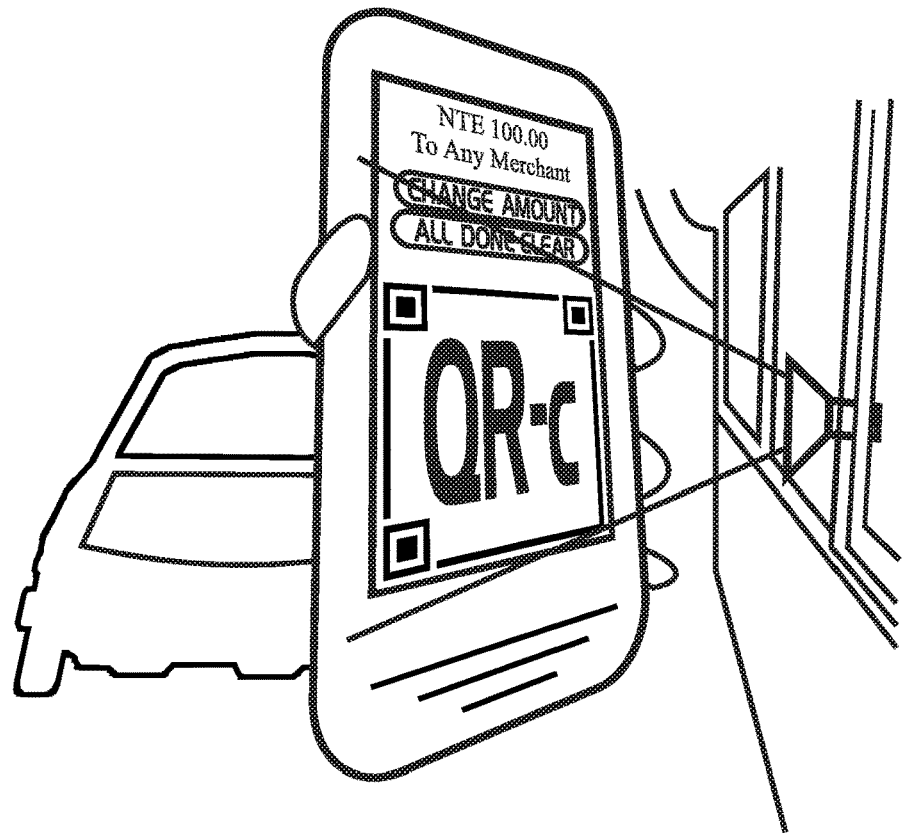
FIG. 51 shows a diagram that presents structured logic for the NC3 system.
FIG. 52 shows the screen of a smart phone being used in a drive through flash transaction.

FIG. 51 presents a Nassi-Shneiderman diagram, which is a very useful tool in setting forth a form of a flowchart that imposes and displays a structured logic to insure that when faced with a type of transaction, all options are addressed. The diagram is rotated 90 degrees counterclockwise from the traditional orientation, so the bottom (now right-most) information is easily read in a left to right orientation. The diagram is used by asking a series of yes-or-no questions about a potential charge card transaction and traversing through the questions from left to right. The following are the questions posed in the diagram.

Existing Authorization?

This would be in the context of a recurring transaction, so the inquiry is as to whether there is an existing authorization? If yes, follow the Y path to Consistent Amount? If no, follow the N path and this will concern P2M transactions discussed elsewhere herein.

Merchant Identified?

This is a non-transaction specific path where there is a Code-A, for an amount not-to-exceed. If the merchant is identified, follow the Y path which concerns retail, physical presence purchases that may utilize a Placard Purchase arrangement. If the merchant is not identified, follow the N path which concerns retail, physical presence purchases that may utilize a Drive Through Flash purchase arrangement.

NTE Code A?

In this non-transaction specific path the inquiry is directed to whether or not there is a Code-A for a not-to-exceed (NTE) amount? If yes, follow the Y path to the Merchant Identified? question. If no, follow the N path and this will be considered to be a Disallowed Transaction.

One Time?

The question "One Time" refers to the transaction as a single event, or as part of a series of events. Going to a restaurant, even if you go to that same restaurant once a week, is a one time transaction. If it is a one time transaction, follow the Y path to the inquiry for Special Action Code? The transaction of receiving a utility bill, every month, and paying that bill would make such a transaction not a one time transaction, but rather it would be considered to be a recurring transaction. In such instance, follow the N path for Recurring Transaction which leads to the question Existing Authorization?

Special Action Code?

If the situation involves a one time transaction, then it raises a question as to whether there is a code that requires special action? If there is (the more common being Code-G for gratuity and Code-Z for zip code), then follow the Y path which is associated with examples for retail, physical presence purchases involving special codes, such as may be used in a restaurant for a Code-G or a gas station far from home. If not, then follow the N path and which is associated with examples for retail, physical presence purchases, such as in a grocery.

To Person?

This question asks whether the transaction is to a person, which would be to someone who is not a merchant. If yes, then follow the Y path and this would involve Person-to-Person Payments or P2PP. If no, then follow the N path and the transaction is of a type that involves a merchant.

Transaction Specific?

For those transactions involving a merchant, this question asks whether the transaction is transaction specific, which if yes, following the Y path would carry with it a question regarding a merchant identification and merchant transaction identification. These identifications generally are provided in the QR-m code, QR-mId, or a functional equivalent. If no, then follow the path to the NTE Code A query.

EXAMPLES

NC3 Flash Purchase at a Drive Through

A hypothetical is presented with FIG. 52, in which a person lost an office coin toss and has to drive to purchase a classic fast food order of burgers and fries. Ordering for more than a dozen people leads to a need for the person to use their charge card. The account holder uses the Voice Command for "Any100" and presents it. The cashier extends a scanner gun, scans and rings up the order for $81.42. The purchase is approved, food is provided and the person is on their way to deliver lunch.

Drive through transactions present interesting interactions behind the scenes. In drive through environments, such as for purchases of fast food and pharmacy items, the NC3 system offers the benefit of speed and convenience. There is no reaching for a wallet or purse while wearing a seatbelt. The cost for the merchant includes a hand scanner to meet the consumer part way or a camera sensor that can be aimed and zoomed for scanning from inside the cashier's station.

The Codes & Tables

The transaction would include information sufficient to fill the following fields. In this example, the account holder would be using the voice command feature.

| Voice Sound Table | Sound: {AnyOneHundred} |
| --- | --- |
| | VoiceCode: Any100 |
| Voice Master Table | Voice Code* Any100 |
| | Merchant ID <ANY> |
| | Order # <NULL> |
| | Not-to-Exceed 100.00 |

The sound {AnyOneHundred} could be any word, phrase or noise for the order. Any value is allowed.

After activating the order, the consumer would display a QR-c code to the merchant, an example of which is shown below.

| QR-c code (account holder to merchant) | Plain text: |
| --- | --- |
| | -none- |
| | Single Encryption: |
| | NC3: KU84NQPD |
| | Double Encryption: |
| | M:<ANY> T:<ANY> |
| | A:100.00 Oct. 1, 2012 7:59AM |
| | C:Cathleen Jones |
| | NC3: KU84NQPD |
| | TL: 201212040859 |
| QR-c code (merchant to provider) | Plain text: |
| | M:MCD0N81312 |
| | T:20121204-231-9334 |
| | AA:81.42 |
| | Single Encryption: |
| | NC3: KU84NQPD |
| | Double Encryption: |
| | M:<ANY> T:<ANY> |
| | A:100.00 Dec. 1, 2012 7:59AM |
| | C:Cathleen Jones |
| | NC3: KU84NQPD |
| | TL: 201212040859 |

Transit & Code-L

Some transit authorities have accepted cash (bills and/or coins). Some have even minted their own currency in the form of tokens, or issue simple passes. For example, in Chicago, Ill., in 2012 the options for the Chicago Transit Authority (CTA) include the Chicago Card® and Chicago Card Plus®, which are accepted for full-fare payment on all CTA rail and bus routes and Pace buses with automated fare collection equipment. To fund the passes the user can add value to a card by using a Transit Card Vending Machine, or Touch-n-Go locations, or at Express Vending Machines at selected locations.

In 2013 the CTA will start using "Ventra", which is another special card. The CTA also is allowing contact-less personal issued credit and debit cards. However, it would be a sad surprise to miss a train because your special pass ran out of funds. They also will allow "tapping" of "compatible" mobile phones. This appears to be a system much like use of NFC, which is in about one quarter of all phones.

By comparison, it would be nice to use something that a consumer or account holder already carries; something that does not need reloading, and does not radiate the consumer's information. The NC3 system on a capable smart phone would appear to provide the desired utility, with such ease of use.

One Time Registration

Figure 53:
FIG. 53 shows a QR-mId code during registration on a merchant's web site displayed for mobile viewing.

An example for use of the NC3 system for CTA transactions, includes that the account holder first would go to the CTA web site and click on Registration. The web site would display a QR-mId, as shown in FIG. 53, that the account holder would scan, approve and pay. The device may ask the account holder to record a word, phrase or sound, so that the Voice Command could be used. The account holder may, for example, choose to utter the phrase "BusPass".

Recurring Use

Figure 54:
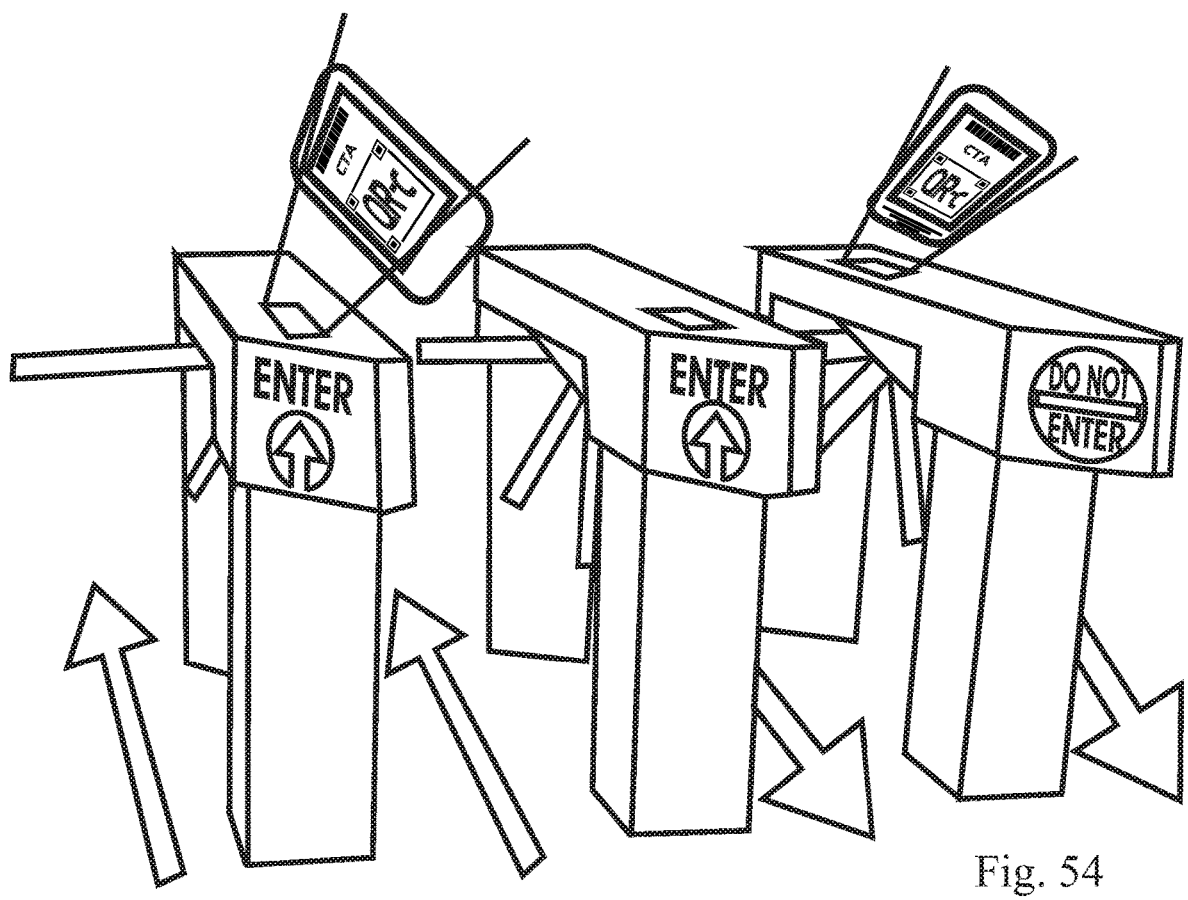
FIG. 54 shows a smart phone being used on entry and exit for a transit transaction.

When needing to make a similar purchase to again ride within the CTA system, the account holder may retrieve the smart phone and say "BusPass", while entering the transit turnstile/kiosk. The QR-c code would appear and the account holder would scan it to enter the system. On the way out of the transit system, the account user would repeat the procedure, as may be required by some systems, for instance, as shown in FIG. 54.

Behind the Scenes

This transit example will be discussed by providing an analysis from each constituent point of view after describing the NC3 system transactions.

Transit charge processing has an inherent desire for speed. Long lines of people waiting to board buses, trains and other commuting conveyances do not enjoy waiting and can cause safety and security concerns. To that the NC3 system does not include QR-m code scanning in a line.

The example describes a train situation using an unmanned turnstile. However, a scanner also could be placed on the inside of an attendant booth with a turnstile and a smart phone could be placed against the glass of the booth to be scanned. This could occur regardless of the presence of an attendant.

The turnstiles/kiosks could include contact scanners (where the account holder's device needs to be placed for scanning), or non-contact scanners (where the account holder's device needs to be within a certain range and not moving faster than a specific allowed speed). FIG. 54 shows the smart phone out of tolerance for the expected non-contact scanner to convey the concept. Realistically the smart phone should be between one and six inches from the scanning plate and moving at no more than roughly four miles per hour (just less than a rapid walk). Buses also could have similar scan plates or devices, but may choose to store transactions rather than transmit immediately.

Registration Codes for the Transit Example

| QR-mId | |
|---|---|
| First the account holder goes to the CTA web site and clicks on "registration." The site displays a QR-mId that is scanned. The presence of Code-L populates the Affiliation Code Locker (ACL) entry below. | Plain text: QR-mId CTA M:CTA88 T:<ANY> A: 4.00 L: C1*, CTA, 930574902, I2OF5, DCD/SCD |
| Affiliation Code Locker | |
| The ACL table is briefly described herein. | AC_Key* C1 AC_Label CTA AC_Value 930574902 AC_Display 12OF4 AC_Mode DCD/ACD |

| Merchant Table | |
|---|---|
| The Merchant Table confirms existence of an entry, or gets a new entry, for Voice Sound Table | Merchant ID* CTA88 Merchant Name CTA |
| The account holder is asked to record a word, phrase or sound for this entry. There is a request of the account holder "BusPass"} to name the sound: BUSPASS Order Table | "BusPass" Sound* {sound value for VoiceCode BUSPASS |
| A Code-L is used in place of the more common Code-O. This indicates a dual code display when using this order with merchant CTA88. Voice Master Table | Merchant ID* CTA88 Order# 1 L: C1 Voice Code* BUSPASS Merchant ID CTA88 Order #1 Not-to-Exceed 4.00 |

Notice that the presence of BUSPASS does not preclude other entries using the same merchant and affiliation code. Another entry would be created in the Voice Master and Order tables.

Usage Codes

QR-c code (account holder to merchant)—Account holder goes to get on the train and activates the order (either manually or via Voice Command) this QR-c code will be generated. The presence of L:C1 causes a lookup of the Affiliation Code Locker, entry C1 which has as its last element DCD/ACD meaning to put up the dual code display. The AC_Value of 930574902 is included in the plain text of the QR-c code for convenience of the transit company.

Plain Text:
930574902
T:<ANY>
Single Encryption:
NC3: KU84NQPD
Double Encryption:
M:CTA88 T:<ANY>L:C1
A:4.00 12/03/2012 6:29AM
C:Cathleen Jones
NC3: KU84NQPD
TL: yyyymmddhhmm QR-c (merchant to provider)—After scanning the QR-c code the merchant removes from plain text the AC_Value and adds to plain text the merchant's transaction identification (T:) and the actual amount (AA:).

Plain Text:
T:20121204-231-9334
AA:2.04
Single Encryption:
NC3: KU84NQPD
Double Encryption:
M:DD124 T:<ANY>L:C1
A:4.00 12/03/2012 6:29AM
C:Cathleen Jones
NC3: KU84NQPD
TL: yyyymmddhhmm For single price transactions the QR-c code (as transmitted) could be sent at entry into the transit system. If the price is dependent on the exit, or the relationship between entry and exit, the price would be sent at the exit. The AC_Value (first item in plain text section of the QR-c code, for account holder to merchant, see above) is the link between the two activities and their transactions.

Not discussed above—an email could be sent to the consumer for each transaction, or better, a weekly reporting showing date, time, station, and fare. If the transit system uses a two-element charge (such as that for distance and/or congestion pricing), it may be Entry (date, time, station), Exit (date, time, station) and fare.

Consumer—why they Will Like it

Account holder's would like this system because there are no more wasted fees from expired passes, no need to keep track of another faux-currency in the form of passes or tokens, and the account holder cannot run out of passes or tokens unexpectedly. In addition, RFID and NFC snooping threats would be eliminated.

In systems that don't have distance and/or congestion pricing, it may be that fares would rise for some users. However, the fares could be made more equitable compared to the value received. That may be useful to the merchant or transit authority in marketing and allow consumers to feel they have been treated fairly.

Merchant—why they will Like it

Electronic payments have different and fewer security concerns compared to handling cash. There would be no need to mint tokens or prepare passes, both of which can be stolen and used. Electronic payments reduce other costs. The costs of "refill" stations or kiosks can be reduced as riders would go to the NC3 system. Optical readers live longer than mechanical magnetic swiper systems. Also, RFID and NFC snooping threats are eliminated.

Dynamic electronic forms allow for variable zone and/or congestion pricing. Affiliation Code Locker could be used to identify each consumer at entrance to and exit from the transit system. This requires the consumer to register as a unique consumer of the system. A charge, such as for example $1.00, could be levied for registration and would allow the merchant to confirm there is a valid authorization in existence. Or, the merchant could present a QR-mId that includes a Code-O containing the consumer unique ID and a not-to-exceed value.

In use, a transit system notes the embarkation and debarkation points and times. Pricing is variable depending on distance traveled and time of day. It may be that the 10 miles nearest the city carries one base fee per mile and the farthest 10 miles costs more. The consumer or account holder may pay a constant amount per unit of service used (miles) and the same fee per trip, regardless of distance. Many variations are possible.

It is possible that some costs will increase in the form of charge or debit card transaction fees. However, the provider may decrease fees in exchange for batching transactions for processing during otherwise low processing times. Also, while there may be no value derived from paid for, but unused passes, tokens or other faux-currency, paying a fair price for a service should be the core of the operational margin, not profiting from loses incurred by consumers. This could be emphasized in an attempt to gain consumer loyalty by virtue of the increased "fair" treatment. The ability to impose distance and congestion pricing should more than offset the rewards that came from lost value to consumers who lost or failed to use rides they'd paid for.

Provider—why they will Like it

This system would provide an additional high volume stream that requires consumers to be NC3 system members. It is recognized that despite the high volume of transactions, the per-transaction value would be low. Nevertheless, even if the per transaction margin is lower than average existing transactions, each consumer could be a new consumer. That makes the reduced margin partially due to new consumer acquisition expenses. Batching also would allow for more efficient high-volume processing.

Person to Person Payments (P2PP)

The NC3 system may be equipped to handle person-to-person-payments (P2PP). A person-to-person payment (P2PP) is defined as being from one sender (essentially one consumer or account holder where consumers are generally individual persons) to a recipient (essentially another consumer) where neither the sender or recipient is an established merchant and neither is an established provider. Thus, in this disclosure, to avoid confusion with the descriptions of other transactions, instead of simply referring to P2PP transactions as being between consumers, it may be helpful to instead of using consumer, merchant and provider, to use alternative terms.

Definitions

In the P2PP context, Sender means the initiator of the funds transfer. The sender must have properly completed certain initialization requirements as described herein. In the P2PP context, Recipient means the intended receiver of funds. The Sender-Provider is the NC3 system provider for the sender. The Recipient-Provider is the NC3 system provider for the recipient, if the recipient is part of the NC3 system.

Some QR Abbreviations Used

As found in the table in FIG. 39, certain abbreviations are used in describing the P2PP transactions.

| Abbreviation | For Person to Person Payments this Means |
| --- | --- |
| QR-c-P2PP | From Sender to Recipient |
| QR-c-P2PP-RFA | From Recipient to Recipient-Provider, a Request for Account Information |
| QR-c-P2PP-RAI | From Recipient-Provider to Sender-Provider with Requested Account Information or created by a recipient who is not part of the NC3 system. |

Framework

The framework of the NC3 system makes P2PP generally straightforward. In keeping with the NC3 system framework, security, communications efficiency, increased functionality and ease of use are critical. To that end, the receiver's status as a family member, friend, or even an unknown individual, does not matter. It also does not matter whether or not the receiver is served by the same provider. For mobile transactions, internet connectivity should not be required.

Security

For P2PP general account information (bank account number, ABA routing number) for any party is confidential and is not revealed to the other party. Improper transmission to the wrong party should not allow the improper recipient to deposit the funds. Initially, system-defined limits would be in place regarding the maximum amount that may be paid in this manner. The limits may be expressed as dollars per transaction, dollars per day or some other term. The number of transactions also may be limited. The sender may apply to have those limits raised. In general, such a request should be granted, if and only if, the sender provides a writing (or electronic equivalent) acknowledging the responsibilities attendant there to.

Communications Efficiency

The sender could be using a desktop computer, a smart phone or similar NC3 not affected by those barriers. If the former, an application could be provided from the provider's secure web site. From a mobile device to another is the more commonly expected scenario.

The sender should initiate, and the receiver should accept and forward to a provider or service for realization of the transaction. Thus, outside the provider, this is a two-step transaction.

Increased Functionality

Funds may be sent from any account defined by the sender. The funds must be able to be deposited in any account defined by the recipient. Senders must be members of the NC3 system. Recipients may or may not be members. The sender does not need to know the recipient's status as to membership. Also, recipients may receive transactions from senders who are affiliated with different providers.

Sender Initialization Requirements

NC3 System Participant

The sender (not the recipient) must be an NC3 system participant through a provider.

Define Account(s) to NC3 System

To set up an account as the source of a P2PP transaction, the account must be defined and authenticated to the NC3 system in advance. The sender must provide complete access information. For a bank account (demand deposit, savings, money market, etc.) this generally would require the ABA routing number, the account number and the name of the account.

The defined account(s) must have a "nickname" that should be non obvious. "Checking", "Savings", "CK", "Say", "MMA" should be disallowed. "BillsChecking" would be nominally acceptable. "Cking42%" would be better.

Authenticate and Record Sending Account(s) to NC3 System

The provider must authenticate the sender's ability to access the account to the NC3 system. This validates "ownership" and the right to transfer funds from the account. There are many ways to do so, but sending two deposits of nominal denominations and then asking the sender to revisit the provider's web site and recount those two deposits would be straight forward. Because ACH transactions are not instantaneous this might take a business day, or more. Once the sender's account is authenticated, the sender records or adds the nickname to the NC3 system application on the sender's device, so a drop down menu may be presented with the options.

Authorize Receiving Account(s) to NC3 System

It may be that the sender's account needs to be authorized to receive ACH transactions from the sender-provider. This would need to be done prior to initiating a P2PP transaction.

Identify Recipient

Identifying a recipient can be done in advance of any transaction or as the first step in making a transfer. The minimum information required to identify a recipient may be their cell phone number and their name.

Recipient Initialization Requirements

The recipient must have a cell phone capable of receiving text messages with attachments and an account capable of receiving ACH transactions. The recipient need not be a member of the NC3 system. The members of the NC3 system do not retain their account numbers in their devices.

P2PP Example Transaction

Sam Stubble made a deal on Craigslist® to buy a zero-radius turn mower from the estate of Robert Buttons, which was being liquidated by his nephew, Billy Bob Buttons. The deal was for $900, but Sam didn't have his trailer to transport the mower. Billy Bob was amendable to a P2PP transaction and Sam could pick up the mower in a few days, which would give the P2PP time to clear. Sam already had defined MySavAcct to be ABA:022-934-165/ACCT: 1199773322. At the time of sending, Sam didn't know if Billy Bob was an NC3 system member or not.

Sender

Sam took out his smart phone, unlocked it, accessed the NC3 system function, selected P2PP, and entered:

| | |
|---|---|
| How Much? | $900 |
| To Whom? | Billy Bob Buttons |
| Their Cell#? | 123-456-7890 |
| From Where? | MySavAcct |
| Note? | ZeroTurn Mower |

Sam entered the approval code and hit send.

Sender's NC3 System

Figure 63A:
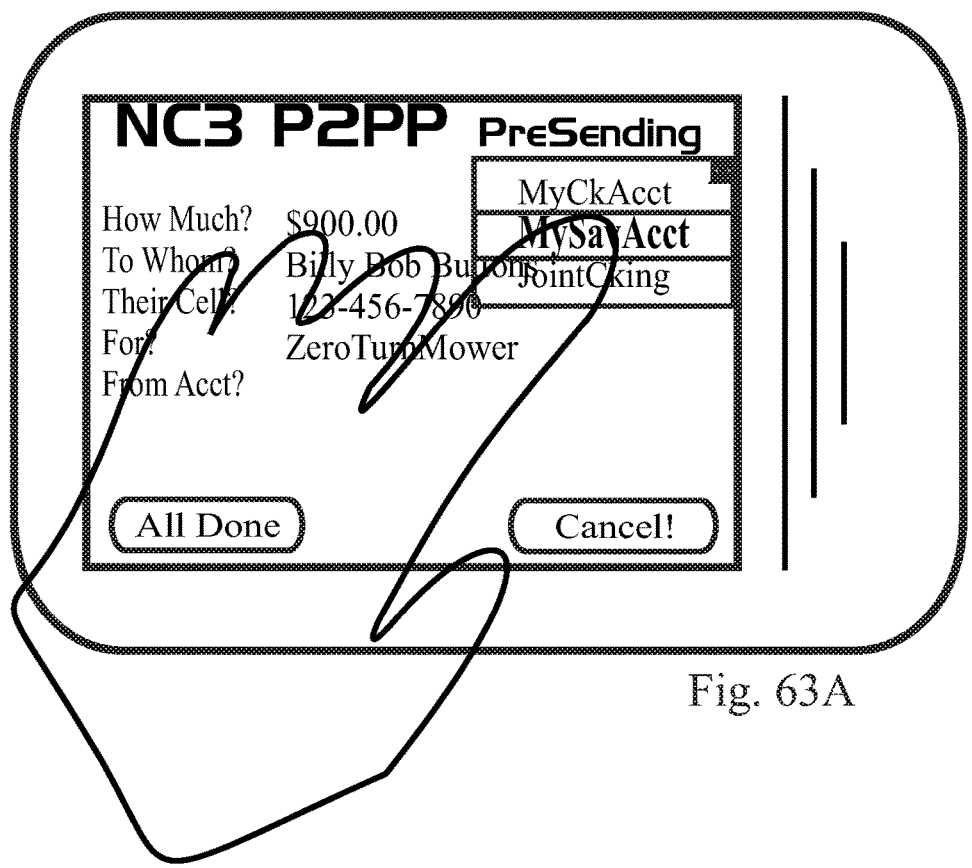
FIG. 63A shows an exemplar screen formatted for a mobile device for the sender of a person-to person transaction.

As Sam entered each item, his NC3 system performed some quality control. The amount was less than or equal to his maximum value limit on his account and he was under his number of transactions limit. Billy Bob's cell phone number was at least properly formatted. Because Sam had defined more than one source account, the "From Where" response was selected from a drop down, as shown in FIG. 63A, so that was ok.

Once all the data was entered, the NC3 system asked: "Are you sure you want to send $900 from MySavAcct to Billy Bob Buttons at 123-456-7890 for a ZeroTurn Mower?"

The options were YES-SEND, NO-EDIT, CANCEL.

CANCEL would ask Sam to confirm cancellation.

NO-EDIT would take Sam back to the screen to edit the information.

Sam actually selected YES-SEND and his NC3 system performed the following steps:

The NC3 system prepared a QR-c-P2PP that contained the following:

| QR-c-P2PP From Sender to Recipient | |
|---|---|
| Plain Text Section | <P2PP $900.00 123-456-7890 Fm Samuel Stubble for ZeroTurnMower. Fwd to nnn-nnn-nnnn. Www.Sender-Provider.Com/P2PP> |
| Single Encryption Section | K4Nkjh6as |
| Double Encryption Section | Billy Bob Buttons M:P2PP T: $900.00 May 1, 2014 2:59PM C:Samuel Stubble NC3: K4Nkjh6as TL: 201405021459 P2PP_From: MySavAcct P2PP_Recip_Tel:123-456-7890 P2PP_Memo: ZeroTurnMower P:<PT>nnn-nnn-nnnn |

The plain text section is internal to the QR-c-P2PP and duplicated in the text message itself. In the text message, the URL should be hypertext for easy click through. Notice there are less than 150 characters. The plain text is automatically generated from provided elements. The sender may be given the opportunity to add text to the message, but what is inside the angle brackets cannot be edited. P:<PT>nnn-nnn-nnnn is the sender's NC3 system provider's number that receives P2PP requests via text message. Notice that this appears in the double encryption as well as the plain text section.

Then, Sam's smart phone is instructed to transmit a text message to Billy Bob's cell phone at 123-456-7890, with the plain text elements duplicated in the message body and the QR-c-P2PP (above) attached as an encrypted string or image.

Notice that Sam still does not know if Billy Bob is an NC3 system member.

Recipient—Part of NC3

Figure 55:
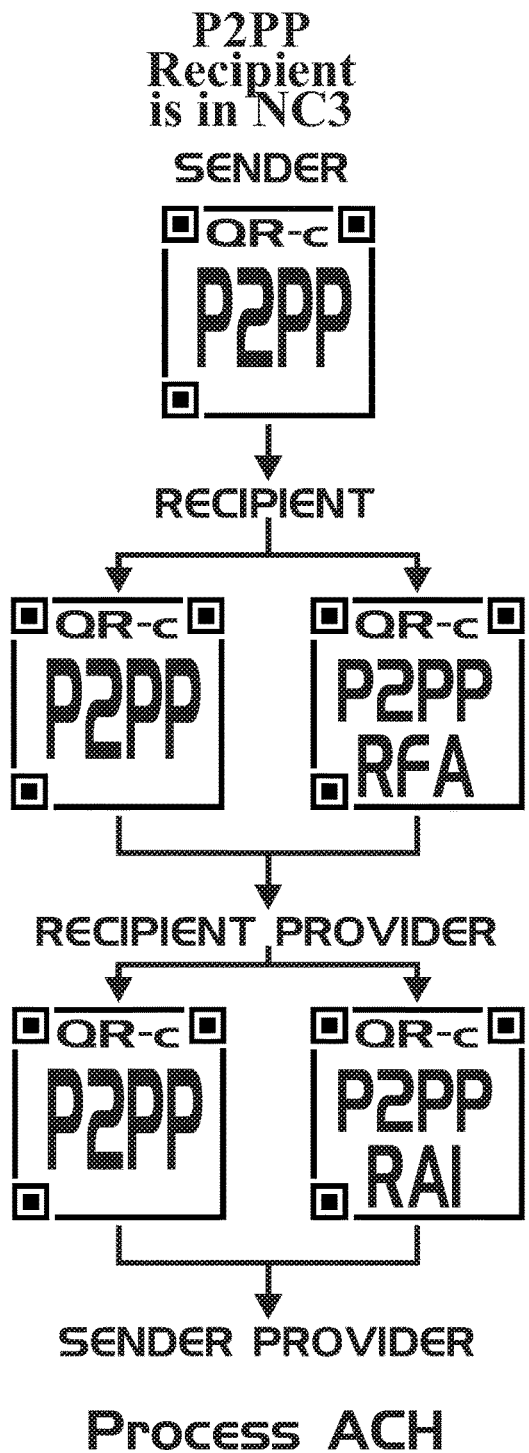
FIG. 55 shows a flowchart for a person-to-person transaction with a recipient that is in the NC3 system.
Figure 56A:
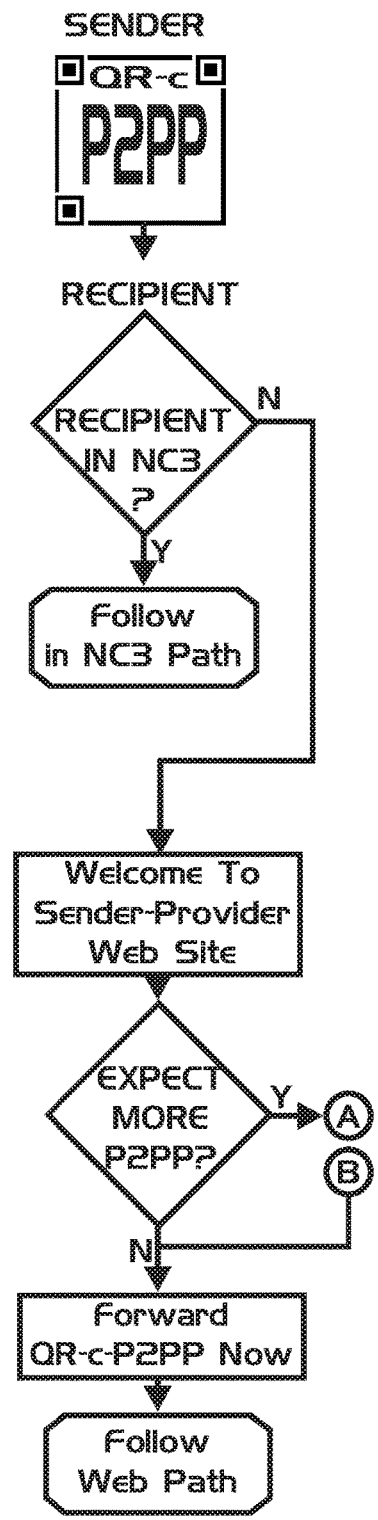
FIGS. 56A-56C show flowcharts for a person-to person transaction for a recipient not in the NC3 system and using web access path processing.
Figure 56B:
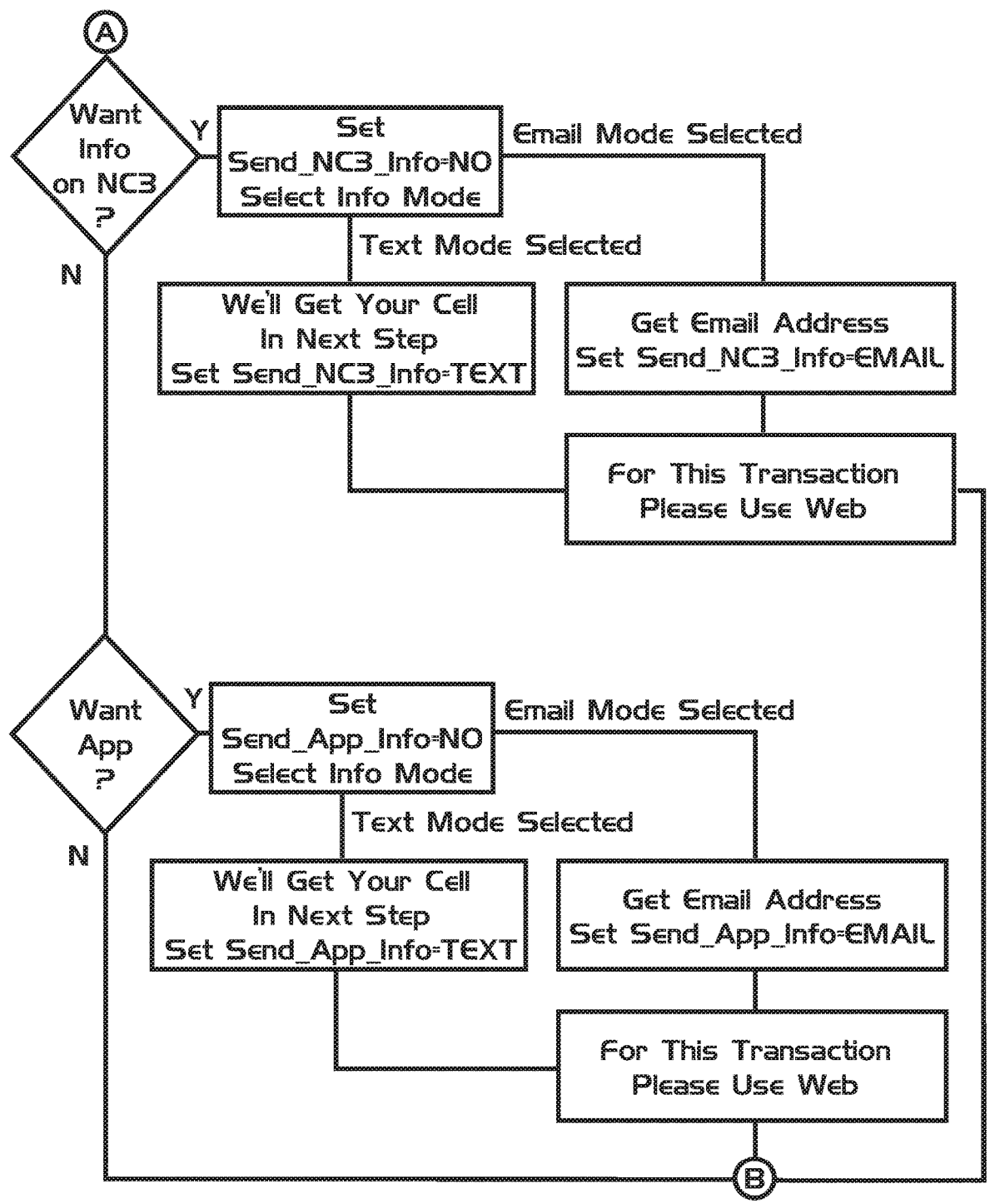
Figure 56C:
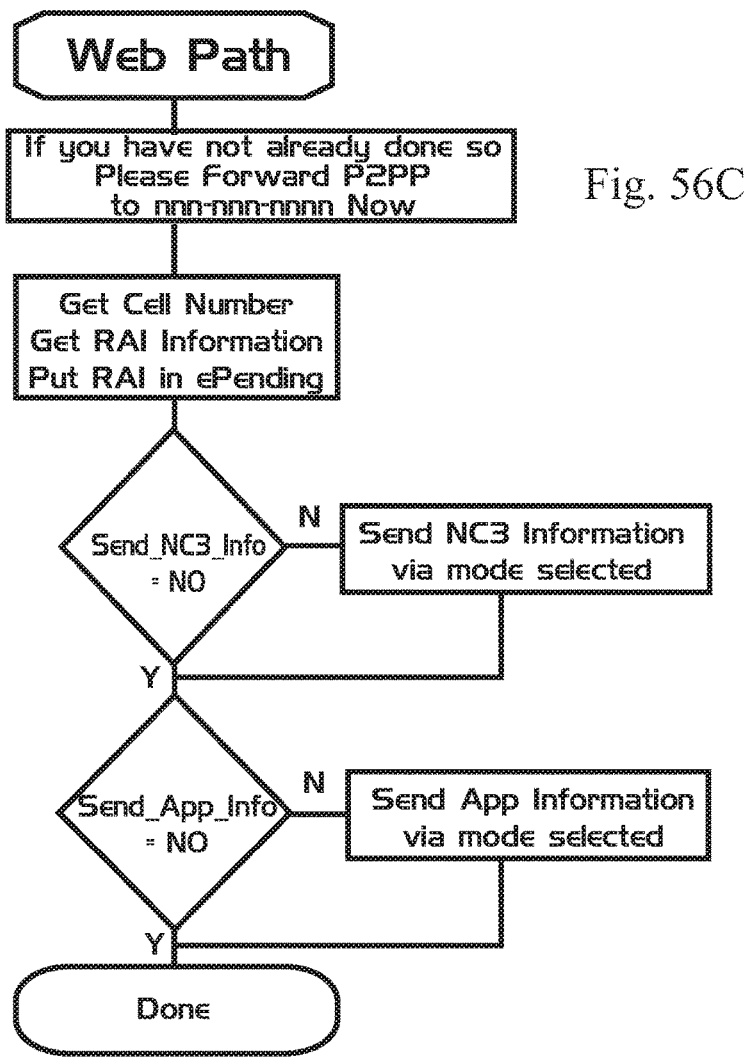
Figure 56D:
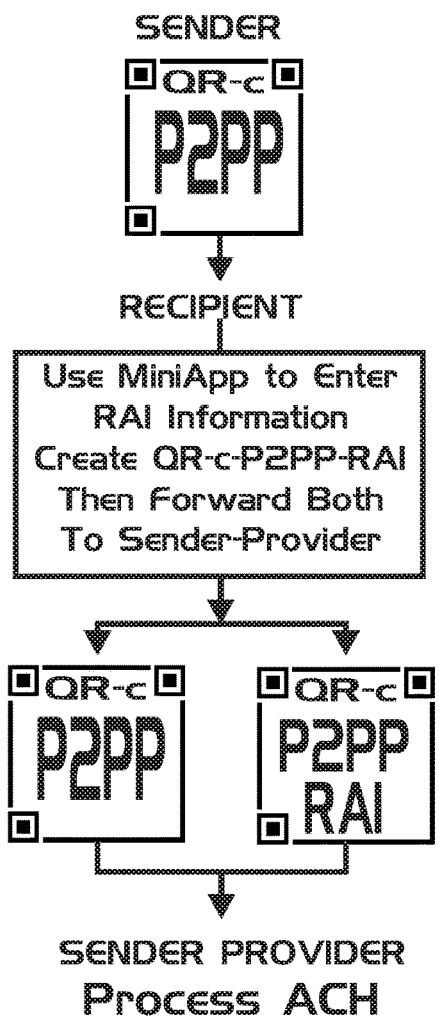
FIG. 56D shows a flowchart for a person-to-person transaction for a recipient not in the NC3 system and using the MiniApp for processing.

For this example, FIG. 55 is a flowchart that shows what happens if Billy Bob also is a member of the NC3 system. He receives the QR-c-P2PP and text from Sam. The flowchart uses the image notation for a P2PP related QR-c code, but the information could also be conveyed as plain-text and encrypted characters.

Recipient Processing

The recipient, Billy Bob, would drag the text message (or perhaps just the attachment) to the NC3 system application on his device, which would open it for processing.

Reading the plain text section indicates that this is a P2PP transaction, so the application asks Billy Bob where does he want to deposit the funds? If Billy Bob has no defined accounts, then he is guided through adding a defined account. If he has just one defined account, then the field is auto-filled with that account. If he has more than one defined account, then he is presented with a drop down menu to select one of the accounts.

Figure 63B:
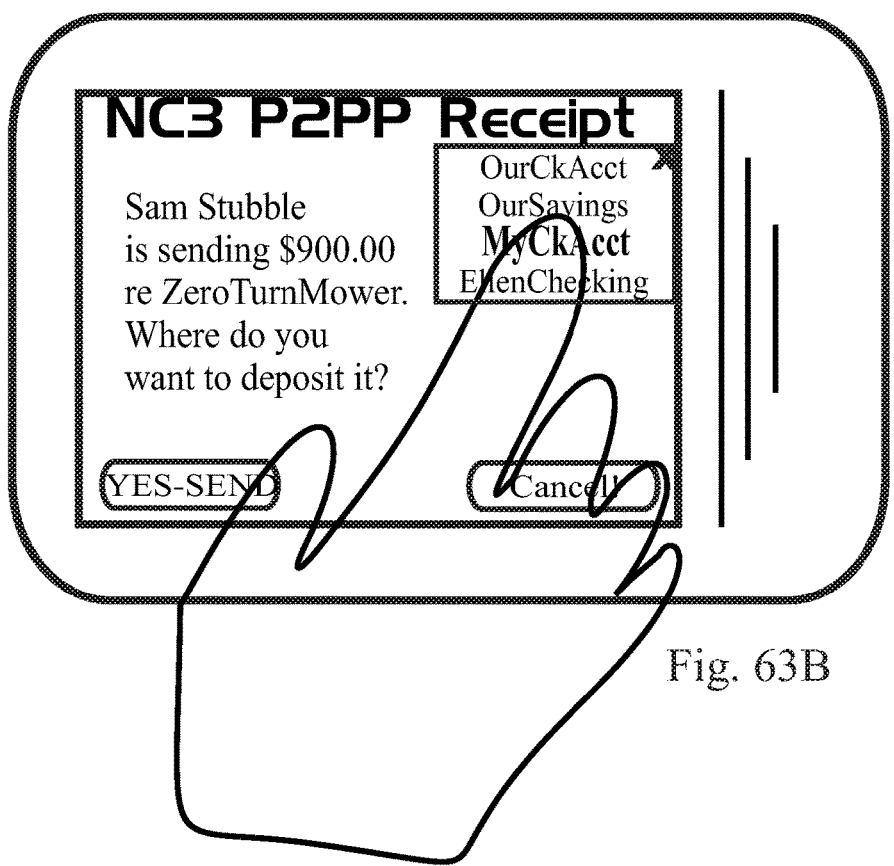
FIG. 63B shows an exemplar screen formatted for a mobile device for the receiver of a person-to person transaction.

For this example, Billy Bob wants to send the P2PP payment to MyCkAcct which was previously defined as ABA 064-123-017, account number 1122334455, in the name of William Robert Buttons. For security purposes, only the nickname "MyCkAcct" is stored in Billy Bob's device, as opposed to any of the account information. This is shown in FIG. 63B.

Billy Bob then is asked to confirm: "Sam Stubble is sending $900.00 to MyCkAcct. Press OK and I'll send one message to your provider."

There are three buttons OK-SEND, NO-EDIT (which takes Billy Bob back where he can select the accounts) and CANCEL (which ends NC3 system processing of the P2PP payment, but does not delete the message from the incoming message store, so Billy Bob can start over again).

Recipient's NC3 System—Create QR-c-P2PP-RFA

An RFA is a Request For Account information. Again, note that with the NC3 system, the details of Billy Bob's account information are not stored in his device, but rather at his provider. Because he is receiving payment, Billy Bob's NC3 system provider is the Recipient-Provider.

| QR-c-P2PP—RFA | From Recipient to Recipient-Provider |
|---|---|
| Plain Text Section | P2PP-RFA |
| Single Encryption Section | LkAsd8134 <<This is Billy Bob's NC3 Code |
| Double Encryption Section | C:William Robert Buttons |
| | P2PP_Recip_Tel: 123-456-7890 |
| | NC3:LkAsd8134 |
| | P2PP_Deposit_To: MyCkAcct |

P2PP_Recip_Tel: is taken from Billy Bob's cell phone as is C: name. The amount does not appear.

Recipient's NC3 System—Send Both

Billy Bob's NC3 system sends both authorizations, each comprising different elements of the transaction, using a multimedia message service (MMS) message with two attachments (under the Android® platform see http://developer.android.com/reference/android/content/Intent.html scroll to ACTION_SEND_MULTIPLE, and under the Apple® platform see www.ehow.com/how_8527493_send-multiple-attachments-iphone.html) to the Recipient-Provider with the QR-c-P2PP from Sam and the newly created QR-c-P2PP-RFA.

NC3 Recipient-Provider Actions

The plain text indicates it is a P2PP message requesting account information to receive a person-to-person payment. It is decrypted with the decryption key-common (DK-c) to reveal Billy Bob's NC3 code. From that, the Recipient-Provider can select the decryption key-unique (DK-u) to reveal the contents of the double encryption block. Billy Bob's NC3 code is compared from the single encryption block to the NC3 code from the double encryption block. They match and processing continues.

As part of the NC3 system, Billy Bob's account information is not stored in his device but at his provider, so the Recipient-Provider creates a QR-c-P2PP-RAI with the Requested Account Information.

| QR-c-P2PP—RAI | From Recipient-Provider to Sender-Provider |
|---|---|
| Plain Text Section | P2PP-RAI |
| Single Encryption Section | (see note below) |
| Double Encryption Section | P2PP_Recipient:William Robert Buttons |
| | P2PP_Recip_Tel: 123-456-7890 |
| | P2PP_Dep_To: |
| | MyCkAcct/ABA:064-123-017/acct: |
| | 1122334455 |

Note that normally the NC3 code would go in the single encryption section, but revealing Billy Bob's NC3 code has no benefit.

There also is the question as to which encryption to use. This is provider to provider, and perhaps there may be a special set of codes preferred. Suffice it to say that the information would be protected in a way that inadvertent disclosure to another party only would exposes encrypted information and that the receiver of the message can reveal the message contents.

NC3 Sender-Provider Actions

Upon receipt of the QR-c-P2PP and QR-c-P2PP-RAI, the following question needs to be addressed, "Is the sender or the recipient our customer?" Whether the QR-c-P2PP-RAI was sent by a Recipient-Provider (recipient within the NC3 system) or a new applicant (recipient not in the NC3 system) would not matter. In either case, the P2PP was sent from a sender who is a member of the NC3 system.

It would be helpful to review what was received.

QR-c-P2PP from Sender to Recipient

| Plain Text Section | <P2PP $900.00 123-456-7890 Fm Samuel Stubble for ZeroTurnMower. Fwd to nnn-nnn-nnnn. Www.Sender-Provider.Com/P2PP> |
|---|---|
| Single Encryption Section | K4Nkjh6as |
| Double Encryption Section | Billy Bob Buttons |
| | M:P2PP T: |
| | $900.00 May 1, 2014 2:59PM |
| | C:Samuel Stubble |
| | NC3: K4Nkjh6as |
| | TL: 201405021459 |
| | P2PP_From: MySavAcct |
| | P2PP_Recip_Tel:123-456-7890 |
| | P2PP_Memo: ZeroTurnMower |
| | P:<PT>nnn-nnn-nnnn |

Receiving a RAI (from any source) means the P2PP was sent from a sender who is a member of the NC3 system. Note that the recipient also could be a member of the NC3 system.

The P2PP is decrypted with the decryption key-common which reveals Sam's NC3 code from the single encryption block. From that, the Sender-Provider can select the decryption key-unique (DK-u) to reveal the contents of double encryption block. Sam's NC3 code is compared from the single encryption block to the NC3 code from the double encryption block. They match and processing continues.

Using the appropriate decryption code the application decrypts the requested account information.

A comparison may be run for the recipient's telephone number:

| | QR | Field | Value |
|---|---|---|---|
| Compare | QR-c-P2PP | P2PP_Recip_Tel: | 123-456-7890 |
| to | QR-c-P2PP-RAI | P2PP_Recip_Tel: | 123-456-7890 |

If the telephone numbers did not match, the transaction would be rejected for Recipient Telephone Mismatch. A message then should be sent to Sam saying "Your transfer of $900 to Billy Bob was not accepted by us because the telephone number you provided <number> does not match the telephone number provided by the recipient. Please correct and resubmit." The method of notification should be determined by the member's P2PP preferences.

A message may be sent to Billy Bob saying "A transfer of $900 to you from Sam was not accepted by us because the telephone number provided by him did not match what you provided <number>. Please communicate with the sender to correct and resubmit this transaction."

Because the recipient's cell phone number is anomalous, it cannot be trusted to send a message. Absent an attached email address, such a message could be sent via the Recipient-Provider. In the example, they do match so the discussion continues.

The next step is to compare recipient names. Note that there is no field name for recipient in the QR-c-P2PP. It is the first field in the double encryption section.:

| | QR | Field | Value |
|---|---|---|---|
| Compare | QR-c-P2PP | (see note below) | Billy Bob Buttons |
| to | QR-c-P2PP-RAI | P2PP_Recipient | William Robert Buttons |

If they matched, the transaction processing would continue. Here, they do not match. Ideally this is reviewed by a human who approves the difference. If not approved, this P2PP is rejected for Recipient Name Mismatch by sending a message to the sender and recipient indicating the P2PP transaction has not been successful because of a name difference. Sam should not be informed of the name used by Billy Bob. For this example it is approved.

If a QR-c-P2PP is sent to the wrong recipient, then the recipient's telephone number and name should not match and preclude delivery to an improper recipient The sender-provider should initiate ACH transactions subject to limitations on the account. If the limitations are not met a message needs to be sent to the sender and perhaps to the intended recipient.

The ACH Transaction

With respect to an ACH transaction, all the information needed is provided.

| Transaction Field | Value | Source QR | Field |
|---|---|---|---|
| AMT$: | 900.00 | QR-c-P2PP | (see note 1) |
| From_Name | Samuel Stubble | QR-c-P2PP | C: |

-continued

| Transaction Field | Value | Source QR | Field |
|---|---|---|---|
| From_ABA | 022-934-165 | QR-c-P2PP | (See note 2) |
| From_Acct | 1199773322 | QR-c-P2PP | (See note 2) |
| To_Name | William Robert Buttons | QR-c-P2PP-RAI | P2PP_Recipient |
| To_ABA | 064-123-017 | QR-c-P2PP-RAI | (See note 3) |
| To_Acct | 1122334455 | QR-c-P2PP-RA | (See note 3) |
| MEMO: | ZeroTurnMower | QR-c-P2PP | P2PP_Memo |

Note 1) There is no field shown for the amount. It is the third line in the QR-c-P2PP double encryption section. A field name could easily be accommodated.

Note 2) The From_Name, _ABA, _Acct are all accessed on the Sender-Provider system from the "MySavAcct" nickname in the QR-c-P2PP in field P2PP_From. This information never resided in the recipient's device.

Note 3) The To_Name, _ABA, _Acct were all provided by the P2PP_Dep_To field in the QR-c-P2PP-RAI. The Recipient-Provider system provided that information from the "MyCkAcct" nickname in the QR-c-P2PP-RAI in response to "MyCkAcct" in field P2PP_Deposit_To: in the QR-c-P2PP-RFA sent by the recipient. This information never resided in the recipient's device.

Note 4) It may be necessary to add fields such as "account type". This, however, would be straight forward.

Recipient—not in NC3 System

In the event that Billy Bob is not part of the NC3 system, the various processing possibilities can be seen in FIGS. 56A-56D, which are flowcharts that show what happens if Billy Bob is not a member of the NC3 system. If the recipient is not in the NC3 system there are several options open to them. Selection between those options depends on several factors including expected frequency of receipt. In reviewing the flowcharts in FIGS. 56A-56D, the flowcharts use the image notation for P2PP related QR-c, but the information also could be conveyed as plain-text and/or encrypted characters.

Sender and Sender Processing functions are identical, regardless of whether the recipient is a member of the NC3 system.

Recipient Processing has two possible paths. The first time a non-NC3 system recipient receives a QR-c-P2PP, they should click on the URL for the Sender-Provider web site which would be in the text message. This would take the recipient to the Sender-Provider web site where they are welcomed.

If the recipient expects to receive more person-to-person-payments then the recipient should click yes and be taken to circle-A in the flowcharts. Processing returns from circle-B. Further Optional Options, discussed below, may be utilized to improve future processing.

The recipient is requested to forward the QR-c-P2PP to the number provided, and then follow the Web Path for this transaction.

Optional Options

If a recipient is expecting to participate in more P2PP transactions, then the recipient is presented with the option to receive information on how to join the NC3 system. Information may be sent by email or via text message.

The recipient may elect to not join the NC3 system, but download an application for their device to facilitate processing. Information may be sent by email or via text message.

Processing returns via circle-B. Notice that no information has been sent at the time of return via circle-B. Notice that in all cases, the first processing of a QR-c-P2PP by a non-NC3 recipient is via the Sender-Provider web site. Although not shown each option for information should allow the user to exit the process gracefully.

Web Path

The web path starts by reminding the recipient to forward the QR-c-P2PP to the number provided now. The web path then asks for the cell phone number and information necessary to create the ACH. This is essentially the same information as contained in the QR-c-P2PP-RAI as generated by the Recipient-Provider. The web page then puts information into an ePending pool for matching and processing. As an alternative, while the recipient is still connected, the system may query the Rumination Pool to confirm that there is a matching P2PP already entered. If there is not a match, a reminder may be provided to the recipient to forward the P2PP. If the recipient has done so (with some period of time having passed), then there is an error.

Once the RAI information has been placed, any information requested is transmitted via the mode selected. The recipient should be informed the payment is in process and provided with a reference or transaction identification. Processing is completed with a "thank you" message.

Web Path Security

Processing via secure hypertext transfer protocol (https) is no less secure than the current state of the art.

The NC3 System Application ("MiniApp")

This is not the whole NC3 system application, just a part of the non-transitory computer program product containing program code for use in performing wireless financial transactions, particularly with regard to that aspect which applies to the recipient processing of a received person-to-person payment (P2PP) where the recipient is not a member of the NC3 system. See FIG. 56D. The application or program code sections are stored or recorded on a machine-readable medium for carrying out the operations described in the various examples disclosed herein. The application is maintained in the recipient or account holder's device, which contains a computer usable medium upon which to record computer program logic for execution by the recipient's processor.

If present on the device, the recipient may drag the QR-c-P2PP to the NC3 system application and be prompted for the same information as the web site would request. Optionally, the recipient may store account information to allow selection by auto-fill (if there is a single value) or by drop down menu (if there are multiple values). The NC3 system application also may allow the recipient to specify an email address for notifications. This email address is not described further below but may be contained in the double encryption section and, if present, is used in lieu of a text message, for notifications.

At the end of the transaction, a single message with two attachments is sent to the Sender-Provider.

Some manner needs to be provided to provision the application with the common encryption code so the QR-c-P2PP-RAI has single level encryption and a second encryption code to provide double encryption.

Because the application needs to be able to communicate with multiple providers (the recipient may get person-to-person payments from people with different providers), either the encryption keys need to be shared among providers (which would not be preferred) or alternative provisions need to be provided.

NC3 Sender-Provider Actions

As for who sent what, there are three possibilities:

| If recipient is | Then | Was/Were Received from | Via |
|---|---|---|---|
| in NC3 | P2PP and RAI | Recipient-Provider | Text |
| Not in NC3/App | P2PP and RAI | Recipient | Text |
| Not in NC3/Web | P2PP | Recipient | Text |
|  | RAI | Web Site | Web connection |

In the first two cases, everything necessary to create the ACH is received at one time, can be placed in the P2PP-Queue (P2PP-Q) and processed. In the last case, the two elements arrive at different times via different routes. A system such as the ePending Pool and the Rumination Pool (see Better Internet Clearinghouse and ePending Pool discussed above) would be needed.

As for what goes where: If a text comes in with both P2PP and RAI they are queued and processed. If a text comes in with just the QR-c-P2PP, it needs to be decrypted to get P2PP_Recip_Tel:123-456-7890, the matching key. The information is placed on the ePending Pool and the Rumination Pool. When the RAI information comes in via the web connection, it is placed in the ePending Pool.

Matching and Processing is only necessary when the P2PP and RAI information are not received together. A process cycles through the Rumination Pool querying the ePending Pool for two matches, one P2PP and one RAI. When found, both are moved to the P2PP-Q where they will be processed. The associated information in the ePending and Rumination Pools are deleted or otherwise cleaned up.

Senders from Multiple Sender Providers

What if a single recipient receives transmissions for payments from multiple senders with different Sender-Providers?

Reiterating the Sample QR-c-P2PP

QR-c-P2PP from Sender to Recipient

| | |
|---|---|
| Plain Text Section | <P2PP $900.00 123-456-7890 Fm Samuel Stubble for ZeroTurnMower. Fwd to nnn-nnn-nnnn. Www.Sender-Provider.Com/P2PP> |
| Single Encryption Section | K4Nkjh6as |
| Double Encryption Section | Billy Bob Buttons<br>M:P2PP T:<br>$900.00 May 1, 2014 2:59PM<br>C:Samuel Stubble<br>NC3: K4Nkjh6as<br>TL: 201405021459<br>P2PP_From: MySavAcct<br>P2PP_Recip_Tel:123-456-7890<br>P2PP_Memo: ZeroTurnMower<br>P:<PT>nnn-nnn-nnnn |

If the recipient is a member of the NC3 system, this is not a problem. They send to their own Recipient-Provider who forwards to the appropriate Sender-Provider as determined by the P:<PT>nnn-nnn-nnnn. A shared database of what provider supports which NC3 codes is not required nor desired.

If the recipient is a first time user, the recipient will follow the NC3 system web path to the www.Sender-Provider.com/P2PP link, and be directed to the web site for the sender's Sender-Provider. If the recipient is using the NC3 system application, the appropriate telephone number is in the plain text section of the QR-c-P2PP that is received by the recipient. Summarily, the QR-c-P2PP contains information to guide the recipient's response to the appropriate destination regardless of which Sender-Provider supports the sender.

On ACH Rejection by Either Institution

Unknown Account Fail by Recipient's Institution

Because the recipient's identification of the recipient's account is not confirmed by the NC3 system, the information may have been entered in error. If the ACH transaction is rejected by the recipient's institution, then the Sender-Provider should cancel the transaction, notify the recipient and provide full information. The sender should be notified only of the fact that the ACH transaction was not completed and that the sender should communicate with the recipient.

Unknown Account Fail by Sender's Institution

If the sender is a member of the NC3 system, then the account information should be confirmed. Nevertheless, something at the sender's institution may have properly caused an ACH rejection. One possibility is that the sender closed the account and didn't update the information at the Sender-Provider. If the ACH transaction is rejected by the sender' institution, the Sender-Provider should cancel the transaction, notify the sender, and provide full information. The Sender-Provider should notify the recipient only that the ACH transaction was not completed and the recipient should communicate with the sender.

Mismatch Name Fail by Recipient's Institution

It may be that the financial institution designated by the recipient did not approve the transaction because of a significant name mismatch. The exactness of a name match may vary from institution to institution. One may allow "Bill Bastain" as a deposit to the account with the name "William H. Bastain II". Another institution may not. Similarly, a P2PP transaction for "Bill Smith" may not be allowed for an account holder name of "William and Genvieve Smith, Jr."

If the ACH transaction is rejected by the recipient's institution, the Sender-Provider should cancel the transaction, notify the recipient and provide full information including any name-related information. The Sender-Provider should notify the sender only that the ACH transaction was not completed due to a name mis-match and the sender should communicate with the recipient.

Mismatch Name Fail by Sender's Institution

If the sender is a member of the NC3 system, then the account information should be confirmed. Still, something at the sender's institution may have properly caused an ACH rejection. One possibility is that the sender changed his or her name and didn't update the information at the Sender-Provider.

If the ACH transaction is rejected by the sender' institution, then the Sender-Provider should cancel the transaction, notify the sender and provide full information including any name-related information. The Sender-Provider should notify the recipient only that the ACH transaction was not completed due to a name mis-match and the recipient should communicate with the sender.

Other Failures

There are other failures expected including perhaps the most common: not sufficient funds (NSF). Regardless of any other failures that may be expected, it the NC3 system should provide for contacting both parties and providing only the security appropriate information.

Person-to-Merchant

Variations from the framework of person-to-person transactions to accommodate Person-to-Merchant (P2M) processing are described herein. The features and differences between existing systems and the NC3 system may be better understood with reference to explanatory flowcharts.

P2M uses concepts from P2PP to allow payment of another type of transaction. In addition to transaction specific single payments (such as a purchase from a bricks-and-mortar store or from an electronic merchant), the NC3 system allows recurring payments to be made from a single authorization. Consumers may want particular recurring transactions to be paid only after specific approval. Two common examples involve payments of utility and insurance bills.

A person-to-merchant payment (P2M) is defined as being a payment from one consumer or account holder to a merchant that has an established relationship with that consumer. P2M is not an authorized recurring transaction where a merchant may receive funds automatically based on a prior agreement. It is a single approval for recurring services, such as monthly utility bill, that receive individual authorizations by the consumer.

Some QR Abbreviations Used

| Abbreviation | For Person-to-Merchant Payments this Means |
|---|---|
| QR-m-P2M | This is what is sent from the Merchant (recipient) to the Consumer sender) |
| QR-c-P2M | This is sent by the Consumer (sender) to the Sender-Provider |
| QR-c-P2M-RAI | This is also sent by the Consumer (sender) to the Sender-Provider |

The Electric Bill—Existing System

Figure 57:
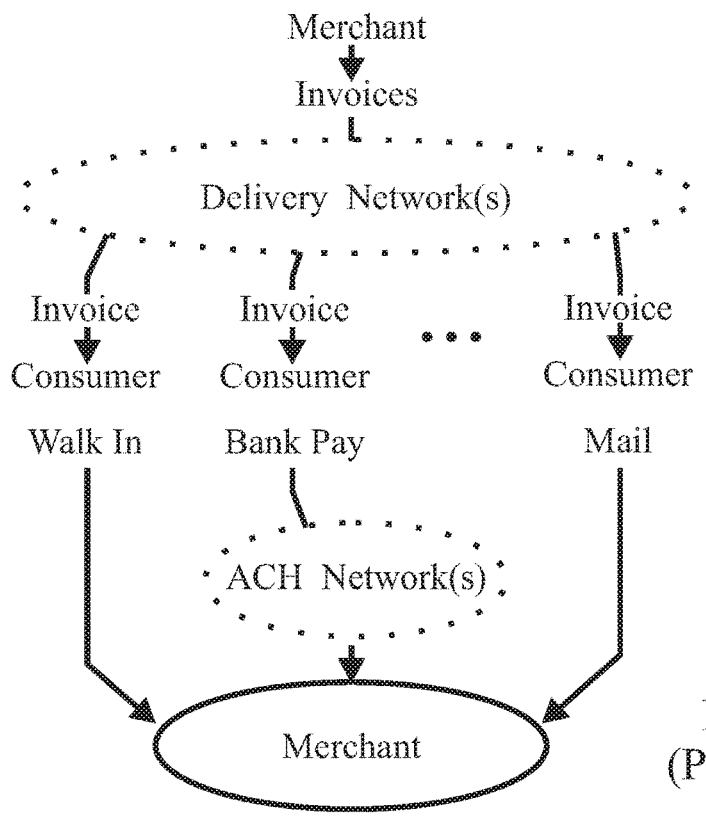
FIG. 57 shows a flowchart for merchant invoices in known systems.

FIG. 57 shows a known or existing system in which the merchant prepares physical invoices for placement into physical delivery networks such as the United States Postal Service.

Alternately, electronic invoices are prepared as plain text, encrypted, encapsulated, or otherwise contained in some format such as the portable document format.

The merchant places the invoices into appropriate delivery networks.

The invoices are received by the consumer or account holder. One consumer may carry cash and walk into the merchant to tender payment. Another may prepare a bank draft. Another may use their bank's software to submit an electronic payment.

In all cases, the consumer's payments are eventually received by the merchant.

The Electric Bill—NC3 System

Sam Stubble received a regular monthly invoice from his electricity service provider. It could be a printed invoice delivered via the United States Postal System or an electronic invoice prepared as plain text, encrypted, encapsulated, or otherwise contained in some format such as the portable document format.

The invoice, such as one shown in FIG. 59, contained all of the usual information, the charge for the month, and a QR-m-P2M code. The plain text content of the QR-m-P2M code is shown in FIG. 60. Sam scans the QR-m-P2M code and is prompted to and does select his account from which to send payment. Then, he is prompted to and does approve payment, and his device sends the payment. It is that easy for the account holder.

P2M in the NC3 System

Figure 58:
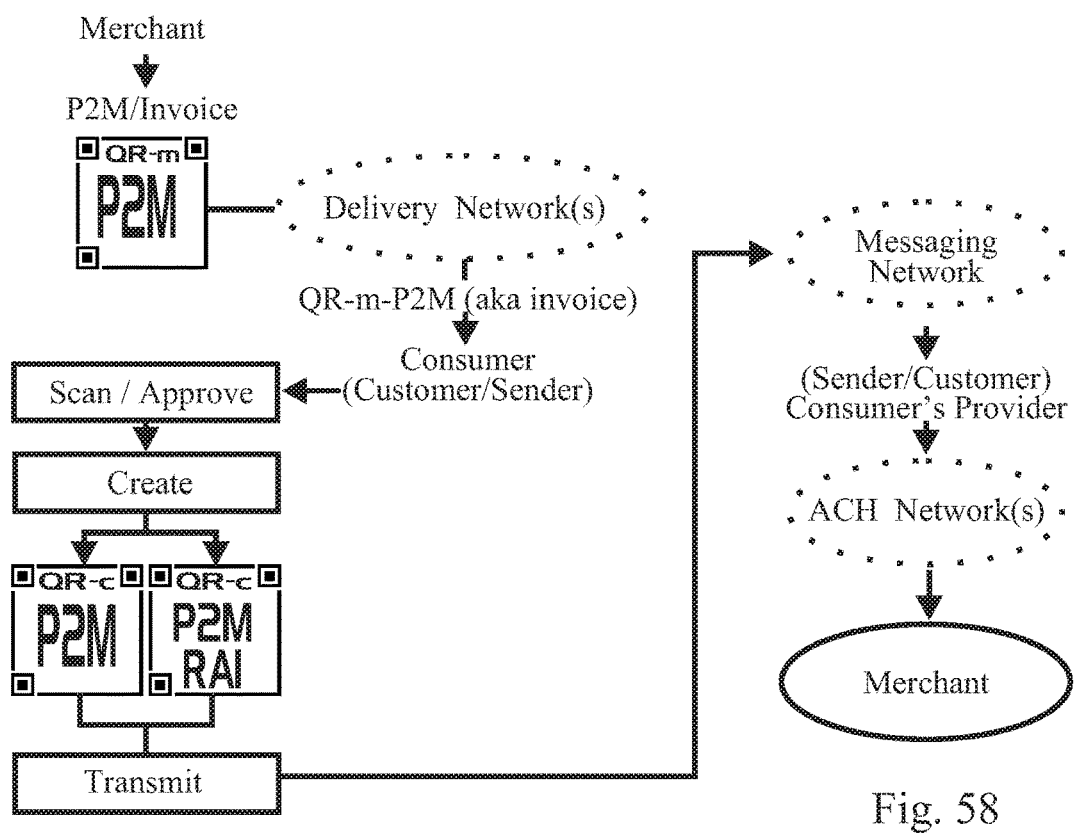
FIG. 58 shows a flowchart for a person-to-merchant transaction under the NC3 system.

Review of the flowchart in FIG. 58 indicates a clear path of:

Merchant

Delivery Network

Consumer (customer/sender)
ACH Network(s)
Merchant

This is the same path as is used in the existing system. The differences are all in the consumer's actions. As such, nothing here precludes the existing systems from functioning as before. The presence of the QR-m-P2M code on the invoice does not hinder the existing payment methods. The passive merchant prepares physical or electronic invoices as before, but they now include the proffer of a graphic matrix code, specifically the QR-m-P2M code containing details of a request for funds. The invoices are delivered as before.

The consumer receives the invoice and can now scan the QR-m-P2M on, or from, whatever that QR-m-P2M was obtained. This includes a QR-m-P2M being printed on a physically manifested invoice, displayed on a terminal of the world wide web, on email readers, computers or electronic devices that are not in the physical or electronic presence of both the consumer (account holder) and the passive merchant simultaneously.

If the invoice was electronic, and if the email was received on the same device used for NC3 system payments, then the consumer can use whichever function was implemented, as described above in regard to the Electronic Transaction Example for E-Shopping with Device.

The consumer then scans the QR-m-P2M and approves the payment. The consumer's NC3 system device creates two codes, the QR-c-P2M and the QR-c-P2M-RAI. The content of these two codes for the Sam Stubble example above are shown as FIG. 61. The two codes are transmitted as attachments to a text message via the text messaging network to the sender's provider who authenticates the QR-c-P2M and prepares, then submits, the ACH transaction via the ACH network.

A tag line that may be included when transmitting a P2M invoice may state, "What is this? See www.WebSite.Com/NC3 for more information on an easy new way to pay."

If the email was received on the same device used for the NC3 system payments, Sam can use whichever function was implemented, as described above with respect to E-Shopping with Device.

Merchant Preparation The merchant (utility provider, insurance company, etc.) who chooses to receive P2M payments should prepare a new bank account whose permissions allow it to receive, but not disburse, ACH transactions. Even though the information will be within codes, the account information will be essentially public information. The merchant also needs to be able to print the QR-m-P2M code on each invoice.

QR-Codes
QR-m-P2M
This is similar to a QR-m sent from a merchant. It contains additional elements necessary for an efficient transaction.
Plain Text:
QR-m-P2M
Merchant_Name
Code-M: Code-T:
Amount Date Time
P2M_Recipient:Merchant Name
P2M_Recip_Tel: 123-456-7890
P2M_Dep_To: NickName/ABA:/acct:
P2M_FBO: Customer Account number
The first element identifies this QR-code as a type QR-m-P2M. This will be necessary for provider processing.

The second block is standard QR-m information. The merchant's transaction identification (Code-T) is generally the invoice number. This will be used to match payments received.

The third block is information necessary to transmit funds.
P2M_Recipient:Merchant Name
The name of the merchant
P2M Recip_Tel: 123-456-7890
The telephone number is generally to a person who can be contacted by the provider in the event of an ACH problem. It could be compound with a name or department. This field comes from the merchant, so it is their choice.
P2M_Dep_To: NickName/ABA:/acct:
This is the merchant's nickname (ex: P2M Deposits), the ABA and account number for the ACH transaction.
P2M_FBO: Customer Account number
This is to match the payment to the customer (also known as consumer, account holder and sender) if the merchant's transaction identification (Code-T) is not adequate. FBO might be compound, such as 2103489/Jones or other alternatives. This field comes from the merchant, so it is their choice.

QR-c-P2M
This is the first of two codes created by the sender's NC3 system. It is similar to the QR-c code. The P2M concept is designed to transmit the QR-c-P2M as an attachment to the same message as the associated QR-P2M-RAI.

In case the attachments get separated, this code provides for linkage to the -RAI
Plain Text:
QR-c-P2M
Code-M:
Code-T:
Single Encryption:
NC3: Consumer Identifier
Double Encryption:
Merchant_Name
*NC3:Consumer_Identifier
*M:
*T:
Code-M: Code-T:
Amount Date Time
NC3:Consumer_Identifier
TL: TimeToLive
P:<PT>nnn-nnn-nnme
C:ConsumerName The combination of items marked with asterisks should be unique. If a consumer pays twice, or more, with the same amount, that will be rejected as a duplicate.

If a consumer pays the same merchant twice, or more, with different amounts, that is not a duplicate.

QR-P2M-RAI
Sometimes referred to as QR-c-P2M-RAI this is the requested account information necessary for the sender's provider to prepare an automated clearinghouse transaction. This is the second of two codes created by the sender's NC3 system. The P2M concept is designed to transmit the QR-P2M-RAI as an attachment to the same message as the associated QR-c-P2M.

In case the attachments get separated this code provides for linkage to the P2M_Recipient:Merchant_Name
Plain Text:
QR-P2M-RAI
Code-M:
Code-T:

Single Encryption:
  NC3:Consumer_Identifier
Double Encryption:
  QR-c-P2M
    *NC3:Consumer_Identifier
    *M:
    *T:
    P2M_Recip_Tel: 123-456-7890
    P2M_Dep_To:
    NickName/ABA:/acct:
    P2M_FBO: Customer Account number The combination of items marked with asterisks should be unique. This is similar to a Create a QR-c-P2PP-RAI (Requested Account Information) except the sources are different.

In the QR-c-P2PP-RAI there is nothing in the single encryption section. Because this -RAI is coming from the sender directly (not via another party), the NC3:Consumer_Identifier is placed there. In the QR-c-P2PP-RAI, there also was the question as to which encryption to use for the -RAI. There is no question here as this -RAI is coming from the sender directly, not via another party, so the provider can use the common decryption code to reveal the NC3:Consumer_Identifier and get the unique decryption code.

QR-m-P2M-RAI Notes

Notice the absence of P:<PT>nnn-nnn-nnnn. This is because the QR-c-P2M and QR-P2M-RAI are being sent to the sender's provider, not to the merchant (recipient's) provider. It is an option to have the customer (consumer, account holder, sender) send their authorization to the merchant's provider, but it would only come back to the sender's provider anyway. For the cost of a separate bank account to receive ACH transactions the process is made more efficient.

Sender Provider Actions

Because the two codes are received in the same message, they may be queued to be processed. No matching step is required.

Processing begins with decrypting the QR-c-P2M to identify the sender and identify the message type as a P2M. The QR-P2M-RAI is decrypted. Between the two codes, sufficient information is available to prepare and submit the ACH transaction.

Depending on the sender's preferences, notifications via email or text may be transmitted during and/or after processing.

Sender Provider Action Notes

Account Nicknames, but not account information, could be stored as part of the Affiliation Code Locker database.

It is straightforward to include both sender and recipient email addresses and provide to them electronic notifications of processing steps. The Recipient-Provider should only notify the recipient. The Sender-Provider should only notify the sender. An NC3 system member may have P2PP/P2M notifications set to ALL, ERRORS or NONE, which generate the most to least notifications. The member may also elect a vehicle for P2PP/P2M notifications, such as either emails or text messages.

Additional Items of Interest

Adjunct—Affiliation Code Locker

It could be a simple add-on to the NC3 system to scan and store electronically the increasing number of affiliation codes now affixed to key rings or additional charge card-sized plastic placards. The application could scan them and allow the user to affix a merchant label (ex: Walgreens®).

When needed, the consumer may bring up the code on the display as a single displayed code and present it to be scanned. The physical tags themselves are no longer required.

If affiliation information is available, then a dual code display is possible. For example: Kroger® is creating facilities for the distribution of refined petroleum products, gasoline. Discounts on gasoline are provided based on the consumer's shopping volume, which drives consumers to spend more of their grocery dollars at Kroger®. With existing systems, at the dispensing station (gas pump), the consumer has to first identify themselves as a Kroger® customer, then insert the payment card. This generally results in a juggling act between the Kroger® card, a charge card, the gas pump dispenser, and opening the fuel door, etc.

Because a QR code is square and most smart phones have rectangular displays they are configured with room for the display module to display a graphic matrix code simultaneously with text or other codes, such as is shown in the example in FIG. 62. A 1D code (bar code) and text are shown in addition to a QR-c code for the example. This connection of affiliation codes automatically to payment information, in a single display, is believed to be novel and non-obvious.

It also would be possible to include the affiliation code in the plain text section of the QR-c code for linkage. The choice may be made as desired, and may be a matter of operational analysis, marketing or other considerations.

Voice Command

The voice command table structures could be further refined to include an affiliation reference. One way method could include an affiliation tag reference in the Merchant Table. The tag would have to either exist in the Affiliation Code Locker or be acquired. The example could be generated in response to a voice command, such as "KROGER50", so that the QR-c is prepared in advance for a charge of not-greater-than $50. This would be useful in the grocery store, as well as at the gas pump.

Marketing

Value for Consumers and Merchants

There needs to be a positive value for consumers to want to use the NC3 system. Increased security and ending the endless debit/credit question are contra-negatives. Ease of use, new features such as Voice Command, Placard Purchase, Flash Purchase, and a single solution for card-present, electronic commerce and Person-to-Person payments provide such value to consumers.

There also needs to be a positive value for merchants to want to use the NC3 system. Increased security is a contra-negative. Reduced communications, a zero-cost entry point for small merchants, and enabling of tableside checkout and other new capabilities present additional values to merchants.

These benefits help to overcome the natural resistance to adopt new technologies or systems for consumers and merchants who may otherwise be accepting of existing payment solutions, such as credit cards, bank cards, etc.

It is essential that the implementation of the NC3 system be as easy to use as possible and for consumers to be well educated with respect to the system. It also would be helpful to offer use by more than one device/user, but the ability to restrict the credit as to other users. An NC3 system sub-account may allocate some credit value versus sharing the charge account. Thus, a "prepaid" account is not necessary to restrict the other user's wanton spending, as a very small credit allocation may be employed.

Not only should transactions be secure, but also concealed.

Sub Accounts

Conceptually, sub accounts may be linked to an account, such that there may be an account holder and a sub account holder. For ease of recognition, the account holder in such an instance also may be referred to as a master account holder, who maintains the master account, from which sub accounts are created for sub account holders. As an example, a master account holder Dad could have a $20,000 credit limit and create a sub account for Mom with a $5,000 credit limit. Similarly, a sub account could be created for Junior with a $100 limit. Properly, both sub account credit limits should reduce Dad's credit limit by $5,100.

The NC3 system makes this straight forward. No additional account number needs to be created. Instead, one creates a separate consumer name, a sub account and creates a separate NC3 code. This could be electronically provisioned via the provider's website.

Sub accounts should be viewable and controllable from the master account. The master account also may require the ability to suspend or terminate the sub account. Preferably, sub accounts should be able to view the master account name, but nothing else about the master account. While sub accounts are not new, the NC3 system may make them easier to initiate, use and manage.

Figure 6:
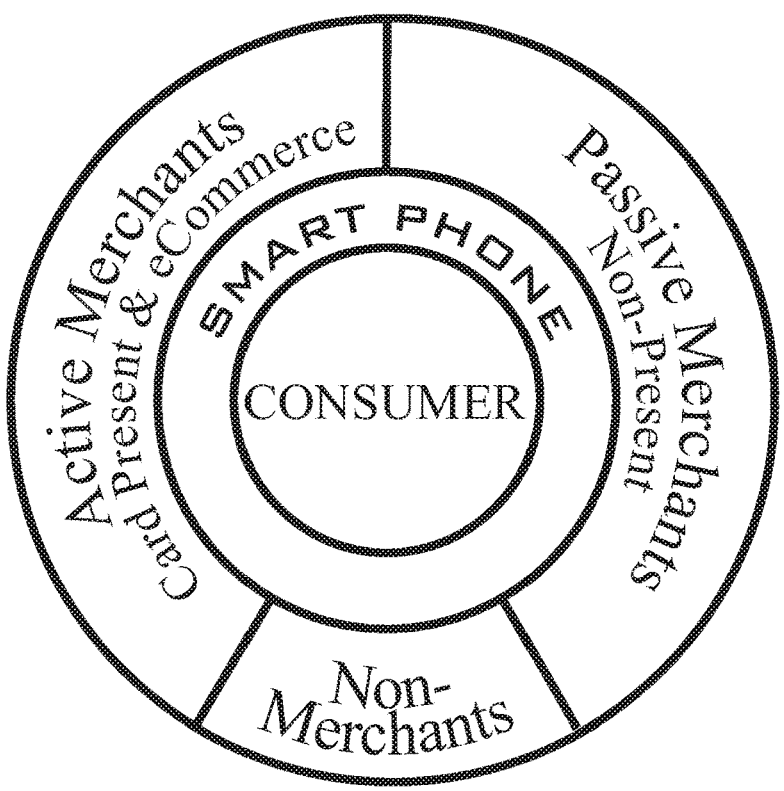
FIG. 6 shows a schematic diagram of NC3 system types of transactions.

The above are illustrative of a flow of funds from the consumer at center toward the outer ring of merchants and non-merchants via the middle ring of interfaces as shown in FIG. 6. A consumer may receive funds in the same structure as a non-merchant. To receive funds as a merchant the consumer becomes a merchant. Thus, the structure also illustrates principles for a consumer to receive funds.

It will be appreciated that the disclosure includes numerous additional methods, devices and systems, several of which are set forth herein.

For instance, the disclosure includes a method for performing wireless financial transactions which separates an account identification and transaction authorization from a single charge card into two separate elements, which include at least an encrypted account identifier and a transaction-adaptive, context sensitive, dynamically content-rich, transaction authorization, comprising the steps of: starting an application on an account holder's apparatus; the application determining whether the apparatus is in an application mode for performing data transmissions to accomplish a transaction with an active merchant entity, a passive merchant entity, or a non-merchant entity; acquiring details of a request for funds from one of the respective entities; obtaining authorization from the account holder to permit payment of such a request for funds; performing internal operations to generate, format and present an authorization for payment to the respective entity; and initiating and completing communication of the authorization to the respective entity from which the request for funds was acquired.

The disclosure includes a method as stated above wherein the apparatus comprises a smart phone, portable computer or electronic device having scanning functionality, software to interpret scanned optically-based codes and communication capabilities; and wherein the communication capabilities comprise the capability to generate, format and present graphic matrix codes to be wirelessly optically transmitted between the account holder and a physically present, active merchant entity.

The disclosure includes a method as stated above wherein the apparatus comprises a smart phone, portable computer or electronic device having scanning functionality, software to interpret scanned optically-based codes and communication capabilities; and wherein the communication capabilities comprise the capability to generate, format and present a graphic matrix code or a mixed encrypted text equivalent to be wirelessly transmitted via attachment to a cellular text message, directly connected file transfer, directly connected text stream, data over voice line telephone, or captured by a computer attached web camera and transmitted to a respective entity, in electronic presence.

The disclosure includes a method as stated above wherein the step of acquiring details of a request for funds comprises the account holder's apparatus obtaining by optical scanner a proffered graphic matrix code designed for optical scanning and having underlying elements that describe a request for funds; and wherein the proffered graphic matrix code is made in the physical presence or electronic presence of an active merchant, by being printed, or displayed on terminals of registers, computers or electronic devices.

The disclosure includes a method as stated above wherein the step of acquiring details of a request for funds comprises the account holder's apparatus obtaining by optical scanner a proffered graphic matrix code designed for optical scanning and having underlying elements that describe a request for funds; and wherein the proffered graphic matrix code is made by a passive merchant, by being printed, or displayed on terminals of the world wide web, email readers, computers or electronic devices that are not in the physical or electronic presence of both the account holder and respective entity simultaneously.

The disclosure includes a method as stated above wherein the step of acquiring details of a request for funds comprises the account holder's apparatus obtaining by optical scanner a proffered graphic matrix code designed for optical scanning and having underlying elements that describe a request for funds; wherein the proffered graphic matrix code is made in the physical presence or electronic presence of an active merchant, by being printed, or displayed on terminals of registers, computers or electronic devices; and wherein the request for funds comprises a not to exceed amount.

The disclosure includes a method as stated above wherein an authorization for payment comprises more than one authorization with each authorization comprising different elements of the transaction.

The disclosure includes a method as stated above wherein the account holder further comprises a sub account holder.

The disclosure includes a method as stated above wherein the steps of acquiring details of a request for funds from one of the respective entities and obtaining authorization from the account holder to permit payment of such a request for funds further comprise use of a sound recognition function that responds to words, phrases or sounds that can be reproduced with fidelity for matching without utilizing a speech-to-text function.

The disclosure includes a mobile terminal device for use in performing wireless transactions which separates an account identification and transaction authorization from an account holder's single charge card into two separate elements within text of mixed encryption, which include at least an account identifier and a transaction-adaptive, context sensitive, dynamically content-rich, transaction authorization, comprising: a processor, an optical scanning module, an optical display module, a communication module, a memory including executable instructions, the memory and the executable instructions being configured to cooperate with the processor; and wherein the text of mixed encryption comprises an environment un-encrypted plain text, single encrypted text and/or single encrypted text that has been subsequently encrypted with a second encryption to generate double encrypted text.

The disclosure includes a mobile terminal device as stated above wherein an encryption key used for single encryption is unique to a single account holder.

The disclosure includes a mobile terminal device as stated above wherein encryption keys used for single encryption are common for a plurality of account holders.

The disclosure includes a mobile terminal device as stated above wherein encryption keys used for the first encryption are dissimilar from the encryption keys used for the second encryption and any subsequent encryption keys are different from any preceding encryption keys.

The disclosure includes a mobile terminal device as stated above wherein encryption keys used for the first encryption are dissimilar from the encryption keys used for the second encryption and any subsequent encryption keys are different from any preceding encryption keys; and wherein each of the encryption keys used for the second encryption is unique to each account holder.

The disclosure includes a mobile terminal device as stated above wherein encryption keys used for the first encryption are dissimilar from the encryption keys used for the second encryption and any subsequent encryption keys are different from any preceding encryption keys; and wherein each of the encryption keys used for the second encryption is common for a plurality of account holders.

It will be understood that the examples described above are illustrative of some of the applications of the principles of the present subject matter. Further additions or alterations may be made to the methods, non-transitory computer program products, apparatuses, devices and systems, without departing from the spirit and scope of the present disclosure. Numerous modifications may be made by those skilled in the art without departing from the spirit and scope of the claimed subject matter, including but not limited to combinations of features that are individually disclosed or claimed herein. For these reasons, the scope of this disclosure is not limited to the above examples but is as set forth in the appended claims.

The invention claimed is:

1. A method for performing wireless financial transactions which separates an account identification and transaction authorization from a single charge card into two separate elements, which include at least an encrypted account identifier that is not derived from an underlying charge card number associated with the single charge card and a transaction-adaptive, context sensitive, dynamically content-rich, transaction authorization, comprising the steps of:
   starting an application on an account holder's apparatus;
   the application determining whether the apparatus is in an application mode for performing data transmissions to accomplish a transaction with an active merchant entity, a passive merchant entity, or a non-merchant entity;
   acquiring details of a request for funds from one of the respective entities;
   obtaining authorization from the account holder to permit payment of such a request for funds;
   performing internal operations to generate, format and present an authorization that is provided in text or graphic form for payment to the respective entity;
   initiating and completing communication of the authorization to the respective entity from which the request for funds was acquired; and
   wherein an authorization for payment relating to a physically present or a non-physically present transaction comprises elements that are presented using partial dual encryption comprising a mixture of unencrypted plain text, text encrypted with a single encryption, and text with double encryption.

2. The method of claim 1 wherein the apparatus comprises a smart phone, portable computer or electronic device having scanning functionality, software to interpret scanned optically-based codes and communication capabilities capable of mixed encryption.

3. The method of claim 1 wherein an active merchant entity comprises a merchant where the account holder is in the physical presence of the merchant or is in the electronic presence of the merchant, and wherein a passive merchant entity comprises a merchant where the account holder has received an invoice, bill or similar notification of payment required via physical mail, electronic mail, text message or courier, but the merchant is neither in the physical presence or electronic presence of the account holder, and wherein a non-merchant entity comprises a person or an organization to whom the account holder wishes to convey funds.

4. The method of claim 1 wherein the step of acquiring details of a request for funds comprises the account holder's apparatus obtaining by optical scanner a proffered graphic matrix code designed for optical scanning and having underlying elements that describe a request for funds.

5. The method of claim 1 wherein the steps of acquiring details of a request for funds from one of the respective entities and obtaining authorization from the account holder to permit payment of such a request for funds, or to provide an authorization of a payment not to exceed an amount set by the account holder, are both generated by the account holder.

6. The method of claim 1 wherein obtaining authorization from the account holder comprises the apparatus providing a request for authorization visibly or audibly, and receiving authorization from the account holder via touch screen, keypad or voice command input.

7. A non-transitory computer program product for use in performing wireless financial transactions which separates an account identification and transaction authorization from an account holder's single charge card into two separate elements, which include at least an encrypted account identifier that is not derived from an underlying charge card number associated with the single charge card and a transaction-adaptive, context sensitive, dynamically content-rich, transaction authorization, comprising:
   a computer usable medium having computer program logic recorded thereon for execution by a processor;
   program code in the medium for enabling the processor to start an application on an apparatus;
   wherein the program code enables the processor to determine whether the application is in an application mode for performing data transactions with external entities comprising an active merchant entity, a passive merchant entity, or a non-merchant entity; and
   the application comprising an internal application for acquiring details of a request for funds that is generated by one of the entities or the account holder, obtaining authorization from the account holder to permit payment of the request for funds, performing internal operations to provide an authorization comprised of a mixture of unencrypted plain text, text with a single encryption, and text with double encryption that is provided in text or graphic form to the requester of the funds, and initiating and completing communication functions in the apparatus to convey the authorization to the requester of the funds.

8. An apparatus for use in performing wireless financial transactions which separates an account identification and transaction authorization from an account holder's single charge card into two separate elements, which include at least an encrypted account identifier that is not derived from an underlying charge card number associated with the single charge card and a transaction-adaptive, context sensitive, dynamically content-rich, transaction authorization, comprising:
- an optical scanning module, an optical display module, a communication module; a central processing unit coupled to the communication module and configured to start an application on the apparatus;
- a program code in a computer usable medium enabling the processor to determine whether the application is in an application mode for performing data transactions with external entities comprising an active merchant entity, a passive merchant entity, or a non-merchant entity; and
- the application comprising an internal application for acquiring details of a request for funds that is generated by one of the entities or the account holder, obtaining authorization from the account holder to permit payment of the request for funds, performing internal operations to provide an authorization comprised of a mixture of unencrypted plain text, text with a single encryption, and text with double encryption that is provided in text or graphic form to the requester of the funds, and initiating and completing communication functions in the apparatus to convey the authorization to the requester of the funds.

9. A wireless data transaction system for use in performing wireless transactions which separates an account identification and transaction authorization from an account holder's single charge card into two separate elements, which include at least an encrypted account identifier that is not derived from an underlying charge card number associated with the single charge card and a transaction-adaptive, context sensitive, dynamically content-rich, transaction authorization comprised of a mixture of unencrypted plain text, text with a single encryption, and text with double encryption that is provided in text or graphic form, comprising:
- at least one mobile terminal device including a memory module and a processor wherein in response to starting of an application, the application determines whether the device is in an application mode for performing data transactions with external entities comprising an active merchant entity, a passive merchant entity, or a non-merchant entity, and conducts wireless optical transmission and/or text messaging transmission with at least one of the external entities, wherein the at least one mobile terminal device provides at least one non-omni-directional data transmission to accomplish a transaction with the at least one external entity.

* * * * *

UNITED STATES PATENT AND TRADEMARK OFFICE
CERTIFICATE OF CORRECTION

PATENT NO. : 10,621,589 B2  
APPLICATION NO. : 14/441590  
DATED : April 14, 2020  
INVENTOR(S) : Jonathan E. Jaffe Page 1 of 1

It is certified that error appears in the above-identified patent and that said Letters Patent is hereby corrected as shown below:

On the Title Page

Item (54): "TRACTIONS" should be changed to --TRANSACTIONS--

In the Specification

Column 1, Line 2: "TRACTIONS" should be changed to --TRANSACTIONS--

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*